(12) United States Patent
Nagano

(10) Patent No.: US 6,952,233 B2
(45) Date of Patent: Oct. 4, 2005

(54) VIDEO CAMERA HAVING A MATERIAL ELEMENT FOR CONTROLLING LIGHT TRANSMISSION

(75) Inventor: Masatoshi Nagano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 08/848,243

(22) Filed: Apr. 29, 1997

(65) Prior Publication Data

US 2002/0012052 A1 Jan. 31, 2002

Related U.S. Application Data

(63) Continuation of application No. 08/557,376, filed on Nov. 13, 1995, now abandoned, which is a continuation of application No. 08/094,896, filed on Jul. 22, 1993, now abandoned.

(30) Foreign Application Priority Data

| Jul. 23, 1992 | (JP) | ............................................. | 4-216614 |
| Jul. 30, 1992 | (JP) | ............................................. | 4-222280 |
| Aug. 24, 1992 | (JP) | ............................................. | 4-224340 |
| Sep. 17, 1992 | (JP) | ............................................. | 4-247887 |
| Nov. 11, 1992 | (JP) | ............................................. | 4-326077 |
| Jun. 30, 1993 | (JP) | ............................................. | 5-183238 |

(51) Int. Cl.[7] .............................................. G03B 7/00
(52) U.S. Cl. ..................... 348/362; 348/367; 348/224.1
(58) Field of Search .............................. 348/362, 221.1, 348/223.1, 225.1, 226.1, 227.1, 228.1, 230.1, 255, 296, 367, 224.1, 221, 223, 225, 226, 227, 228, 230, 262

(56) References Cited

U.S. PATENT DOCUMENTS 4,803,550 A * 2/1989 Yabe et al. ................. 348/296
4,806,776 A * 2/1989 Kley ........................... 348/139
4,918,534 A * 4/1990 Lam et al. ................... 348/367
4,984,088 A * 1/1991 Tani et al. ................... 348/296
4,994,917 A * 2/1991 Takayama ................... 348/296
5,047,847 A * 9/1991 Toda et al. .................. 348/362
5,132,805 A * 7/1992 Choi ........................... 348/223
5,200,813 A * 4/1993 Jeon ........................... 348/223
5,325,185 A * 6/1994 Tsuchiva ..................... 348/223

FOREIGN PATENT DOCUMENTS

| JP | 60-250785 | 12/1985 |
| JP | 63-054877 | 3/1988 |
| JP | 1-159470 | 11/1989 |
| JP | 04-070070 | 3/1992 |

OTHER PUBLICATIONS

Loral Fairchild CCD Data Book, 1991, P334.*

Official Communication regarding corresponding Japanese application (Ref. 4–224340) (with English translation).

* cited by examiner

Primary Examiner—Wendy R. Garber
Assistant Examiner—Jacqueline Wilson
(74) Attorney, Agent, or Firm—Fitzpatrick, Cella, Harper & Scinto

(57) ABSTRACT

There is disclosed a video camera including a material element, arranged in a photographing optical system, for controlling the light transmission factor or amount, an image pickup element for receiving an optical image transmitted through the material element at the position of an imaging plane, and converting the optical image into an electrical signal, and a correction unit for correcting the light transmission factor wavelength dependency of the material element in accordance with the light transmission factor characteristics or light transmission amount characteristics of the material element.

9 Claims, 52 Drawing Sheets

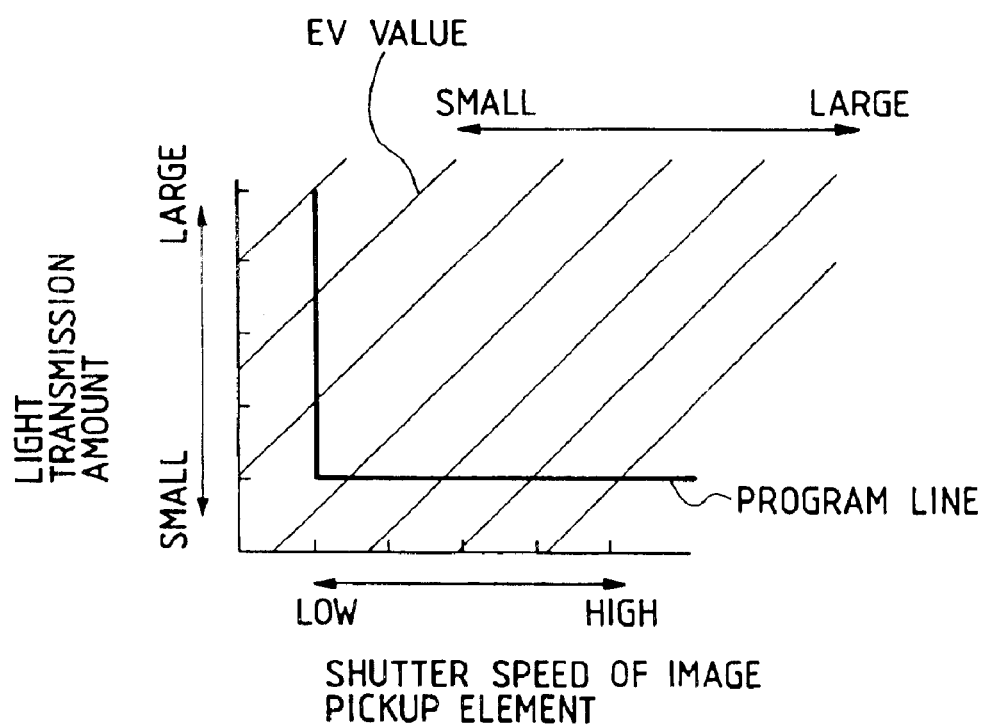

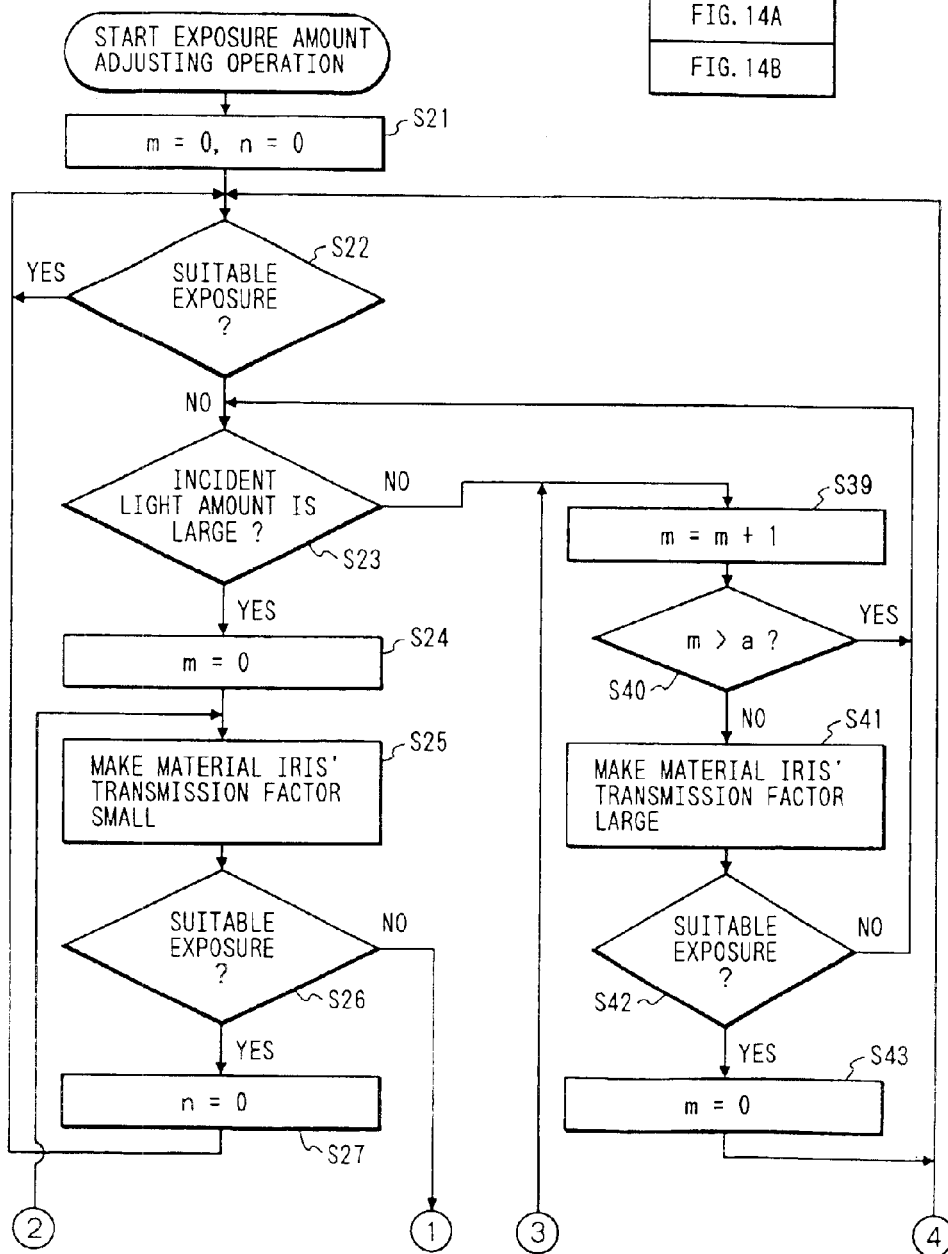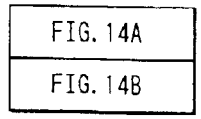

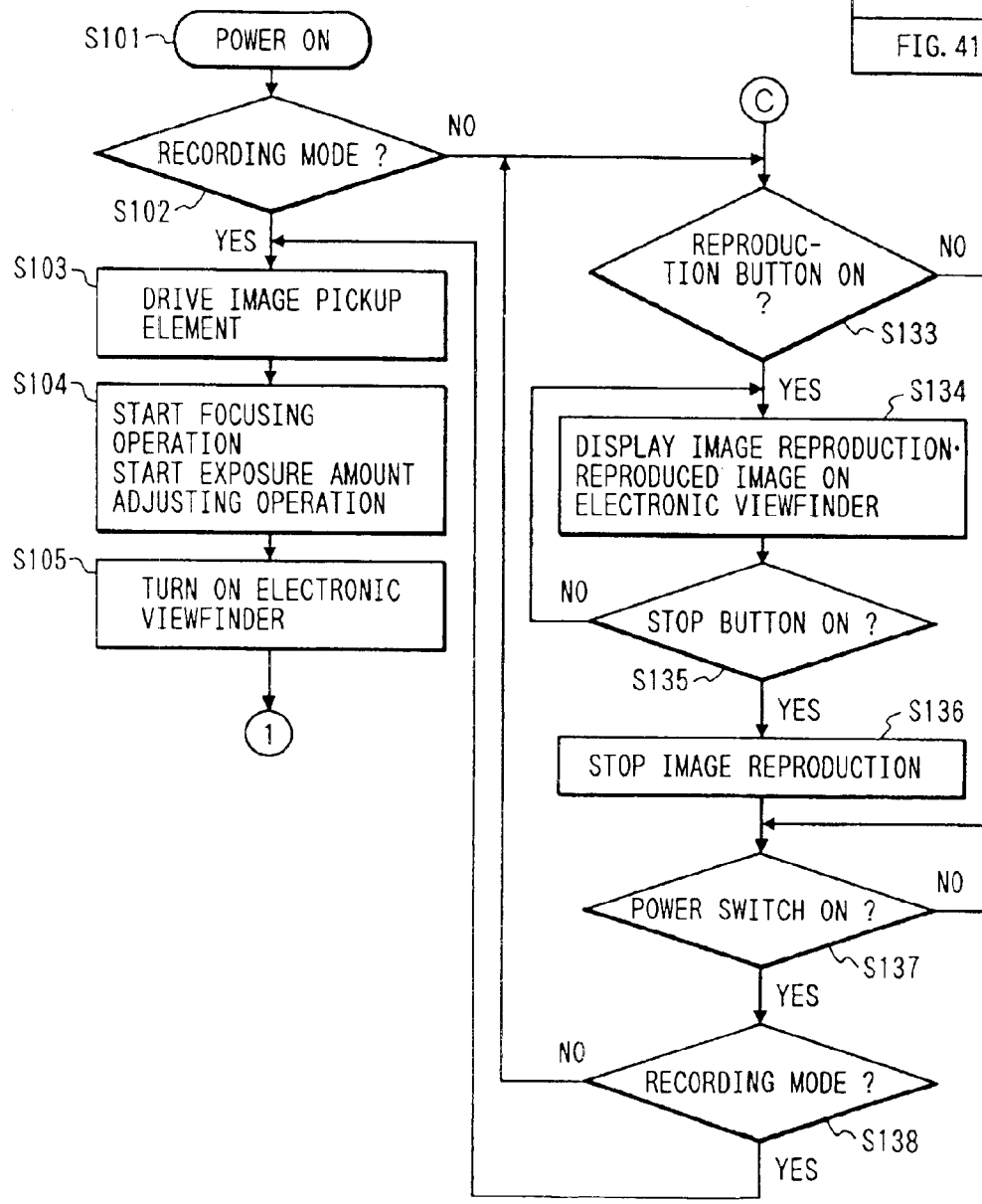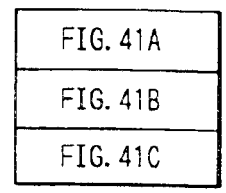

FIG. 43A
FIG. 43B
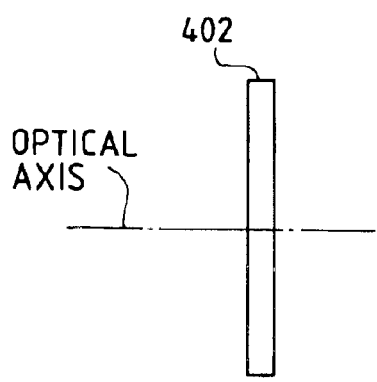
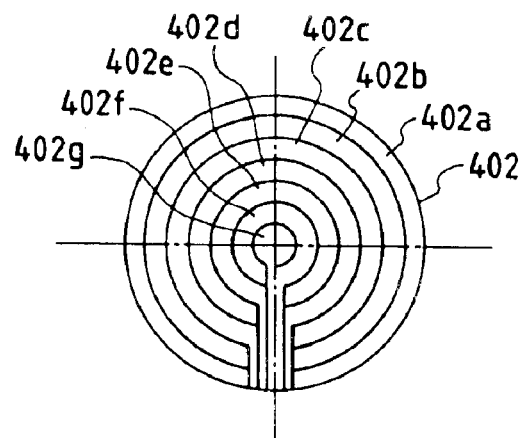
FIG. 45
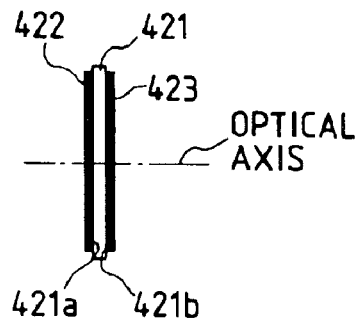
FIG. 46A
FIG. 46B
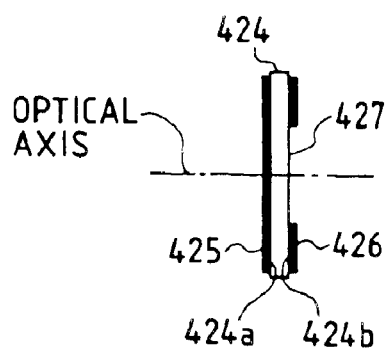
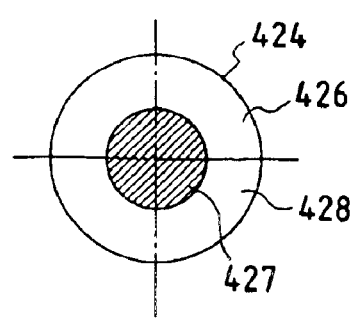

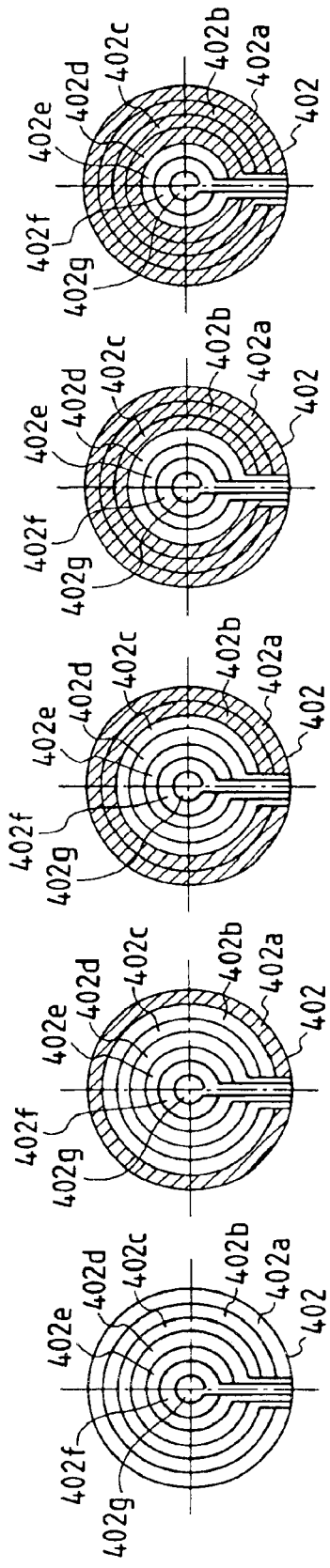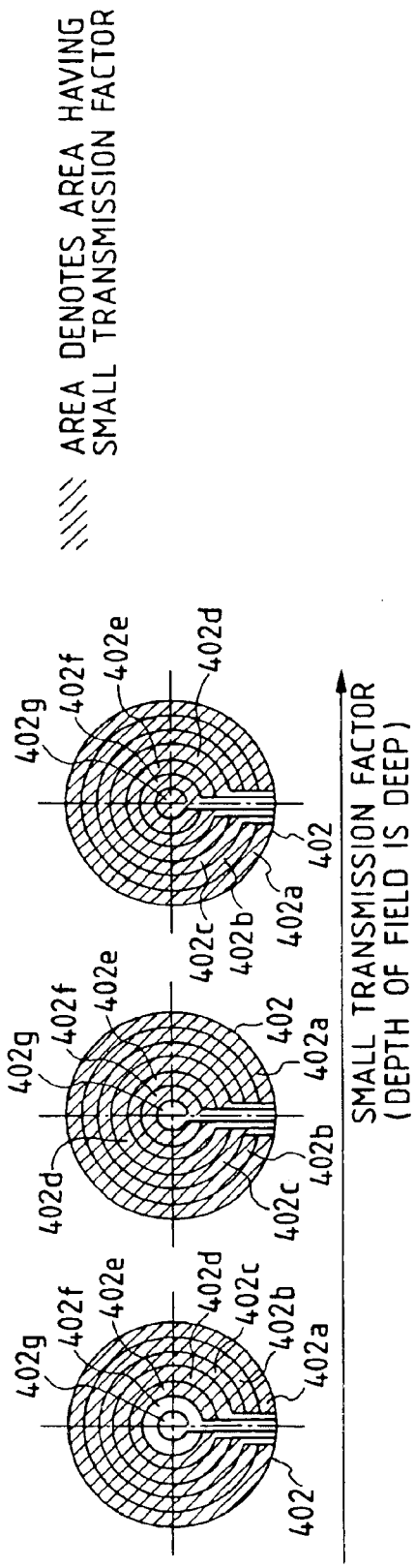

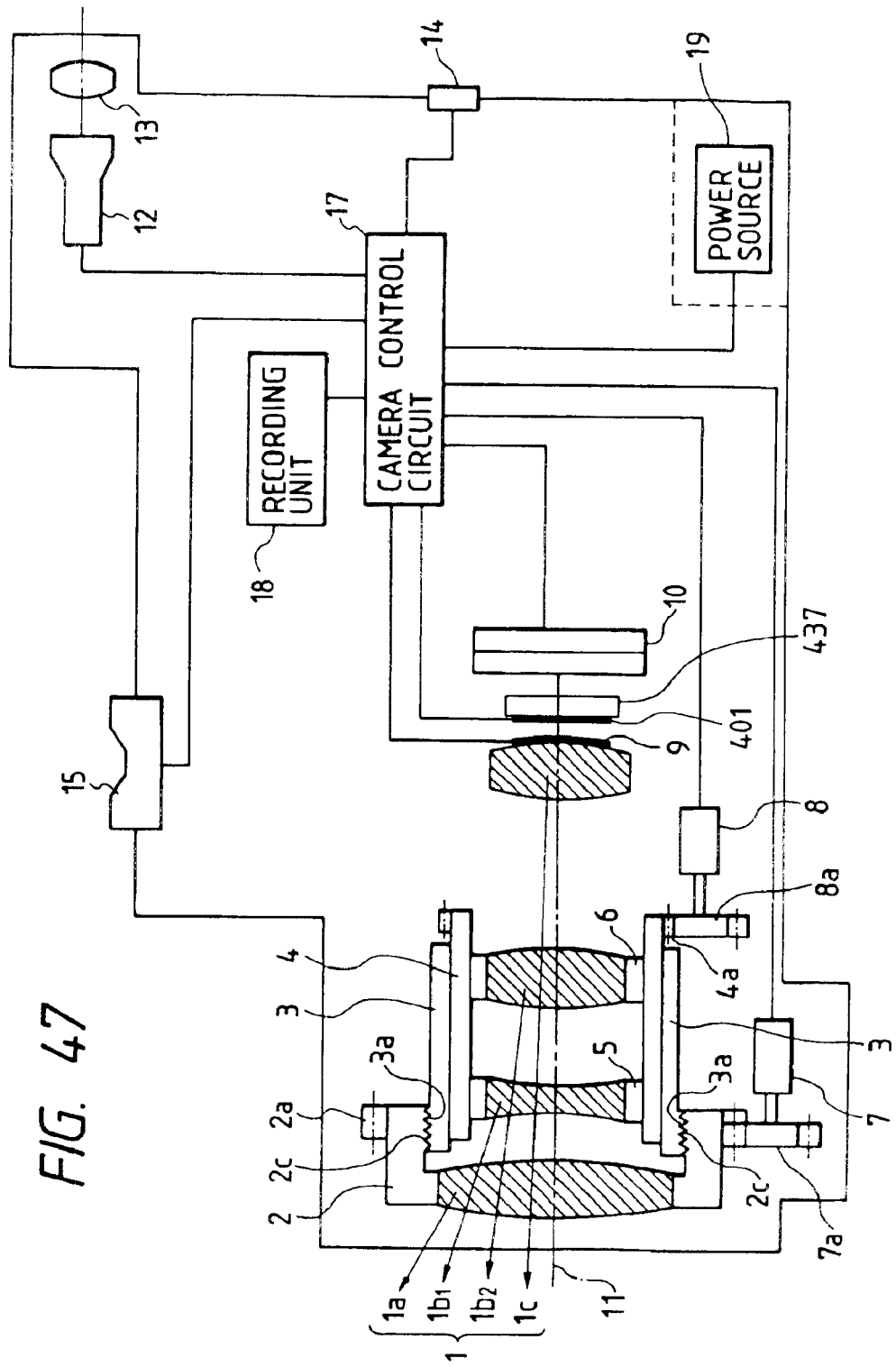

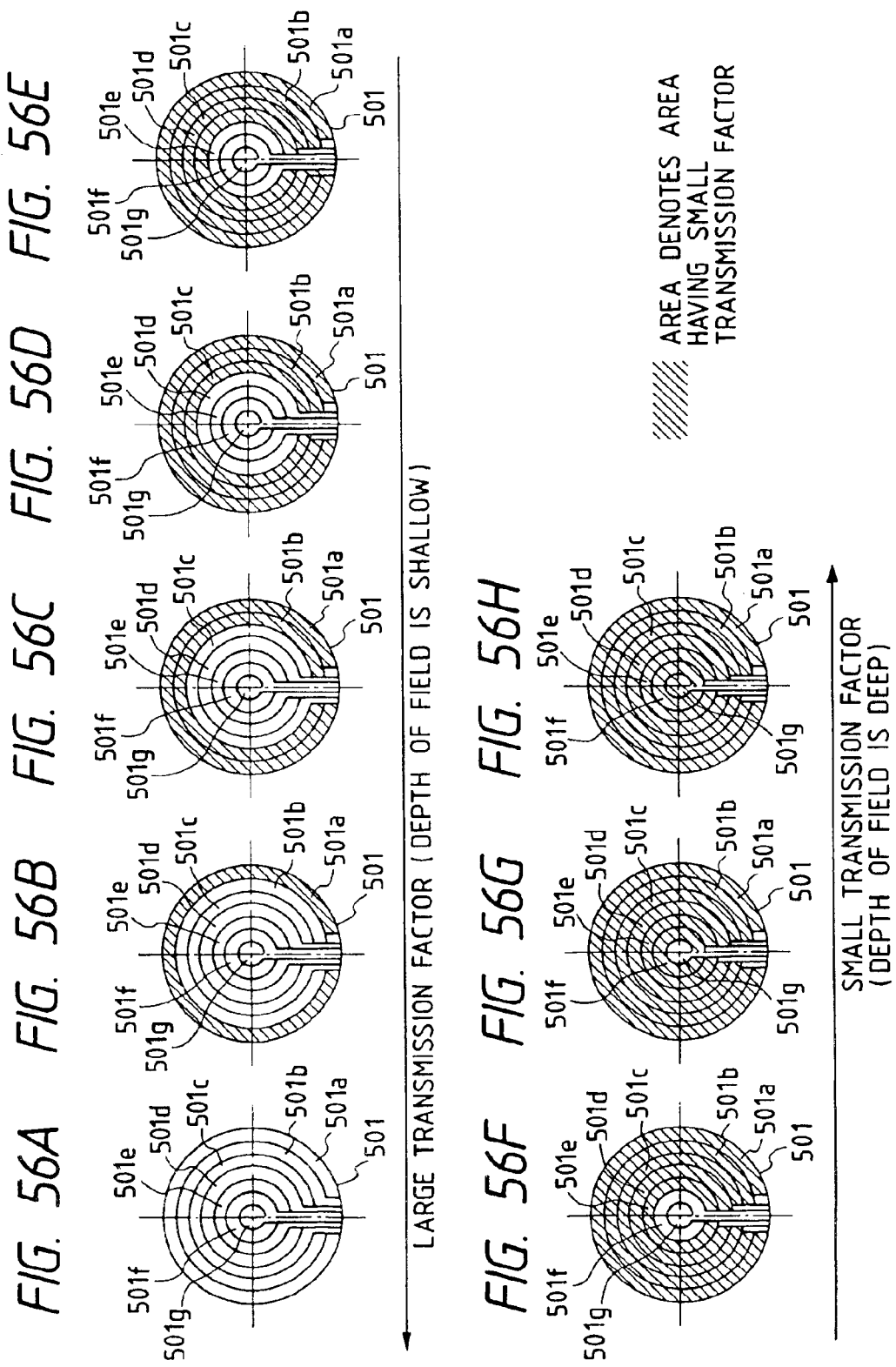

VIDEO CAMERA HAVING A MATERIAL ELEMENT FOR CONTROLLING LIGHT TRANSMISSION

This application is a continuation of application Ser. No. 08/557,376 filed Nov. 13, 1995, which application is a continuation of application Ser. No. 08/094,896 filed Jul. 22, 1993, both now abandoned.

BACKGROUND OF THE INVENTION

1. Field of the Invention

The present invention relates to a video camera for converting an object image imaged by a photographing optical system into an electrical signal using photoelectric conversion means.

2. Description of the Related Art

In recent years, a video camera for converting an object image imaged by a photographing optical system into an electrical signal using a photoelectric conversion element such as a solid-stage image pickup element, e.g., a CCD (charge coupled device), and recording the electrical signal onto a recording medium such as a magnetic tape has become popular. To facilitate ease in use, video cameras are required to have compact structures, and compact video cameras have been developed by means of high-density electrical circuit packages, compact CCDs, compact photographing optical systems, and the like. At the present time, extensive studies continue to be made to realize development of further compact video cameras. For this reason, a further compact photographing optical system is desirable.

The amount of light incident on an image pickup unit of a video camera is adjusted as follows. That is, an iris, which can mechanically adjust its aperture size, is arranged in a photographing optical system, and the aperture size of the iris is adjusted.

However, since such a mechanical iris unit has a large driving motor unit, it is large in comparison to a photographing optical system lens barrel with a compact CCD. This problem frustrates the realization of a compact photographing optical system lens barrel.

It has been proposed that a material element such as a liquid crystal element, an EC (electrochromic) element, or the like be used as an iris or a variable ND (neutral density) filter in place of the mechanical iris unit. However, these material elements still suffer from problems associated with wavelength dependency (spectral transmission factor) of a transmission factor, a small light transmission factor in a complete transmission state, a very narrow transmission factor adjustment range as compared to the above-mentioned mechanical iris, and the like. For these reasons, the material element has not yet been put into practical applications as an iris or a variable ND filter for a photographing optical system.

SUMMARY OF THE INVENTION

The present invention has been made in consideration of the above situation, and has as its object to provide a compact video camera by making a photographing optical system lens barrel compact.

It is another object of the present invention to solve various problems posed upon adjustment of the incident light amount using a material element.

In order to achieve the above objects, according to a preferred embodiment of the present invention, there is disclosed a video camera comprising: a material element, arranged in a photographing optical system, for controlling a light transmission factor or a light transmission amount; photoelectric conversion means for receiving an optical image transmitted through the material element at a position of an imaging plane, and converting the optical image into an electrical image signal; and correction means for correcting light transmission factor wavelength dependency of the material element in accordance with light transmission factor characteristics or light transmission amount characteristics of the material element.

According to the embodiment of the present invention, there is disclosed a video camera, wherein the correction means adjusts a correction amount of the light transmission factor wavelength dependency in accordance with the light transmission factor or the light transmission amount of the material element.

According to the embodiment of the present invention, there is disclosed a video camera, wherein the correction by the correction means is achieved by auto white-balance control for an output signal from the photoelectric conversion means.

According to the embodiment of the present invention, there is disclosed a video camera, wherein the correction by the correction means is achieved by changing a sensitivity of the photoelectric conversion means in accordance with a light wavelength.

According to the embodiment of the present invention, there is disclosed a video camera, wherein the correction by the correction means is achieved by a filter provided to the photographing optical system or the photoelectric conversion means.

According to the embodiment of the present invention, there is disclosed a video camera, wherein the correction by the correction means is achieved by arranging another material element capable of controlling a light transmission factor in the photographing optical system.

According to the embodiment of the present invention, there is disclosed a video camera, wherein the correction means comprises storage means for storing the light transmission factor wavelength dependency of the material element or the correction amount of the light transmission factor wavelength dependency of the material element.

According to the embodiment of the present invention, there is disclosed a video camera, wherein the storage means stores a plurality of light transmission factor wavelength dependencies or a plurality of correction amounts in accordance with the light transmission factor or the light transmission amount of the material element.

In order to achieve the above objects, according to another preferred embodiment of the present invention, there is disclosed a video camera comprising: a material element, arranged in a photographing optical system, for controlling a light transmission factor or a light transmission amount; photoelectric conversion means for receiving an optical image transmitted through the material element at a position of an imaging plane, converting the optical image into an electrical image signal, and capable of adjusting at least one of a light accumulation time and a sensitivity; and exposure amount adjustment means for adjusting the light transmission factor or the light transmission amount of the material element, and at least one of the light accumulation time and the sensitivity of the photoelectric conversion means.

According to the embodiment of the present invention, there is disclosed a video camera, wherein the exposure amount adjustment means electrically adjusts the light transmission factor or the light transmission amount of the material element.

According to the embodiment of the present invention, there is disclosed a video camera, wherein the exposure amount adjustment means adjusts the light transmission factor or the light transmission amount of the material element in accordance with incident light.

According to the embodiment of the present invention, there is disclosed a video camera, wherein the exposure amount adjustment means comprises storage means for storing at least one relationship between the light transmission factor or the light transmission amount of the material element and the light accumulation time or the sensitivity of the photoelectric conversion means.

It is still another object of the present invention to provide a compact video camera by making a photographing optical system lens barrel compact.

It is still another object of the present invention to provide a video camera, which can fully exhibit the performance of an iris adopting a material element which is arranged in a video camera.

Other objects and features of the present invention will become apparent from the following specification and the accompanying drawings.

BRIEF DESCRIPTION OF THE DRAWINGS

FIG. 13 is a graph showing a program line for exposure amount control in the fifth embodiment of the present invention;

FIGS. 43A and 43B are respectively a side view and a front view showing a material element according to the 20th embodiment of the present invention;

FIGS. 44A to 44H are views showing a method of adjusting the transmission factor of the material element;

FIG. 45 is a side view showing a light amount adjustment device according to the 21st embodiment of the present invention;

FIGS. 46A and 46B are respectively a side view and a front view showing a light amount adjustment device according to the 22nd embodiment of the present invention;

FIG. 47 is a schematic sectional view showing main part of a video camera according to the 23rd embodiment of the present invention;

FIGS. 56A to 56H are explanatory views showing a method of adjusting the transmission factor of the material element shown in FIG. 55.

DETAILED DESCRIPTION OF THE PREFERRED EMBODIMENTS

The preferred embodiments of the present invention will be described in detail hereinafter with reference to the accompanying drawings.

(First Embodiment)

Figure 1:
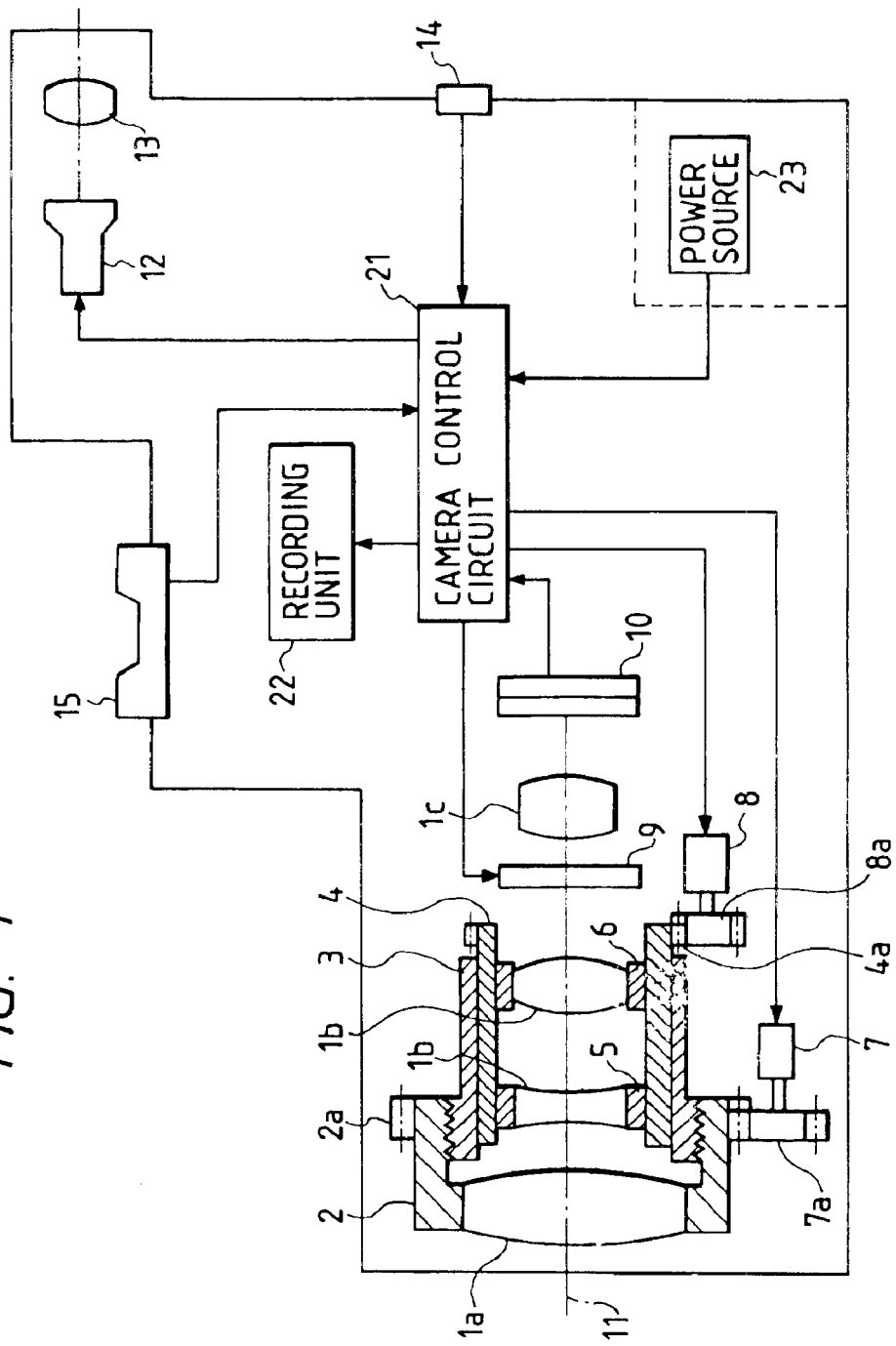
FIG. 1 is a schematic sectional view showing an internal arrangement of a video camera according to the first embodiment of the present invention.
Figure 2:
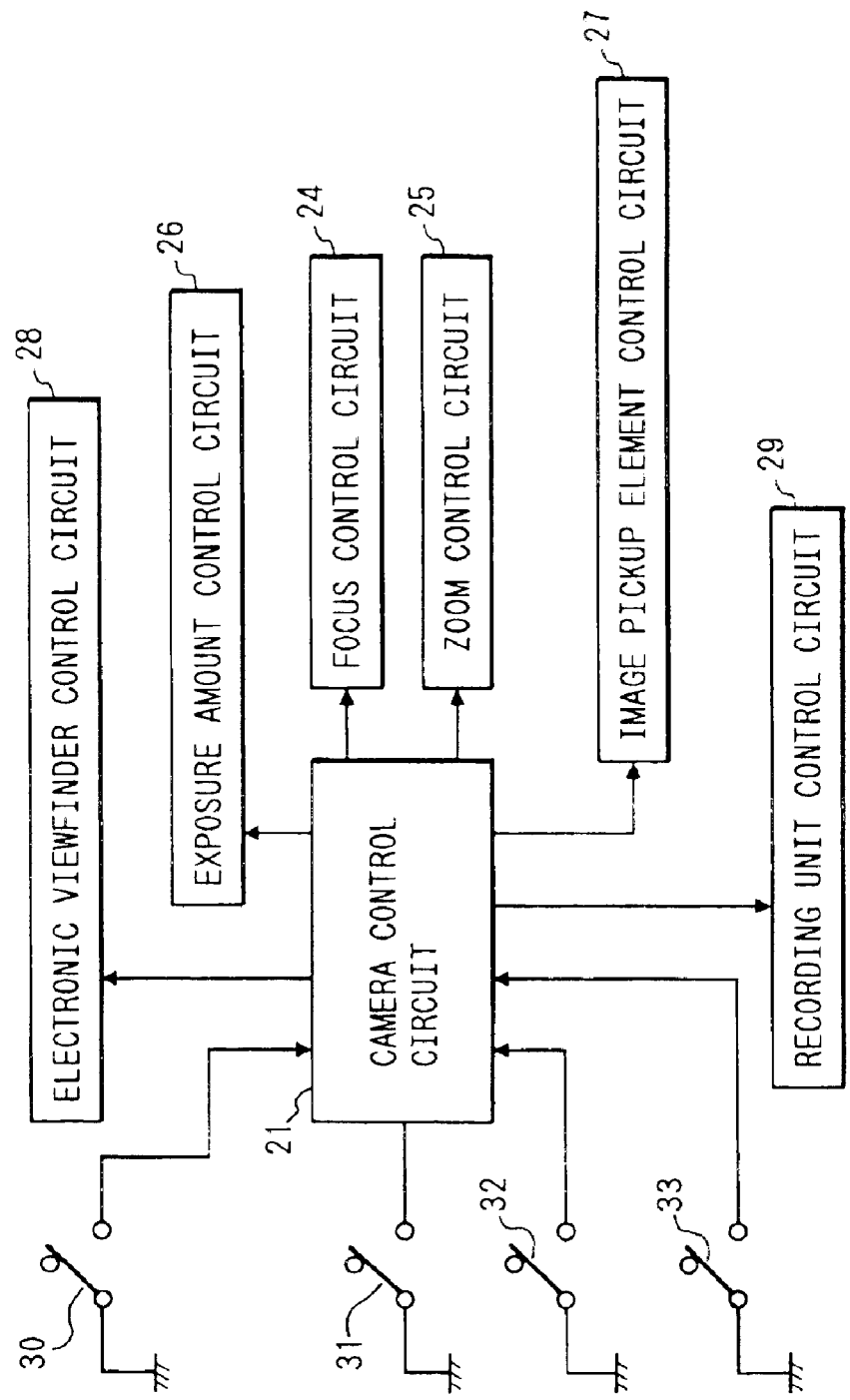
FIG. 2 is a block diagram showing a circuit arrangement according to the first embodiment of the present invention.
Figure 3:
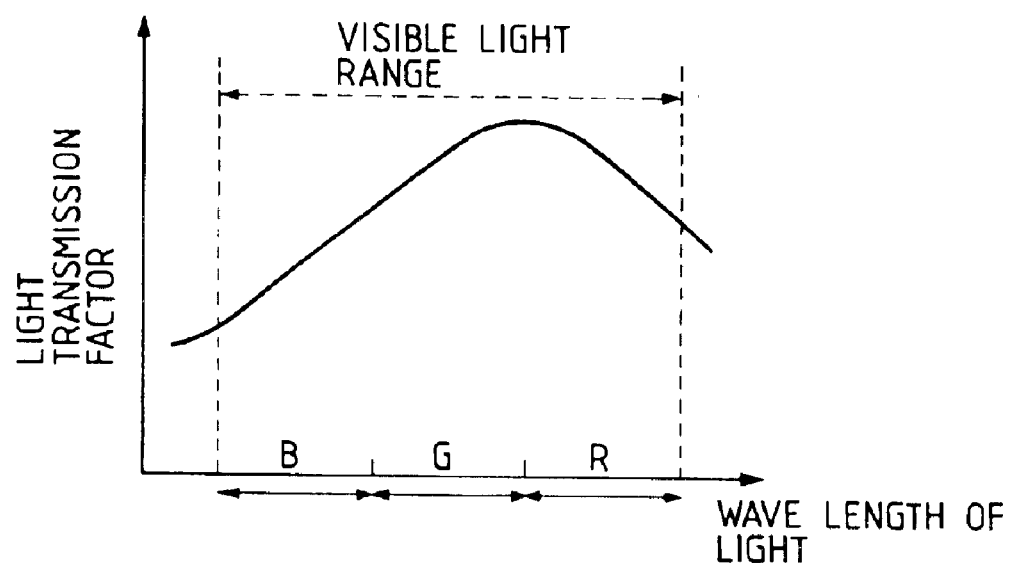
FIG. 3 is a graph showing an example of the light transmission factor wavelength dependency characteristics of a material element shown in FIG. 1.

FIG. 1 shows a schematic arrangement of an internal mechanism of a video camera according to the first embodiment of the present invention, FIG. 2 shows a circuit arrangement of this embodiment, and FIG. 3 shows the light transmission factor wavelength dependency characteristics of a material element used in this embodiment.

Referring to FIG. 1, a photographing optical system is constituted by a focus lens 1a for a focusing operation, a zoom lens 1b, and a stationary lens 1c. The focus lens 1a is held by a cylindrical focus lens holding frame 2, which has a gear portion 2a. A cylindrical stationary portion 3 is fixed to a camera body, and is threadably engaged with the focus lens holding frame 2. A cam cylinder 4 has a cam groove for determining the position of the zoom lens 1b, and is rotatably held by the stationary portion 3. The zoom lens 1b is held by lens frames 5 and 6.

The focus lens holding frame 2 is pivoted by a focus motor 7. A gear 7a is attached to the output shaft of the motor 7, and is meshed with the gear portion 2a of the focus lens holding frame 2. The cam cylinder 4 is pivoted by a zoom motor 8. A gear 8a is attached to the output shaft of the motor 8, and is meshed with a gear portion 4a of the cam cylinder 4.

A material element 9 serving as an iris consists of, e.g., a liquid crystal capable of controlling the light transmission factor. An image pickup element 10 comprises, e.g., a CCD. The photographing optical system has an optical axis 11.

An electronic viewfinder 12 has a lens 13. In addition to the above arrangement, the camera has a power switch 14 and a zoom operation unit 15. The camera also has a camera control circuit 21, and a recording unit 22 and a power source 23, which are electrically connected to the camera control circuit. The camera control circuit 21 is also electrically connected to the focus motor 7, the zoom motor 8, the material element 9, the image pickup element 10, the electronic viewfinder 12, the power switch 14, and the zoom operation unit 15.

As shown in FIG. 2, the camera control circuit 21 is connected to a focus control circuit 24, a zoom control circuit 25, an exposure amount control circuit 26, an image pickup element control circuit 27, an electronic viewfinder control circuit 28, and a recording unit control circuit 29, and is further connected to a photographing switch 30, a main switch 31, and a zoom switch 1 (32) and a zoom switch 2 (33) constituting the zoom operation unit 15.

The material element 9 shown in FIG. 1 comprises a liquid crystal element or an electrochromic element, serves as an iris for limiting the incident light amount, and can electrically control the light transmission factor or amount. Ideally, the material element 9 has a constant light transmission factor regardless of the wavelength of incident light. In general, even when the light transmission factor of the material element is highest, the light transmission factor changes depending on the wavelength of incident light, as shown in FIG. 3. Referring to FIG. 3, R represents a red region, G represents a green region, and B represents a blue region.

For this reason, in this embodiment, in order to avoid a color balance error of an image caused by the material element 9, the white balance is corrected under the control of the camera control circuit 21, as will be described later.

Figure 4:
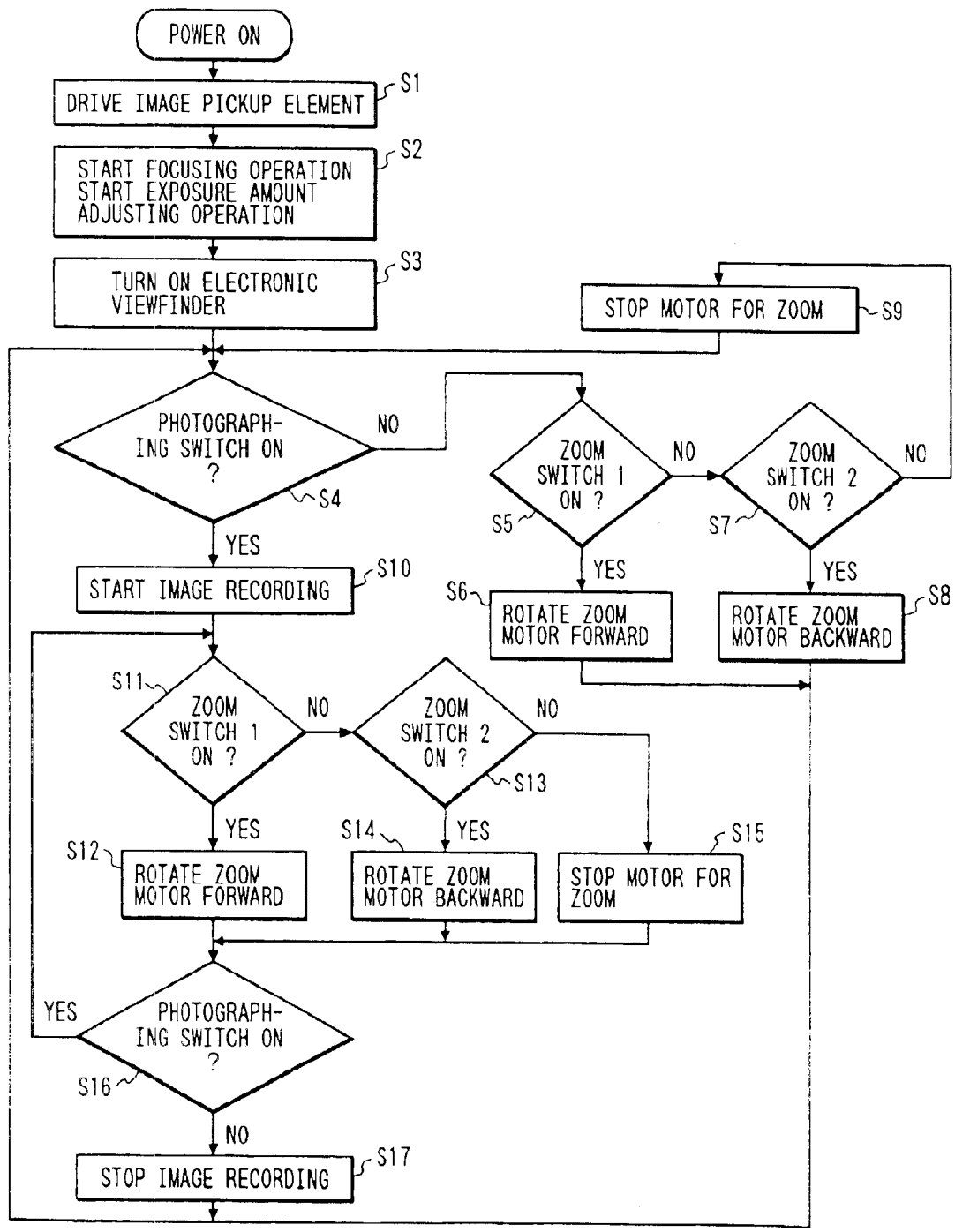
FIG. 4 is a flow chart showing a control operation sequence according to the first embodiment of the present invention.

FIG. 4 is a flow chart showing a control operation to be executed by the camera control circuit 21 of this embodiment. An operation of the first embodiment of the present invention will be described below with reference to this flow chart.

When a photographer operates the power switch 14 of the camera to turn on the power source 23, the image pickup element 10 is driven (step S1) to move the focus lens 1a in the optical axis direction, so that the high-frequency components of a video signal output from the image pickup element 10 become a maximum. In order to move the focus lens 1a, the focus motor 7 is rotated. The gear 7a attached to the motor output shaft is meshed with the gear portion 2a of the focus lens holding frame 2, and the focus lens holding frame 2 is threadably engaged with the stationary portion 3. For this reason, the focus lens 1a is moved in the direction of the optical axis 11 upon rotation of the motor 7. A focusing operation is performed by this lens movement. At the same time, the light transmission factor of the material element 9 is controlled by the exposure amount control circuit, so that the amount of light incident on the image pickup element 10 becomes constant. In this control, as described above, in order to compensate for a color balance error caused by a change in light transmission factor depending on the wavelength of incident light, the white balance is corrected (step S2).

A video signal output from the image pickup element 10 and subjected to predetermined signal processing is displayed on the electronic viewfinder 12, and can be observed by the photographer (step S3) (this state will be referred to as a standby state hereinafter). In this state, when the photographer operates the zoom operation unit 15 (steps S4, S5, and S7), the zoom motor 8 is rotated (steps S6 and S8). More specifically, since the gear 8a is meshed with the gear portion 4a of the cam cylinder 4, the cam cylinder 4 is rotated upon rotation of the motor 8, and the zoom lens 1b is moved along the cam groove of the cam cylinder 4 in the direction of the optical axis 11, thus performing a zoom operation. The zoom operation unit 15 has the zoom switch (1) 32 and the zoom switch (2) 33. When the zoom switch (1) 32 is turned on (closed) (step S5), the zoom motor 8 is rotated forward (step S6), and the zoom lens 1a is moved toward the wide-angle end. On the other hand, when the zoom switch (2) 33 is turned on (step S7), the zoom motor 8 is rotated backward (step S8), and the zoom lens 1b is moved toward the telephoto end. Note that the zoom switches 32 and 33 cannot be simultaneously turned on.

When the photographer depresses a photographing button (not shown) in step S4, the photographing switch 30 is turned on. When the camera control circuit 21 confirms that the photographing switch 30 is turned on (step S4), a photographing (image recording) operation is started (step S10). Thus, a video signal output from the image pickup element 10 is transferred to the recording unit 22 via the camera control circuit 21, and is converted into a signal format suitable for recording via the recording unit control circuit 29. Thereafter, the converted signal is recorded on a recording medium such as an 8-mm video tape. At this time, the above-mentioned focusing operation and exposure amount adjustment are parallelly executed, and the video signal is displayed on the electronic viewfinder 12. The zoom operation is also performed according to an operation of the photographer in the same manner as described above (steps S11 to S15). When the photographer releases the photographing button (not shown), the photographing switch 30 is turned off (open). When the camera control circuit 21 confirms that the photographing switch 30 is turned off (step S16), the image recording operation is stopped (step S17), and the camera returns to the above-mentioned standby state (step S4).

(Second Embodiment)

A circuit arrangement for correcting the light transmission factor wavelength dependency of a material element using a white-balance adjustment circuit will be described below.

As described above, when the material element is inserted in the photographing optical path, the color balance changes depending on the wavelength dependency of the light transmission factor, and is corrected by a white-balance adjustment circuit. In this case, if the wavelength dependency of the light transmission factor of the material element is always-constant, the change in color balance can be reliably corrected by the operation of the white-balance circuit.

However, when the wavelength dependency of the light transmission factor of the material element changes depending on the light transmission factor or temperature, flexible control is required.

Figure 5:
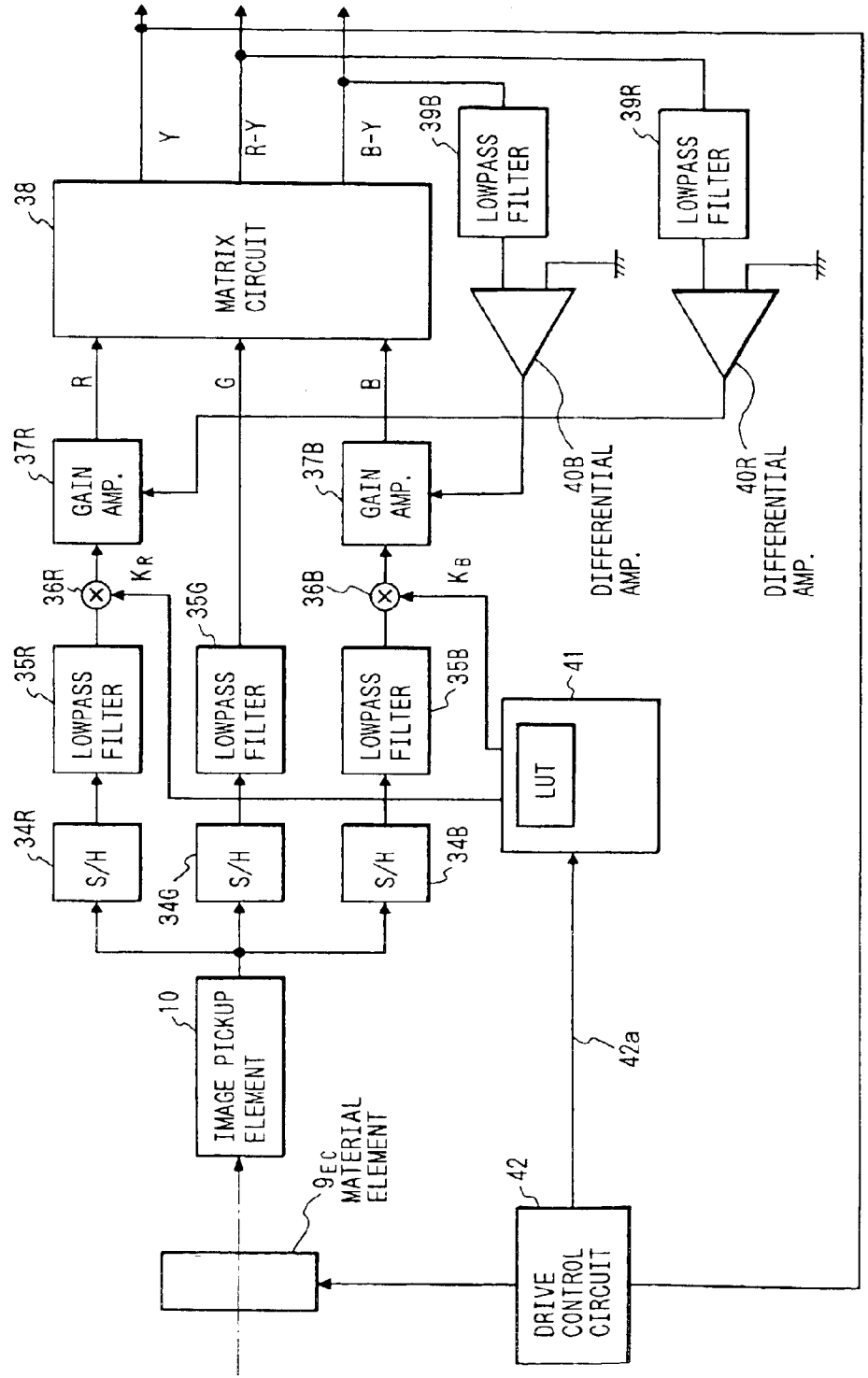
FIG. 5 is a block diagram showing a light transmission factor wavelength dependency correction circuit using a white-balance circuit according to the first embodiment of the present invention.
Figure 6:
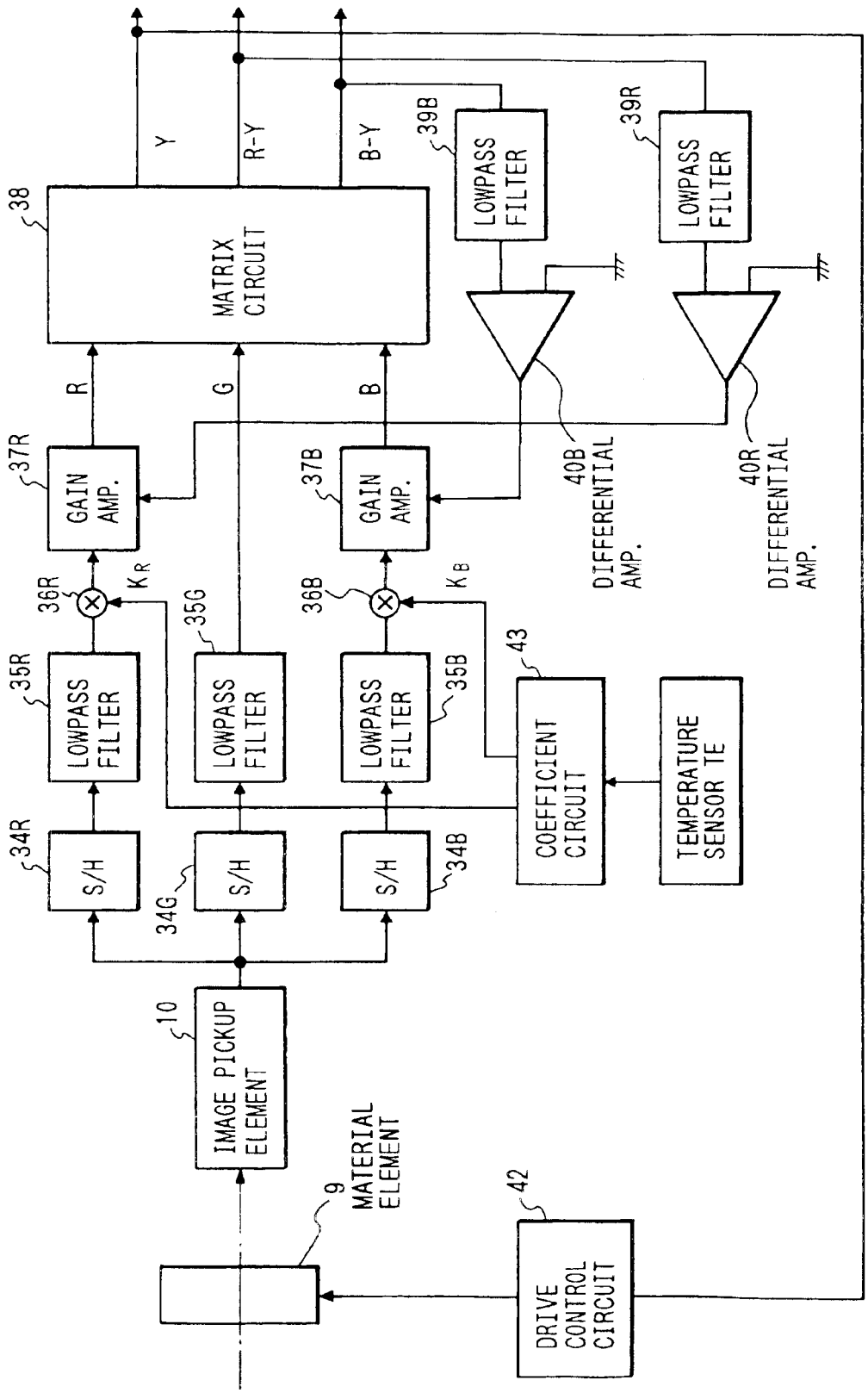
FIG. 6 is a block diagram showing a correction circuit for correcting the light transmittance factor wavelength dependency of a material element due to a change in temperature according to the second embodiment of the present invention.

FIG. 5 shows a white-balance adjustment circuit for a case wherein the wavelength dependency of the light transmission factor of the material element changes depending on the light transmission factor, i.e., a voltage applied to the material element (in, e.g., an EC element, the wavelength dependency changes according to its light transmission factor, i.e., an applied voltage), and FIG. 6 shows a white-balance adjustment circuit for a case wherein the wavelength dependency of the light transmission factor of the material element changes depending on a change in temperature. These white-balance adjustment circuits will be described below.

FIG. 5 is a block diagram showing an arrangement of the white-balance adjustment circuit for performing white-balance adjustment on the basis of an image pickup signal output from the image pickup element 10. This circuit is arranged in the camera control circuit 21.

Referring to FIG. 5, a light beam transmitted through the material element as an iris for controlling the incident light amount is incident on the image pickup element 10, and is photoelectrically converted into an image pickup signal to be output. Image pickup signals time-serially output from the image pickup element are sampled and held by sample-hold circuits 34R, 34G, and 34B in accordance with the pixel arrangements of color filters of the image pickup element. R, G, and B components extracted by the sample-hold circuits 34R, 34G, and 34B are respectively smoothed by lowpass filters 35R, 35G, and 35B.

The R, G, and B signals respectively output from the lowpass filters 35R, 35G, and 35B are subjected to predetermined signal processing by a matrix circuit 38, and are respectively output as a luminance signal Y, and color difference signals R-Y and B-Y. These signals are supplied to a camera process circuit (not shown).

Multipliers 36R and 36B and gain control amplifiers 37R and 37B for varying gains are arranged at the output sides of the lowpass filters 35R and 35B. The R-Y signal and the B-Y signal output from the matrix circuit 38 are smoothed by lowpass filters 39R and 39B, and are supplied to differential amplifiers 40R and 40B. The gain control amplifiers 37R and 37B are controlled by the outputs from the differential amplifiers 40R and 40B, thereby changing gains.

In this operation, the gain control amplifiers are controlled, so that the levels of the R-Y and B-Y signals become 0, thereby automatically executing white-balance adjustment.

The Y signal is supplied to a drive control circuit for controlling the transmission factor of the material element, and the transmission factor of the material element is controlled, so that an average value of the levels of the Y signal becomes a predetermined value. This operation itself corresponds to a so-called auto-iris operation.

In the characteristic arrangement of this embodiment, a correction circuit 41 comprising a look-up table LUT, which stores the relationship between the transmission factors of the material element and the wavelengths, i.e., the transmission factors corresponding to colors, is arranged. Light transmission factor information 42a of the material element 9 is referred to, and correction coefficients according to a change in transmission factor in units of colors corresponding to the transmission factor are obtained with reference to the LUT. The correction coefficients are supplied to the multipliers 36R and 36B, and are multiplied with the R and B signals, thereby canceling a change in wavelength dependency according to the light transmission factor of the material element.

Figure 10:
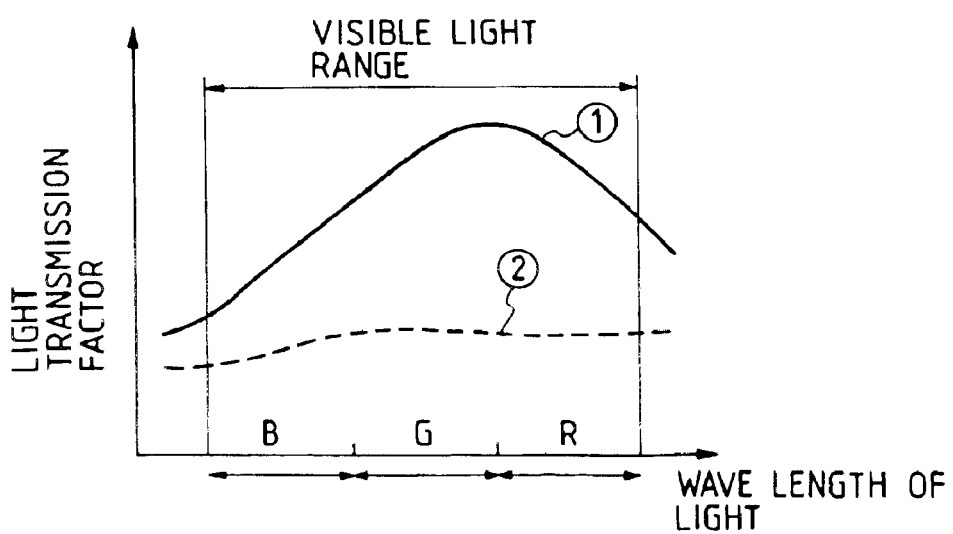
FIG. 10 is a graph showing another example of the light transmission factor wavelength dependency characteristics of a material element which can be applied to the first embodiment of the present invention.

More specifically, when the light transmission factor is changed by changing a voltage to be applied to the material element so as to control the incident light amount, no problem is posed if transmission factors in units of wavelengths, i.e., colors, are balanced. However, in practice, the balance of transmission factors in units of colors changes depending on the light transmission factor, as shown in FIG. 10 (to be described later).

If such a change is merely corrected by a normal operation of the white-balance circuit, a change in color balance caused by a change in transmission factor of the material element cannot be discriminated from a change in color balance caused by a change in color temperature of an object field to be photographed while the transmission factor of the material element remains unchanged. Thus, when the color temperature of the object field changes, a wrong color correction is made. For example, even when the color of the object field changes, this change is corrected, and a color different from an actual color is undesirably recorded.

In order to solve this problem, in this embodiment, as for wavelength dependency caused by a change in light transmission factor of the material element, the transmission factor dependency characteristics of wavelengths according to the transmission factors of the material element are prestored in the LUT in the form of correction coefficients, correction coefficients in units of wavelengths according to the transmission factor of the material element at that time are read out, and are supplied to the multipliers 36R and 36B. The R and B signals are respectively multiplied with the readout correction coefficients to achieve correction, so that the balance of changes in transmission factors at the respective wavelengths is left unchanged even when the transmission factor of the material element changes. More specifically, even when the transmission factor of the material element changes in FIG. 10, wavelength dependency characteristics ② can be maintained constant.

With this arrangement, an auto-iris apparatus using the material element can be realized without disturbing a normal white-balance operation.

(Third Embodiment)

FIG. 6 shows a white-balance adjustment circuit considering a case wherein the wavelength dependency of the light transmission factor of the material element changes depending on a change in temperature. The arrangement shown in FIG. 6 is basically the same as that shown in the block diagram of FIG. 5, except that correction coefficients to be supplied to the multipliers 36R and 36B are those for correcting the light transmission factor dependency of wavelengths in correspondence with a change in temperature, and are stored in a coefficient circuit 43 in the form of an LUT. The correction coefficients are referred to in accordance with an output from a temperature sensor TE, the correction coefficients corresponding to the detected temperature are read out from the coefficient circuit, and are supplied to the multipliers 36R and 36B, thereby correcting a change in color balance caused by a change in temperature.

In this case as well, correction according to a change in temperature is performed outside a feedback loop for white-balance control, and temperature compensation can be performed without influencing a normal white-balance adjustment operation.

(Fourth Embodiment)

Figure 7:
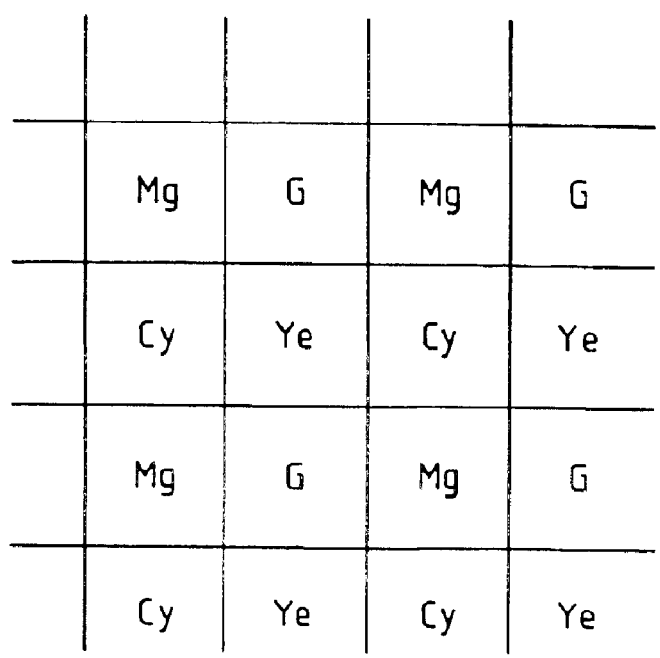
FIG. 7 is an explanatory view showing a color filter arrangement of a color filter of an image pickup element shown in FIG. 1.

In the first and second embodiments described above, the light transmission factor wavelength dependency of the material element 9 is corrected by white-balance adjustment. This correction may be performed using a color filter of the image pickup element 10 in place of the white-balance adjustment. FIG. 7 shows an arrangement of the color filter of the image pickup element 10. This color filter is constituted by Mg (magenta), Cy (cyan), Ye (yellow), and G (green) filters. When the material element 9 has the light transmission factor wavelength dependency shown in FIG. 3, the light transmission factor of a blue region (B) is smaller than those of a red region (R) and a green region (G), and the light transmission factors of the red region (R) and the green region (G) are almost equal to each other.

For this reason, when the light transmission factors of the cyan filter (Cy) and the magenta filter (Mg) shown in FIG. 7 are set to be larger than those of the yellow filter (Ye) and the green filter (G), the light transmission amounts of the respective wavelength regions can be corrected to be almost uniform at the position of the image pickup element 10.

At this time, when the areas of the cyan filter (Cy) and the magenta filter (Mg) are set to be larger than those of the yellow filter (Ye) and the green filter (G), the light transmission amounts of the respective wavelength regions can be corrected as well.

Alternatively, the light transmission factor wavelength dependency of the material element 9 may be corrected by changing the sensitivity levels of pixels of the image pickup element 10 corresponding to the respective filter portions. If the material element has characteristics different from those shown in FIG. 3, the light transmission factor wavelength dependency of the material element 9 can be corrected by adjusting the transmission factors or areas of the color filter, or the sensitivity levels of the image pickup element 10.

Figure 8:
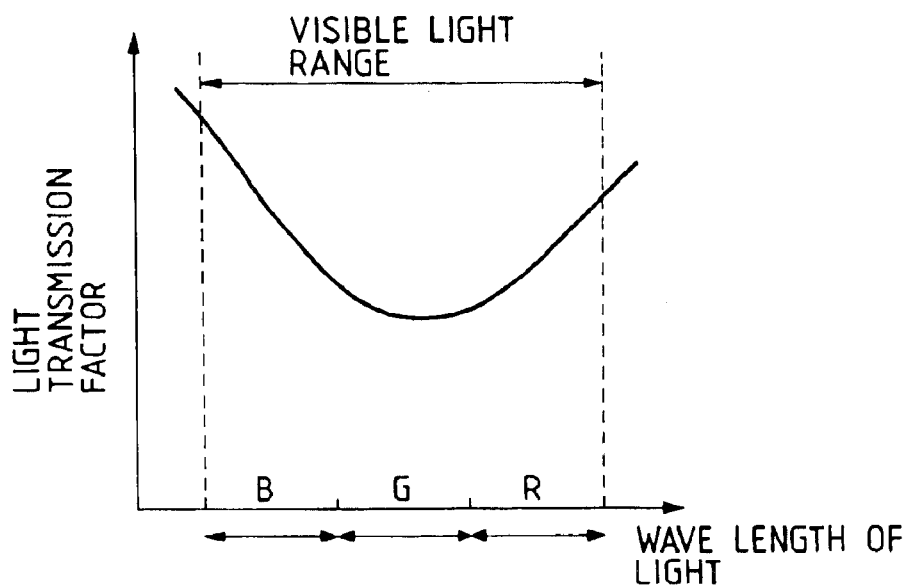
FIG. 8 is a graph showing the light transmission factor wavelength dependency characteristics of another material element or a filter in the fourth embodiment of the present invention.
Figure 9:
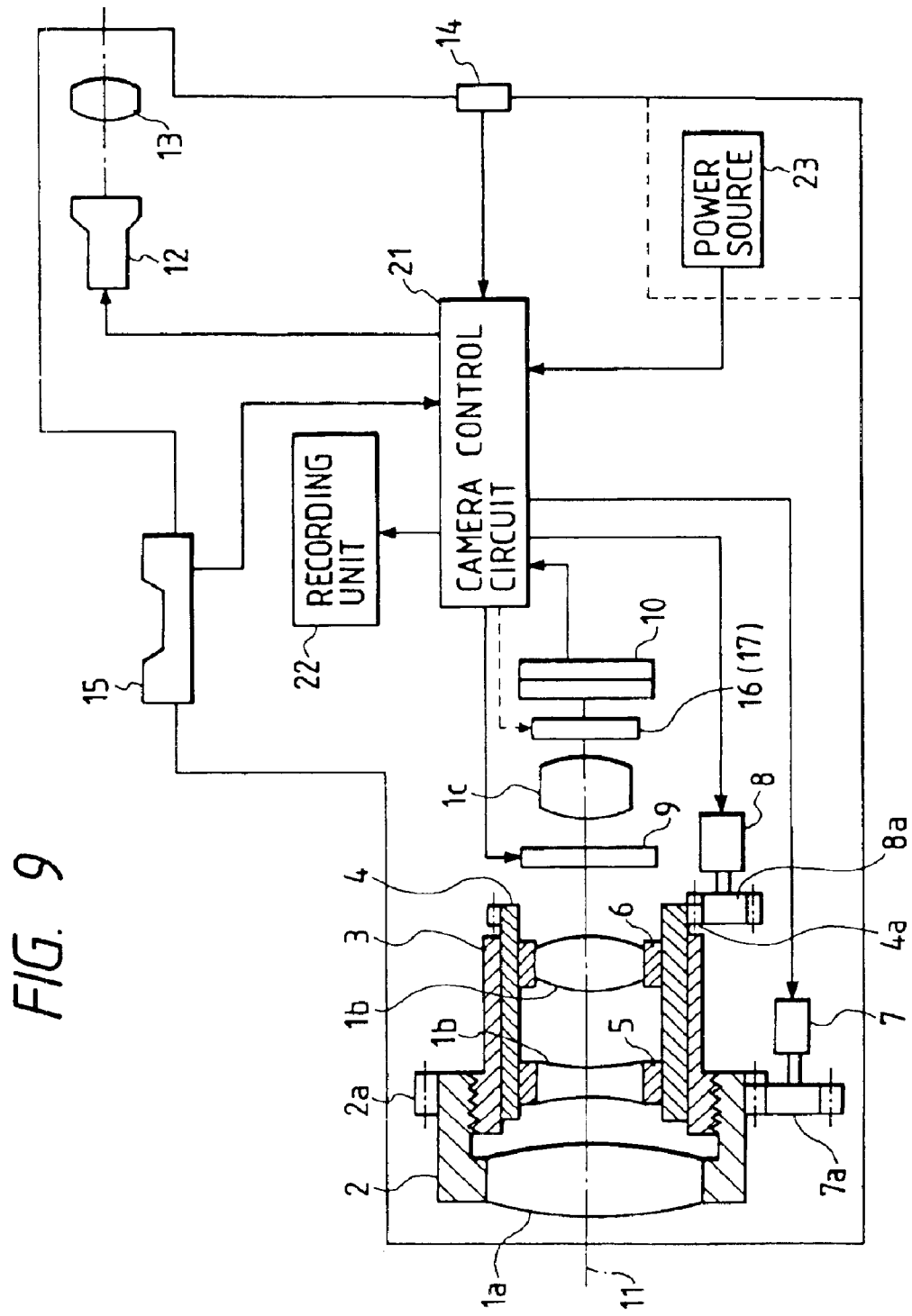
FIG. 9 is a schematic sectional view showing an internal arrangement of a video camera according to a modification of the fourth embodiment of the present invention.

In addition, when the material element 9 has the characteristics shown in FIG. 3, light transmission factor wavelength dependency of the material element 9 can be corrected by combining the element 9 with a correction filter 16 or another material element 17 having opposite characteristics shown in FIG. 8. The correction filter 16 or the other material element 17 may be arranged at a position different from the material element 9, as shown in FIG. 9, or may be arranged at the same position as the material element 9, or may be arranged together with the image pickup element 10 or the color filter.

When the transmission factor of the material element 9 is decreased, if the light transmission factor wavelength dependency characteristics change, as shown in, e.g., FIG. 10 (in the case of, e.g., an EC element), such a change may be corrected by the other material element 17 described above. Note that a curve ① in FIG. 10 represents characteristics in a maximum transmission state, and a broken curve ② represents characteristics in a minimum transmission state.

A storage circuit, which stores the light transmission factor wavelength dependency of the material element shown in FIG. 3 or its correction amounts, may be arranged, and the light transmission factor wavelength dependency of the material element may be corrected by the above-mentioned method (e.g., white-balance adjustment) using, e.g., the light transmission factor or amount of the material element or the amount of light incident on the photographing optical system.

When the light transmission factor wavelength dependency of the material element changes depending on the light transmission factor or amount of the material element, as shown in FIG. 10, a storage circuit, which stores a plurality of light transmission wavelength dependency characteristics in respective light transmission states (states with various light transmission factors or amounts) or corresponding correction amounts of the light transmission factor wavelength dependency characteristics, may be arranged.

Thus, the light transmission factor wavelength dependency of the material element in each light transmission state may be corrected by the above-mentioned method (e.g., white-balance adjustment) using, e.g., the light transmission factor or amount of the material element or the amount of light incident on the photographing optical system.

As the material element 9 or 17, a material element whose light transmission factor decreases as the intensity of incident light increases may be used in place of an element for electrically controlling the light transmission factor.

The above embodiments and their modifications may be applied not only to a movie video camera but also to a still video camera.

(Fifth Embodiment)

Figure 11:
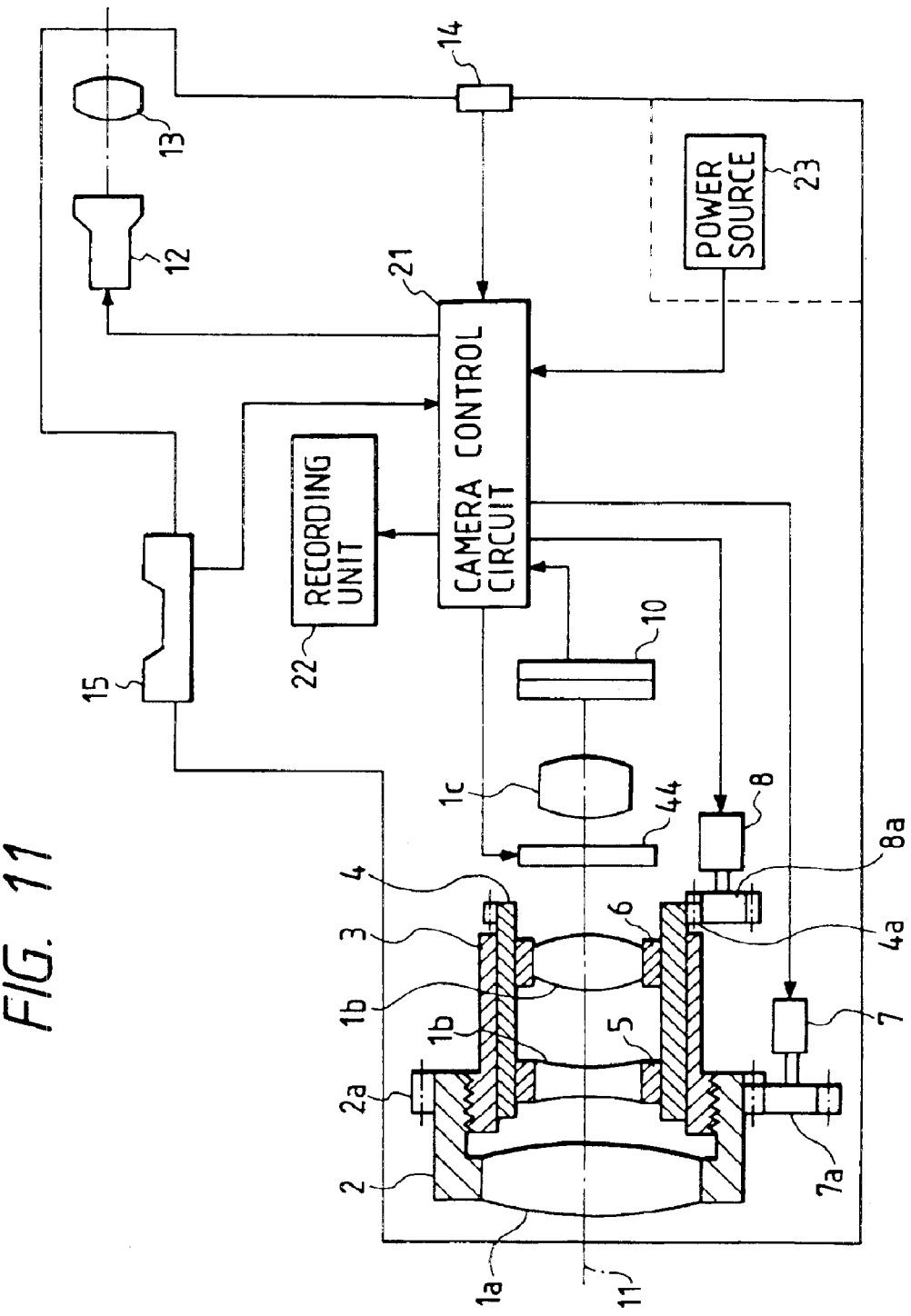
FIG. 11 is a schematic sectional view showing an internal arrangement of a video camera according to the fifth embodiment of the present invention.
Figure 12:
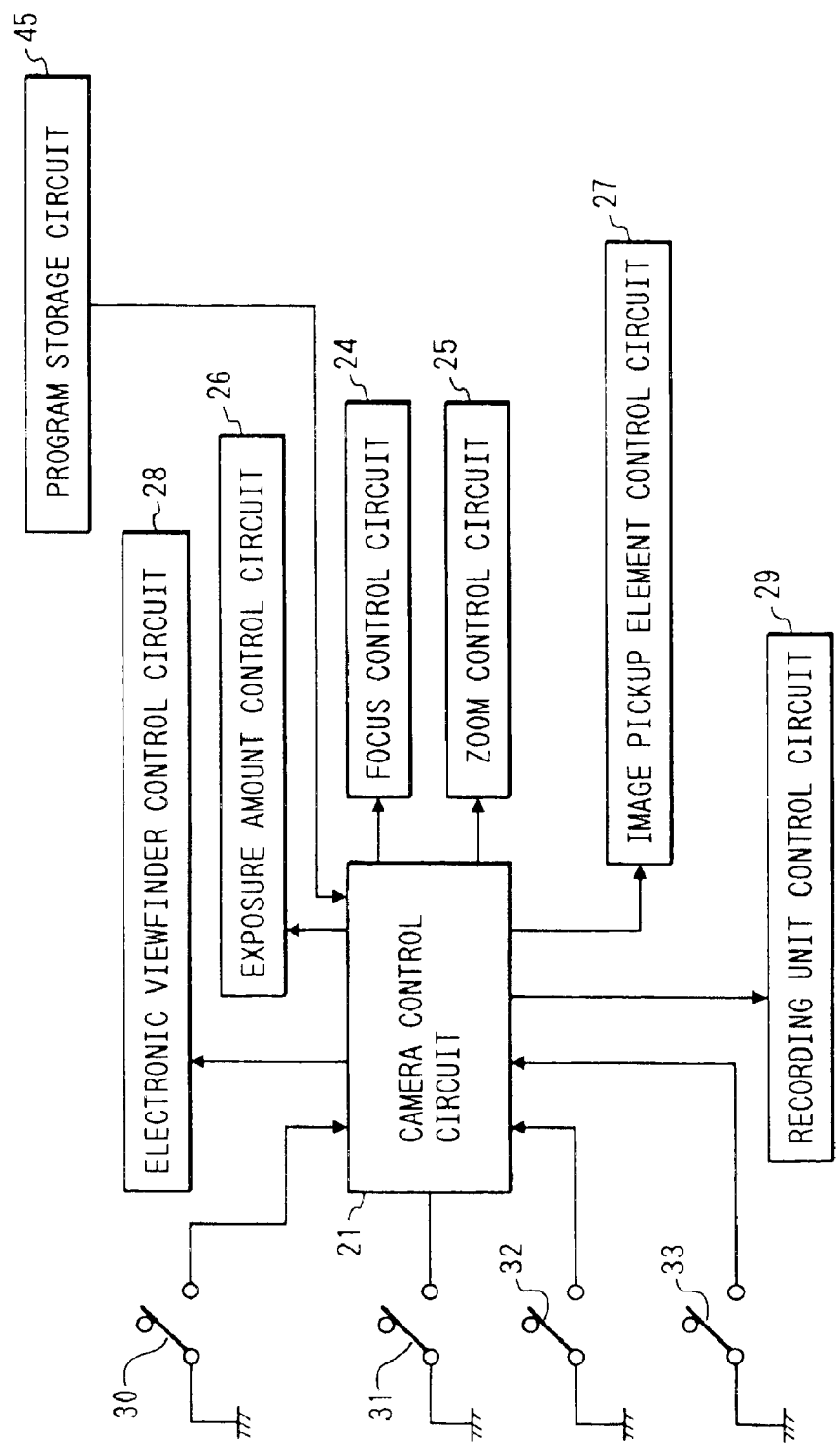
FIG. 12 is a block diagram showing a circuit arrangement according to the fifth embodiment of the present invention.

The fifth embodiment of the present invention will be described below. FIG. 11 shows a schematic arrangement of an internal mechanism of a video camera according to the fifth embodiment of the present invention, and FIG. 12 shows a circuit arrangement of this embodiment. Referring to FIG. 11, the video camera has a material element 44, and the image pickup element 10 such as a CCD having a light accumulation time adjustment function (a so-called shutter function). The material element 44 is prepared by forming a transient metal oxide film ($IrO_x$, $Ta_2O_5$, $WO_3$, or the like) on the surface of a glass plate, and can control the light transmission factor or amount of the film by applying a voltage to the film. This film is known to those who are skilled in the art. Referring to FIG. 12, a program storage circuit 45 stores a program used by the camera control circuit 21. Other arrangements are the same as those in the first embodiment of the present invention shown in FIGS. 1 and 2, and a detailed description thereof will be omitted.

FIG. 13 shows the content of a control program stored in the program storage circuit. In order to achieve optimal exposure on the image pickup element 10, the camera control circuit 21 performs control according to a program line shown in FIG. 13 stored in the program storage circuit 45. More specifically, the camera control circuit 21 causes the exposure amount control circuit 26 to control the light transmission factor or amount of the material element 44, so that the amount of light to be incident on the image pickup element 10 becomes constant. When incident light is too strong to control the incident light amount by the material element alone, the light transmission factor amount of the material element 44 is set to be a minimum value, and a high-speed shutter operation is realized using the shutter function of the image pickup element 10, thus achieving suitable exposure.

Figure 14B:
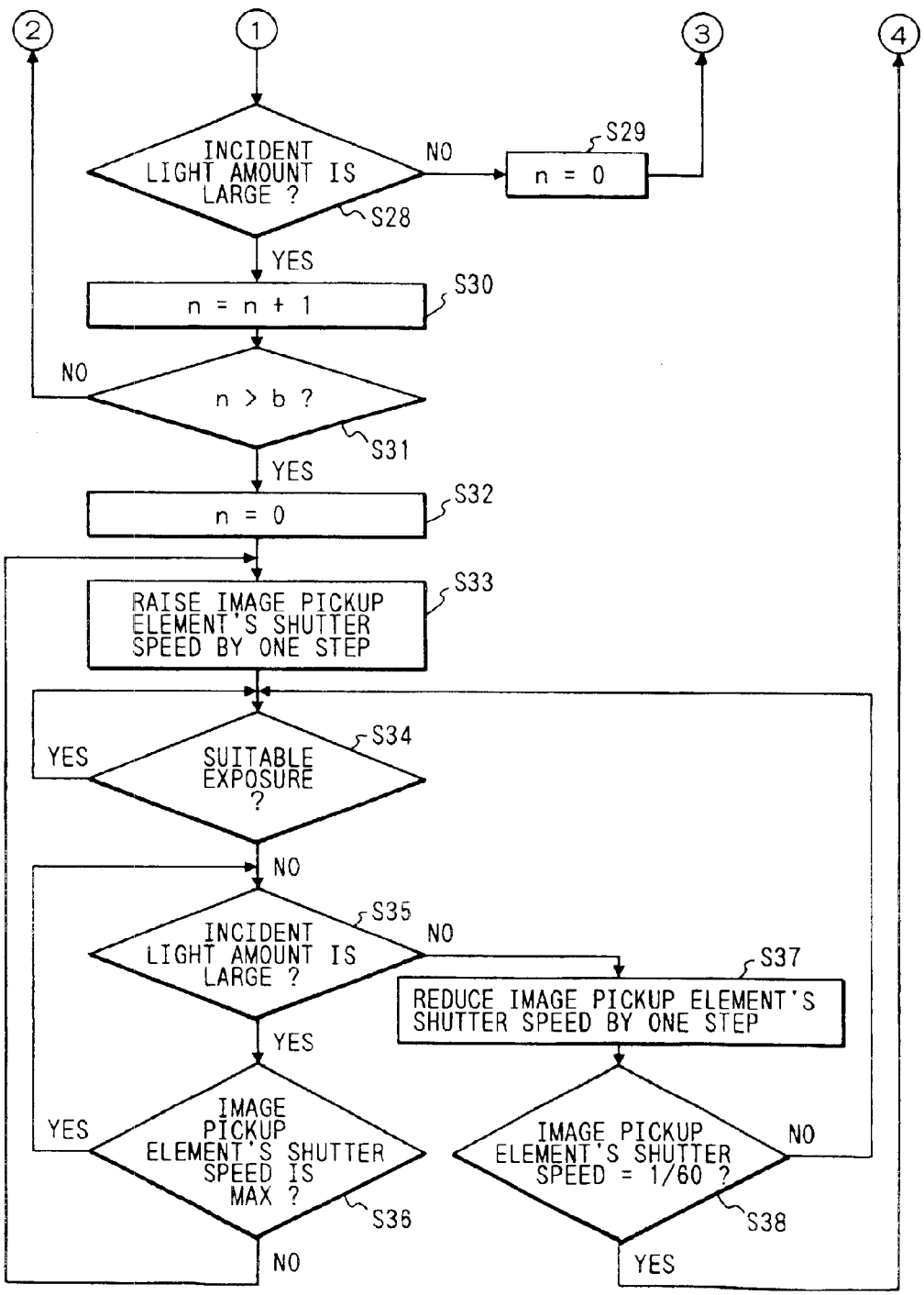
FIG. 14 is comprised of FIGS. 14A and 14B are flow charts showing a control sequence of exposure amount control in the fifth embodiment of the present invention.

The exposure amount control sequence of the image pickup element 10 will be described below with reference to the flow charts shown in FIGS. 14A and 14B. In a state wherein the incident light amount is adjusted by the above-mentioned material element 44 (steps S21 and S22), if the incident light amount increases (step S23), the camera control circuit 21 applies a voltage to the material element 44 to decrease the light transmission factor of the material element 44 (steps S24 and S25). However, when the incident light amount does not greatly change or when the incident light amount increases even if the voltage is applied to the material element 44 for a predetermined period of time (steps S26 to S31), the camera control circuit 21 determines that the incident light amount cannot be controlled by the material element 44 alone. The camera control circuit 21 increases the shutter speed using the shutter function of the image pickup element 10 (steps S32 and S33), thus obtaining suitable exposure (step S34).

(Modification of Fifth Embodiment)

In addition, the same effect as that obtained by adjusting the exposure amount can be obtained by adjusting the sensitivity of the image pickup element 10 in place of adjusting the light accumulation time of the image pickup element 10. If a material element whose light transmission factor decreases as the intensity of incident light increases is used in place of the material element 44 whose light transmission factor is controlled by a voltage, the exposure amount control can be achieved by controlling only the light accumulation time or the sensitivity of the image pickup element 10, thus simplifying control. With this arrangement, the exposure amount control circuit 26 and the program storage circuit 45 can be omitted, and exposure amount control can be achieved by the image pickup element control circuit 27 alone. As the material element 44, a material element whose light transmission factor changes according to both a voltage and incident light intensity may be used or a liquid crystal element may be used. In addition, the fifth embodiment of the present invention can be applied not only to a movie camera but also to a still video camera.

As described above, according to the above-mentioned embodiments, since the light transmission factor wavelength dependency of the material element can be corrected, the material element can be used in place of an iris for mechanically adjusting an aperture portion of the photographing optical system. For this reason, since a drive unit for the iris for mechanically adjusting the aperture portion can be omitted, a compact photographing optical system lens barrel, i.e., a compact video camera can be provided.

Similarly, since the exposure amount of the video camera can be adjusted by the material element and the electronic shutter function of the image pickup element or sensitivity adjustment of the image pickup element in place of an iris for mechanically adjusting the aperture portion of the photographing optical system, a motor unit for the iris for mechanically adjusting the aperture portion can be omitted.

(Sixth Embodiment)

The sixth embodiment of the present invention will be described below.

In each of the above embodiments, a change in light transmission factor according to the wavelength occurring when a material element such as a liquid crystal or EC element is used as an iris is corrected by white-balance adjustment, a color filter, or the like. The embodiment to be described below is achieved to improve an iris function obtained when a material iris is arranged in a video camera.

More specifically, a video camera for converting an object image imaged by a photographing optical system into an electrical signal using a photoelectric conversion element such as a CCD (charge coupled device), and recording the electrical signal onto a recording medium such as a magnetic tape has become popular. In view of ease in use, video cameras are required to have compact structures, and compact video cameras have been developed by means of high-density electrical circuit packages, compact CCDs, compact photographing optical systems, and the like. The iris of such a video camera photographing optical system adjusts the aperture portion area of the iris by an aperture blade prepared by adhering an ND filter to a portion of the aperture portion, and another aperture blade.

In order to meet the demand for a further compact video camera, the photographing optical system need be rendered further compact. However, since the above-mentioned mechanical iris unit for adjusting the aperture area has a large motor unit, it is large in comparison to a photographing optical system lens barrel with a compact CCD. A problem associated with a compact iris unit disturbs realization of a compact photographing optical system lens barrel.

Therefore, attempts have been made to omit a drive unit for the conventional iris unit and to make the photographing optical system lens barrel compact by using a material element such as a liquid crystal element, an EC (electrochromic) element, or the like in place of the mechanical iris unit. Furthermore, it is required to make the material element compact, and to hold the material element in the photographing optical system lens barrel as easily as possible.

On the other hand, the video camera including the conventional mechanical iris unit suffers from the following problems.

More specifically, in an optical system having a small full-open aperture size, even if an ND filter is adhered to an aperture blade, the influence of diffraction appears near a small aperture state. Also, in the iris unit in which an ND filter is adhered to a blade portion, an out-of-focus image by the iris deteriorates.

This embodiment has been made to provide a video camera which can solve the above-mentioned problems. In this video camera, since a material element capable of controlling the light transmission factor is provided to an optical element of a photographing optical system, no special frame for mounting the material element is required. Therefore, the size of the video camera can be prevented from being increased. Both the material element and the conventional mechanical iris unit are used commonly, thus eliminating the influence of diffraction.

This embodiment of the present invention will be described below with reference to the accompanying drawings.

Figure 15:
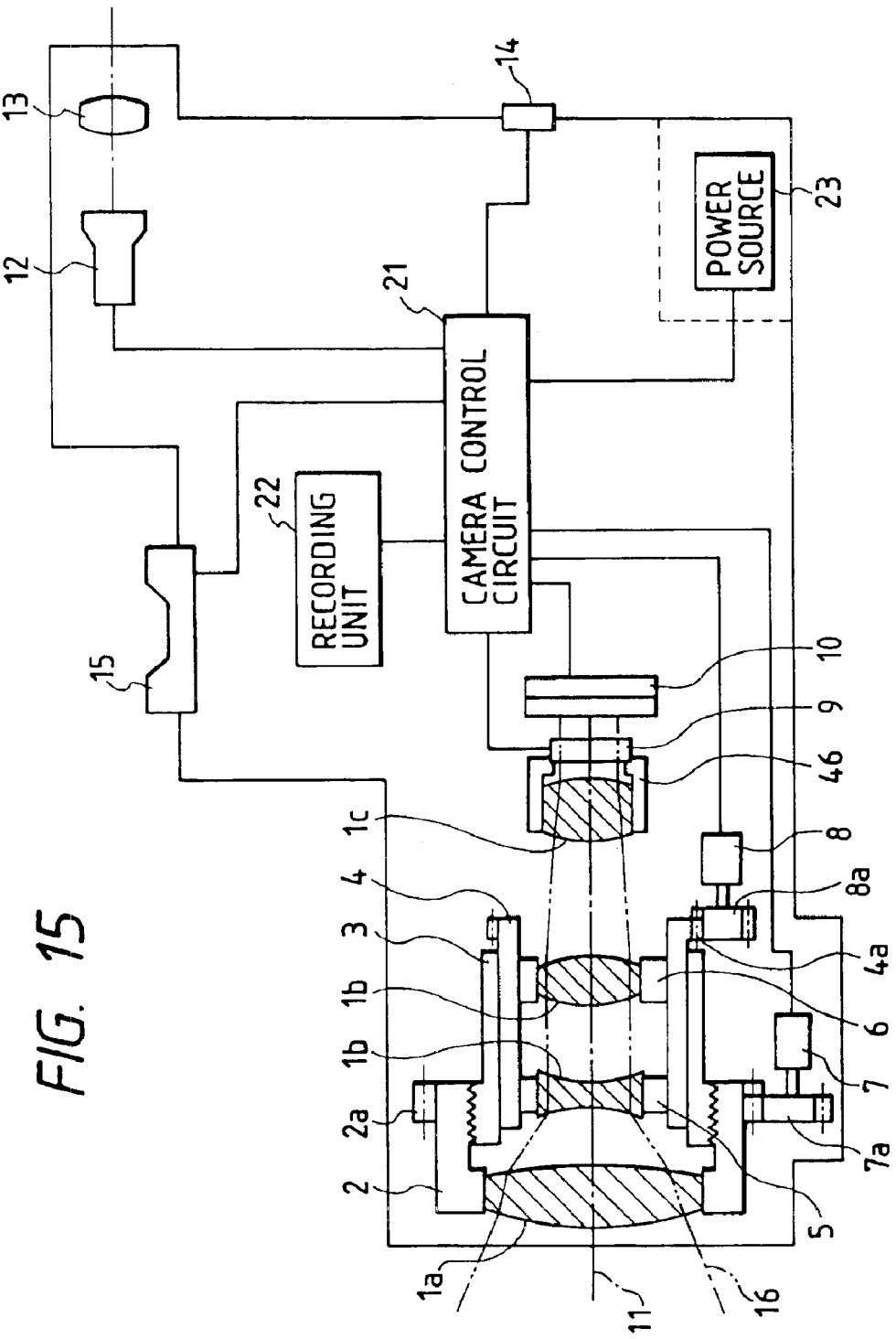
FIG. 15 is a block diagram showing a video camera according to the sixth embodiment of the present invention.

FIG. 15 is a schematic view showing an arrangement of a video camera according to the sixth embodiment of the present invention.

Referring to FIG. 15, a focus lens 1a, a zoom lens 1b, and a stationary lens 1c constitute a photographing optical system. Note that the same reference numerals in FIG. 15 denote the same parts as in FIG. 1, and a detailed description thereof will be omitted. A material element 9 such as a liquid crystal element capable of adjusting the transmission light amount is arranged between a lens, closest to the image pickup plane side, of the photographing optical system, and the image pickup plane of the image pickup element 10. If at least one of optical systems arranged adjacent to the material element is a stationary optical system (in this embodiment, an optical system at the object side of the material element is the stationary optical system), the material element 9 can be held by a holding lens barrel 46 for holding the stationary optical system, i.e., the stationary lens 1c. Thus, the material element can be easily held. The camera control circuit is electrically connected to the focus motor 7, the zoom motor 8, the material element 9, the image pickup element 10, the electronic viewfinder 12, the power switch 14, and the zoom operation unit 15, and controls these units. The focus lens 1a receives an effective light beam 16. Since the circuit connections of the video camera are the same as those in FIG. 2, and the operation control of the entire video camera is the same as that shown in the flow chart of FIG. 4, a detailed description thereof will be omitted.

In this embodiment, the material element 9 is held by the holding lens barrel 46 for the stationary lens 1c. When the material element is arranged at a position adjacent to the stationary optical system, it can be easily held by the holding lens barrel for the stationary optical system without arranging any special holding member.

Also, when the material element is arranged at a position adjacent to an optical lowpass filter or an image pickup element, the material element can be easily held by a holding member for the optical lowpass filter or the image pickup element.

However, when the material element is arranged adjacent to, e.g., the stationary optical system, if the material element undesirably becomes large in size, the material element may be arranged at a position where its two surfaces are adjacent to movable optical systems or may be held by a movable optical system holding lens barrel.

(Seventh Embodiment)

Figure 16:
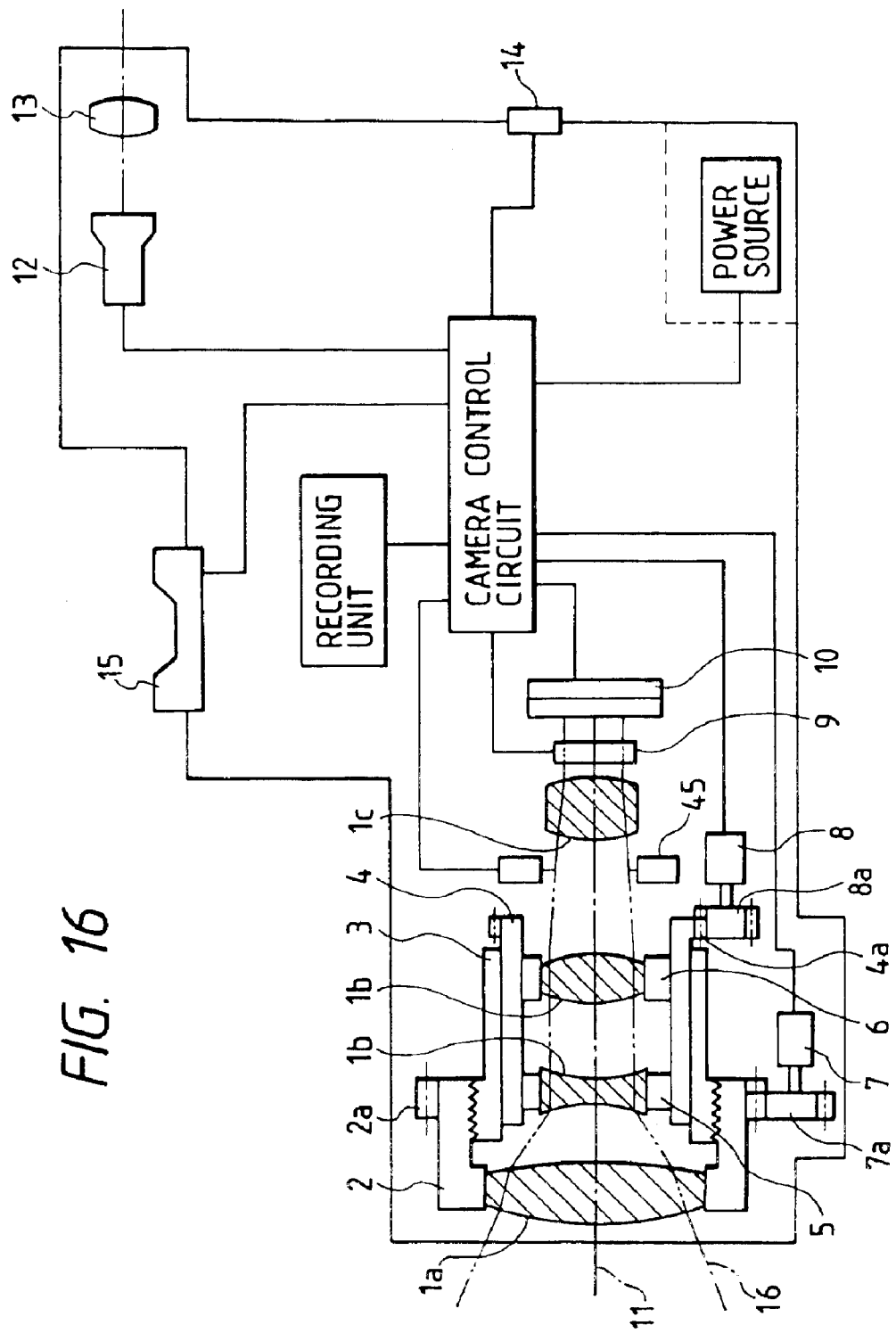
FIG. 16 is a block diagram showing a video camera according to the seventh embodiment of the present invention.

FIG. 16 is a schematic sectional view of a video camera according to the seventh embodiment of the present invention. The same reference numerals in FIG. 16 denote the same parts as in FIG. 15, and a detailed description thereof will be omitted. This embodiment is characterized in that an iris unit 45 for mechanically changing the aperture area using aperture blades is arranged in addition to the material element 9 arranged in front of the image pickup element 10. Since this embodiment is arranged to decrease the light transmission factor of the material element 9 in the small aperture state of the iris unit 45, an image pickup operation of a high-luminance object can be realized without arranging any ND filter to the aperture blades of the iris unit 45. Thus, the influence of diffraction can be eliminated, and an image including a good out-of-focus image by the iris can be obtained.

(Eighth Embodiment)

A video camera according to the eighth embodiment of the present invention will be described below with reference to FIG. 17. The same reference numerals in FIG. 17 denote the same parts as in FIG. 15, and a detailed description thereof will be omitted unless otherwise specified.

Figure 17:
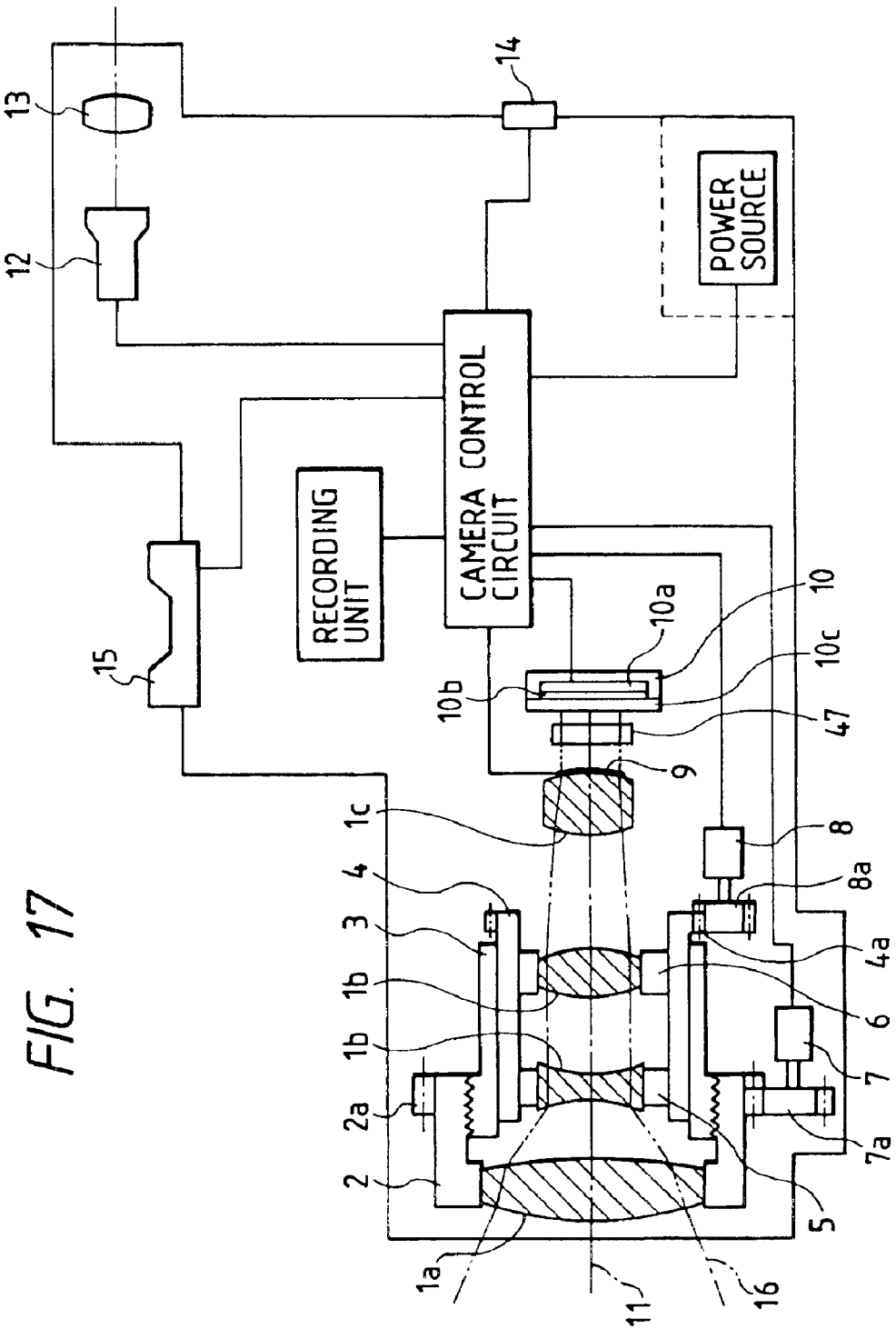
FIG. 17 is a block diagram showing a video camera according to the eighth embodiment of the present invention.

Referring to FIG. 17, a material element 9 such as an electrochromic (EC) element, which can adjust the transmission light amount by adjusting the density, is adhered to the stationary lens 1c.

The material element 9 used in this embodiment is also prepared by forming a transient metal oxide film ($IrO_x$, $Ta_2O_5$, $WO_3$, or the like) on the surface of a glass plate, and can control the light transmission amount of the film by applying a voltage to the film.

An image pickup element 10 such as a CCD has an image pickup portion 10a, a color filter 10b, and a protection glass 10c. An optical lowpass filter 47 is arranged in front of the image pickup element 10.

Note that the arrangements and operations of various control circuits of the video camera of this embodiment are the same as those in the above embodiment, and an illustration of the circuit arrangement and a description of the operations will be omitted.

The material element 9 may be formed on any of lenses of the photographing optical system. For example, when the photographing optical system includes a reflection mirror, the material element may be formed on the reflection surface of the reflection mirror.

(Ninth to 11th Embodiments)

Figure 18:
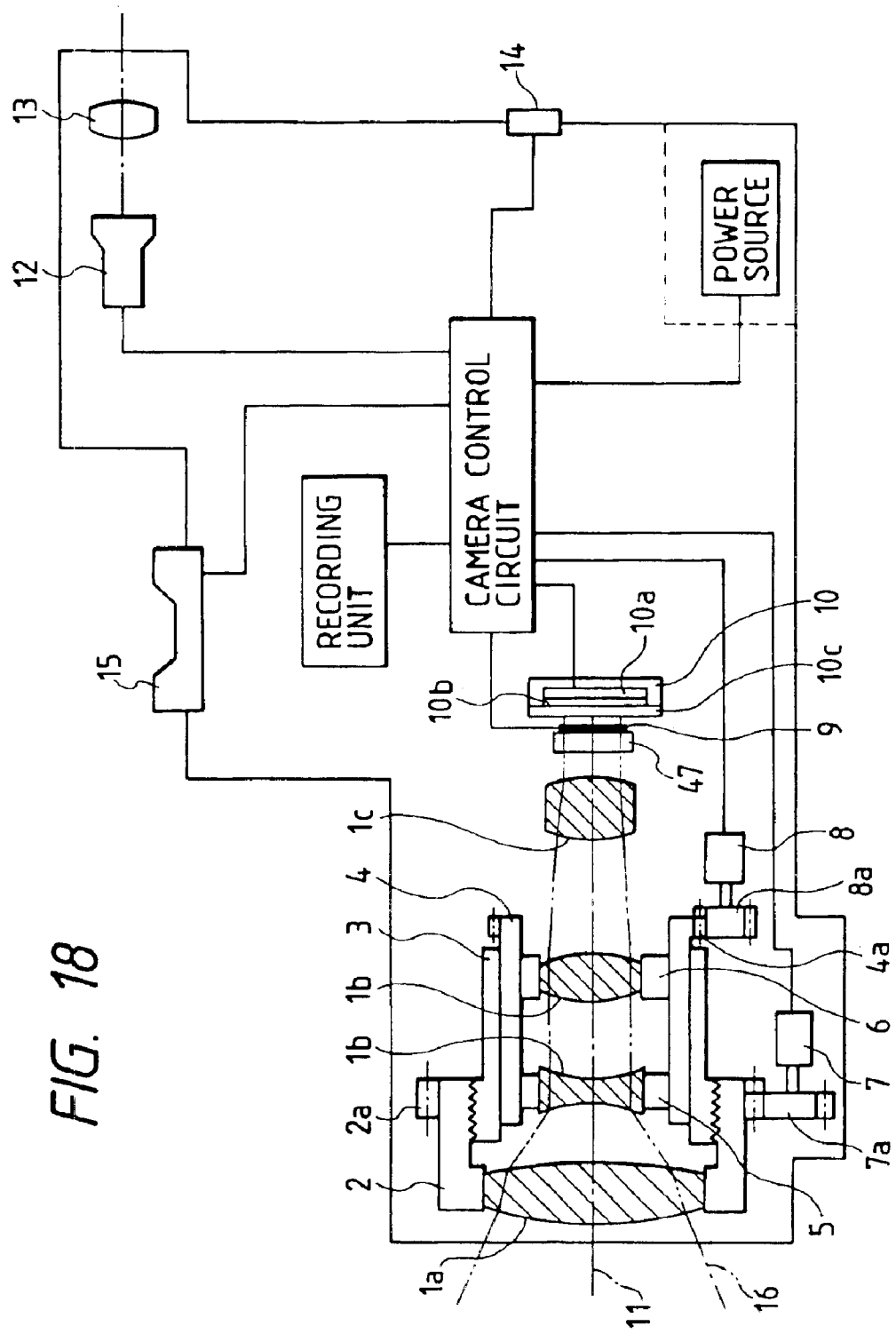
FIG. 18 is a block diagram showing a video camera according to the ninth embodiment of the present invention.

FIG. 18 shows the ninth embodiment wherein the material element 9 is formed on the rear surface of the optical lowpass filter 47.

Figure 19:
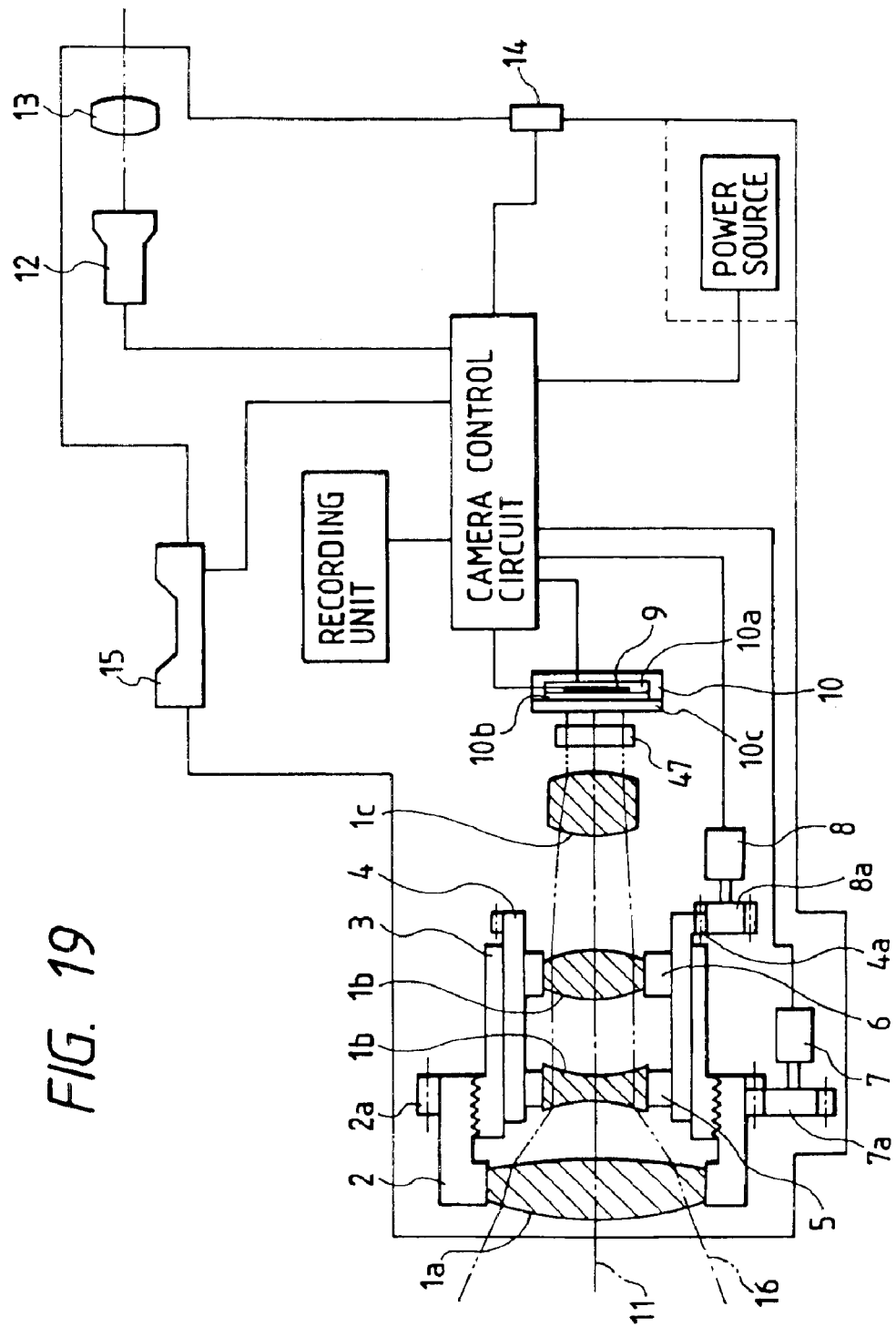
FIG. 19 is a block diagram showing a video camera according to the 10th embodiment of the present invention.

FIG. 19 shows the 10th embodiment wherein the material element 9 is formed on the color filter 10b of the image pickup element 10.

Figure 20:
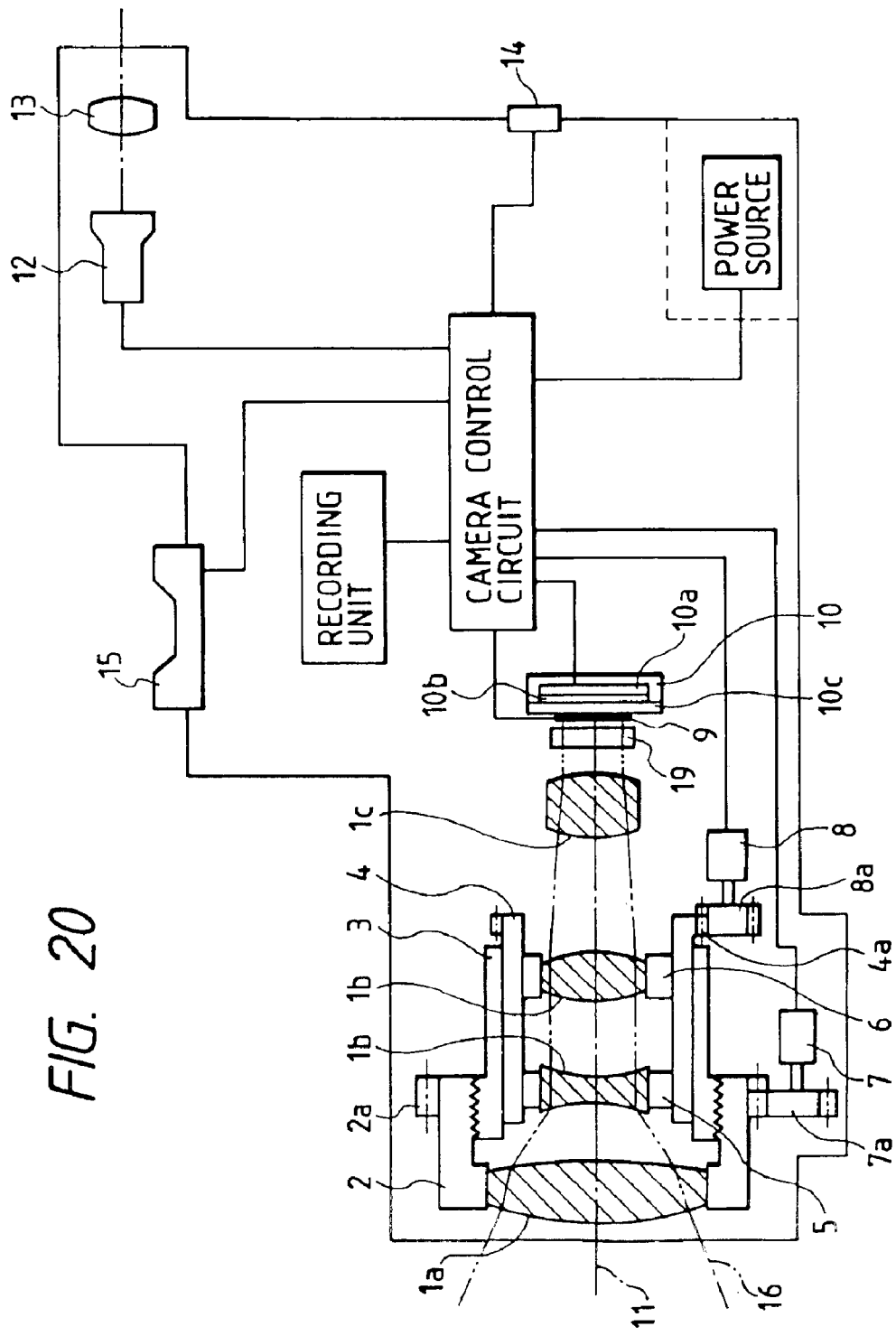
FIG. 20 is a block diagram showing a video camera according to the 11th embodiment of the present invention.

FIG. 20 shows the 11th embodiment wherein the material element 9 is formed on the protection glass 10c of the image pickup element 10.

According to these embodiments, since the material element capable of controlling the light transmission factor is arranged at or near a position corresponding to the minimum effective light beam diameter of the photographing optical system, the material element can be rendered compact, and its cost can be reduced.

Since the material element capable of controlling the light transmission factor is arranged on the lens surface of the photographing optical system, the optical low pass filter, an optical member of the image pickup element, or the like, the material element can be rendered compact, its cost can be reduced, and the material element can be easily held. In addition, electrical wiring to the material element can be simplified.

When the material element is arranged at a position adjacent to the stationary optical system or the filter, the material element can be easily held by the holding member for the stationary optical system or the filter.

When both the iris for mechanically adjusting the aperture area using aperture blades and the material element are used, an optical system lens barrel which can eliminate deterioration of image quality caused by diffraction, and which can provide a good out-of-focus image by the iris, can be provided.

(12th Embodiment)

The 12th embodiment of the present invention will be described below.

In recent years, cameras, each of which extracts some light beams from a photographing optical system, guides the extracted light beams onto a photoelectric conversion element such as a CCD, and performs an auto-focus (AF) operation, an auto-exposure (AE) operation, and the like, have become popular.

In view of ease in use, such a camera is required to be rendered compact, and compact cameras have been developed by means of high-density electrical circuit packages, compact photographing optical systems, and the like. As a means for making the photographing optical system compact, a camera, which adjusts the amount of light incident on the image pickup plane using a material element, has been proposed.

Similarly, in a video camera, which converts an object image picked up by a photographing optical system into an electrical signal using a photoelectric conversion element such as a CCD, and records the electrical signal on a recording medium such as a magnetic tape, it has been proposed to adjust the amount of light incident on the image pickup plane using a material element so as to realize a compact camera.

However, when the amount of light incident on the image pickup plane is to be adjusted by the material element constituted by a polarization plate and a liquid crystal, light passing through the material element is undesirably converted into linearly polarized light. When this light is incident on the reflection surface of a quick-return mirror, a pentagonal prism, or the like, the reflectance of the light varies depending on the direction of polarization. For this reason, the amount of light incident on the image pickup element for the AE or AF operation becomes different from the amount of light incident on the image pickup plane, thus disturbing a precise AE or AF operation.

Assume that the amount of light incident on the image pickup plane of a video camera including an image pick element such as a CCD is to be adjusted using the material element. In this case, since the light transmitted through the material element is undesirably converted into linearly polarized light, even if this light is incident on an optical lowpass filter consisting of, e.g., crystal, an optical lowpass effect cannot be obtained.

Thus, this embodiment provides a camera and a video camera, which can solve the above-mentioned problems, and can make a photographing optical system lens barrel compact by adjusting the amount of light incident on the image pickup plane using a material element having a polarization plate.

As a practical means, there is provided a camera, which has a photographing optical system, a material element, having polarization means, for controlling a light transmission factor or amount in the photographing optical system, light reflection means, and photoelectric conversion means arranged on the image pickup plane of the photographing optical system or on a plane optically equivalent to the image pickup plane, comprising circularly polarizing light conversion means arranged on the image pickup plane side of the material element or the side of the plane optically equivalent to the image pickup plane, wherein the light reflection means is arranged between the photoelectric conversion means and the circularly polarizing light conversion means. The material element and the circularly polarizing light conversion means are integrally arranged. There is also provided a camera, which has a photographing optical system, a material element, having polarization means, for controlling a light transmission factor or amount in the photographing optical system, light reflection means, and photoelectric conversion means arranged on the image pickup plane of the photographing optical system or on a plane optically equivalent to the image pickup plane, wherein the material element is arranged between the image pickup plane and the light reflection means.

According to this embodiment, there is provided a video camera, which has a photographing optical system including a material element, having polarization means, for controlling a light transmission factor or amount, and an optical lowpass filter, and has photoelectric conversion means arranged on the image pickup plane of the photographing optical system or on a plane optically equivalent to the image pickup plane, comprising circularly polarizing light conversion means arranged on the image pickup plane side of the material element or the side of the plane optically equivalent to the image pickup plane, wherein the optical lowpass filter is arranged between the photoelectric conversion means and the circularly polarizing light conversion means. There is also provided a video camera, which has a photographing optical system including a material element, having polarization means, for controlling a light transmission factor or amount, and an optical lowpass filter, and has photoelectric conversion means arranged on the image pickup plane of the photographing optical system or on a plane optically equivalent to the image pickup plane, wherein the material element is arranged between the photoelectric conversion means and the optical lowpass filter.

With this arrangement, a photographing optical system lens barrel can be rendered compact, thus providing a compact camera and a compact video camera.

Figure 21:
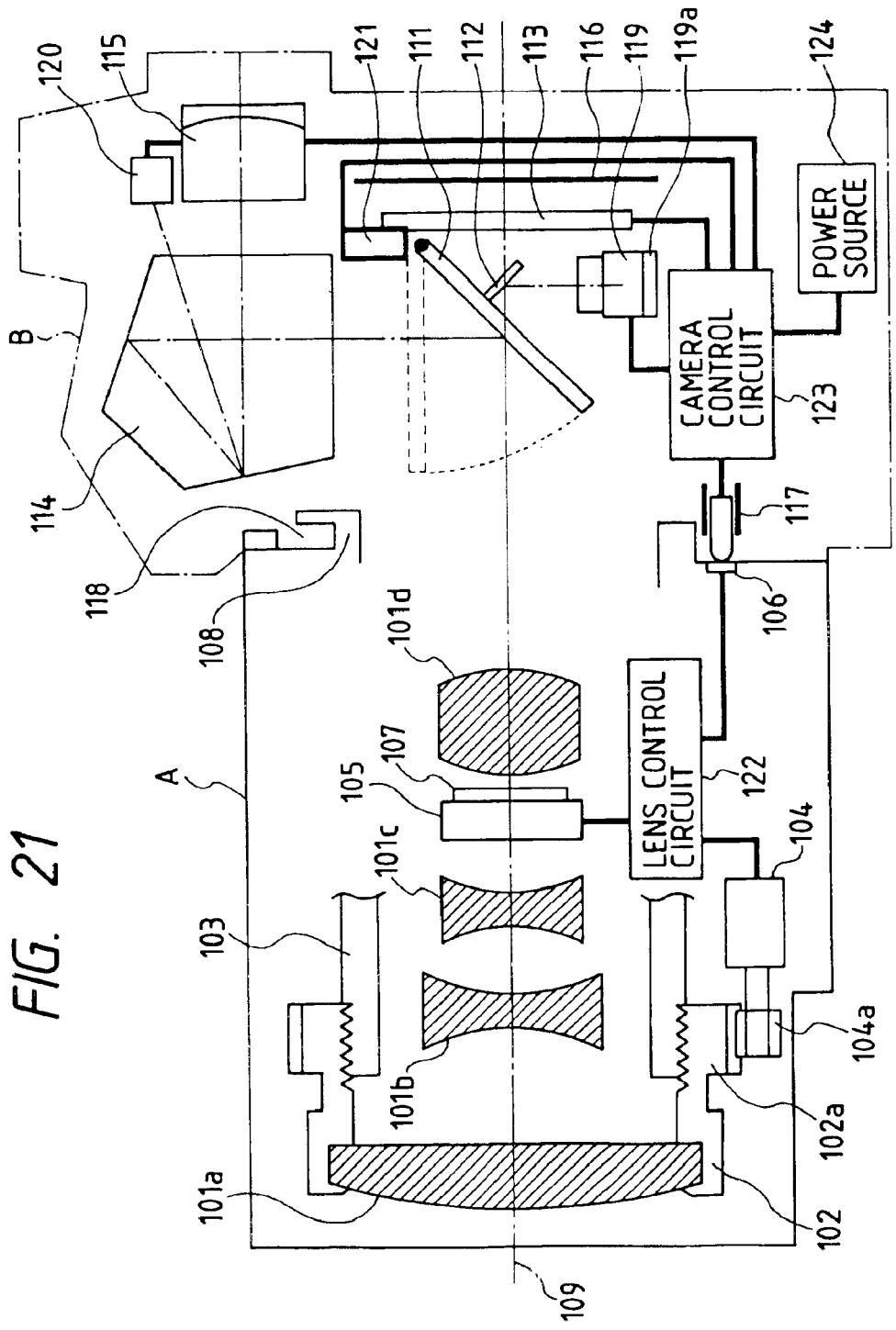
FIG. 21 is a block diagram showing a video camera according to the 12th embodiment of the present invention.

The 12th embodiment of the present invention will be described below with reference to the accompanying drawings. FIG. 21 is a schematic sectional view showing a camera according to the 12th embodiment of the present invention, FIG. 22 is a block diagram showing a circuit arrangement of this embodiment, and FIG. 23 is a flow chart showing an operation of this embodiment.

Figure 22:
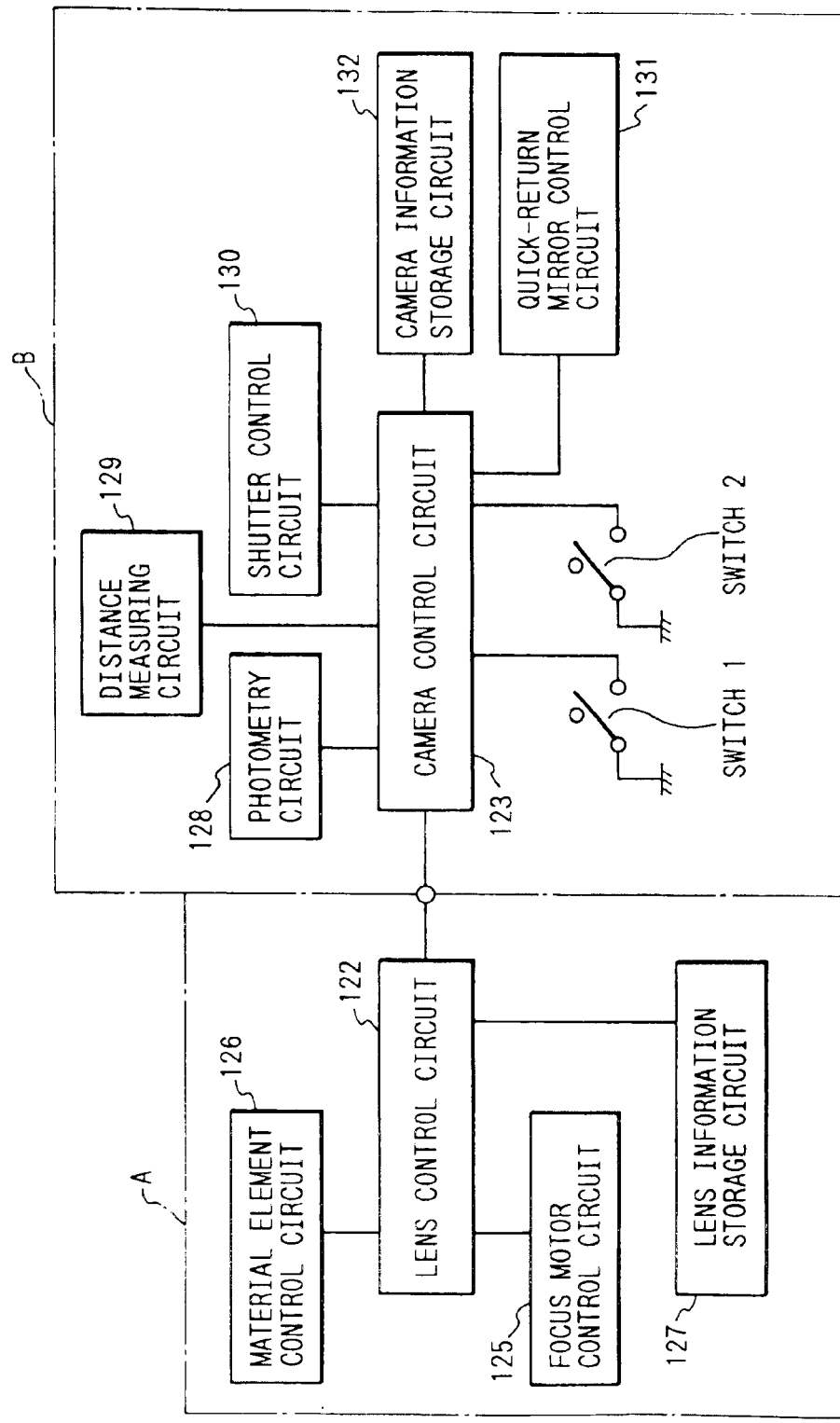
FIG. 22 is a block diagram showing a circuit arrangement in the 12th embodiment of the present invention.
Figure 23:
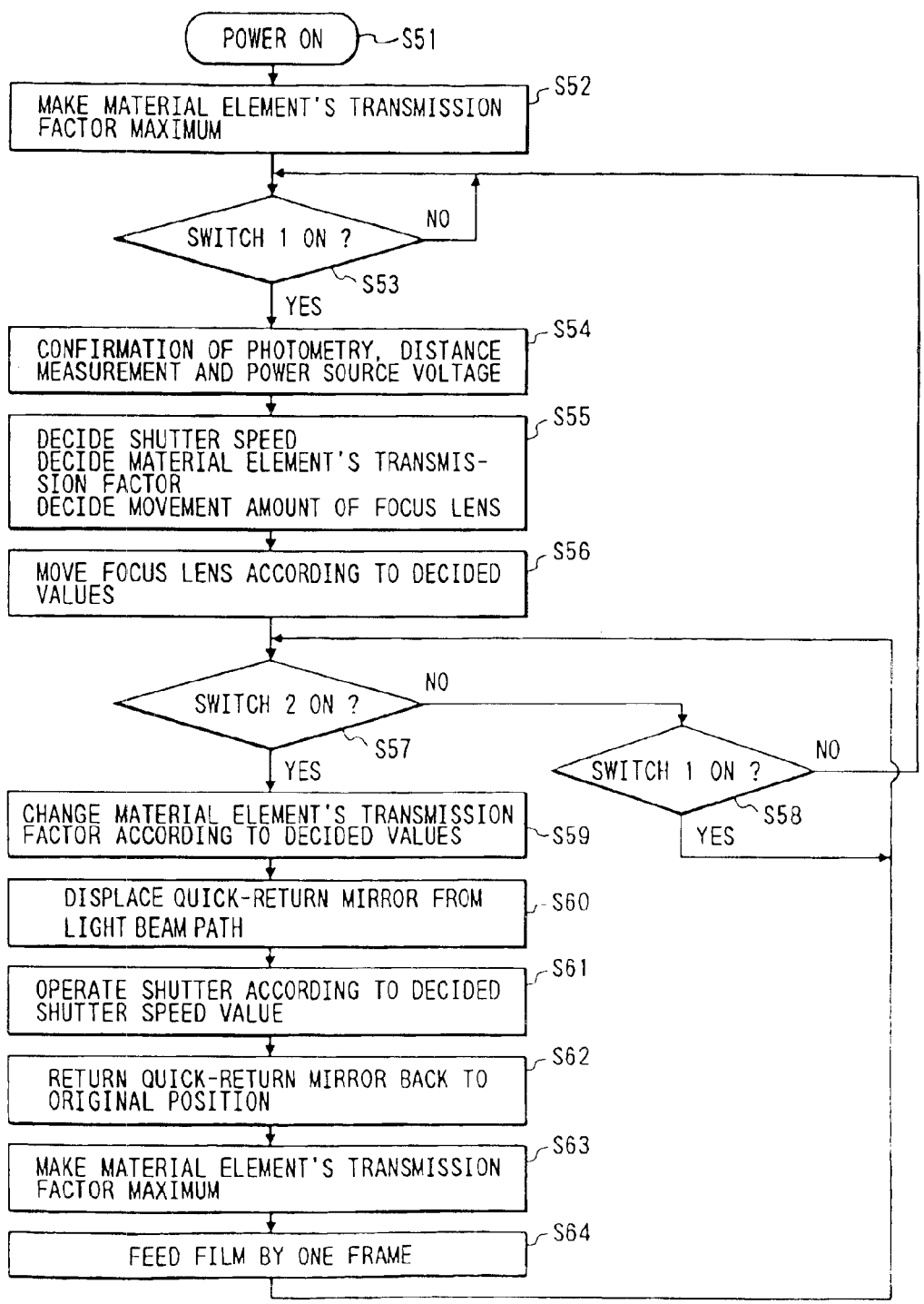
FIG. 23 is a flow chart for controlling an operation of the 12th embodiment of the present invention.

Referring to FIGS. 21 to 23, a camera has a lens unit A and a camera body unit B. The lens unit A includes a photographing optical system 101 constituted by a focus lens 101a, zoom lenses 101b and 101c, and a stationary lens 101d. A focus lens holding frame 102 holds the focus lens 101a, and has a gear portion 102a. A stationary portion 103 is threadably engaged with the focus lens holding frame 102. The focus lens holding frame 102 is pivoted by a focus motor 104. A gear 104a is attached to the output shaft of the motor 104, and is engaged with the gear portion 102a of the focus lens holding frame 102. A material element 105 consisting of a polarization plate and a liquid crystal is arranged in front of the stationary lens 101d. A quarter-wave plate 107 is attached to the material element 105, and constitutes circularly polarizing light conversion means. The lens unit also includes a lens mount 108, and an optical axis 109 of the photographing optical system. The camera body unit B includes a quick-return mirror 111 having a half mirror portion, a sub mirror 112 attached to the quick-return mirror 111, a shutter unit 113, a pentagonal prism 114, a finder lens 115, an image pickup plane 116 such as a film surface, a camera contact 117, a camera mount 118 which can be coupled to the lens mount 108, an AF sensor unit 119 having a photoelectric conversion element 119a such as a CCD, an AE sensor unit 120 having a photoelectric conversion element, and a motor 121 for driving the quick-return mirror 111. The lens unit A also includes a lens control circuit 122 electrically connected to the focus motor 104, the material element 105, and a lens contact 106. The camera unit B further includes a camera control circuit 123, and a power source 124 electrically connected to the camera control circuit 123. The camera control circuit 123 is electrically connected to the shutter unit 113, the camera contact 117, the AF sensor unit 119, the AE sensor unit 120, and the motor 121. The lens control circuit 122 and the camera control circuit 123 are electrically connected to each other via the lens contact 106 and the camera contact 117.

The operation of the embodiment shown in FIG. 21 will be described below with reference to FIGS. 22 and 23. When a power switch (not shown) of the camera is operated, and the power source 124 is turned on (S51), the light transmission factor of the material element 105 is set to be maximum (S52). When a photographer determines a composition, and depresses a release button (not shown) to its half-stroke position, a switch 1 (FIG. 22) is turned on (S53). When the camera control circuit 123 detects that the switch 1 is turned on, the AE sensor unit 120 having the photoelectric conversion unit measures the luminance of an object. Also, the AF sensor unit 119 having the photoelectric conversion element measures the movement amount of the focus lens 101a for a focusing operation via a photometry circuit 128 and a distance measuring circuit 129 on the basis of light transmitted through the half mirror portion of the quick-return mirror 111, and reflected by the sub mirror 112. In addition, a power source voltage is checked (S54). Then, the shutter speed, the light transmission factor of the material element 105, and the movement amount of the focus lens 101a are decided (S55). In this camera, the focus lens holding frame 102 is threadably engaged with the stationary portion 103, and the rotation of the focus motor 104 is transmitted to the focus lens holding frame 102 via the gear 104a and the gear portion 102a. For this reason, when the focus motor 104 is rotated by a focus motor control circuit 125, the focus lens 101a is moved in the optical axis direction while being rotated. The focus motor 104 is rotated based on the decided movement amount of the focus lens 101a to move the focus lens 101a to an in-focus position, thus achieving an AF operation (S56). When the release button is further depressed from this state, a switch 2 (FIG. 22) is turned on (S57). When the camera control circuit 123 detects that the switch 2 is turned on, a material element control circuit 126 changes the light transmission factor of the material element 5 to the decided value (S59), and a quick-return mirror control circuit 131 causes the quick-return mirror 111 to be displaced from a light beam path (S60), as shown by the broken line in FIG. 21. A shutter control circuit 130 opens/closes the shutter unit 113 in accordance with the decided shutter speed value, thus performing exposure on the image pickup plane (film surface) 116 (S61). The quick-return mirror 111 is returned to an original position (S62), and the light transmission factor of the material element 105 is set to be maximum again (original state) (S63). Then, a film is fed by one frame, thus ending a photographing operation (S64).

The function of the quarter-wave plate 107 constituting the circularly polarizing light conversion means will be described below. When light incident from the object side (the left side in FIG. 21) into the photographing optical system is transmitted through the material element 105 having the polarization plate, it is converted into linearly polarized light. When the linearly polarized light is incident on the reflection surfaces of the quick-return mirror 111, since the reflectance varies depending on the direction of linear polarization, the sub mirror 112, and the pentagonal prism 114, the amount of light incident on the AE sensor unit 120 and the AF sensor unit 119 varies depending on the direction of linear polarization even when the incident light amount remains the same, and precise photometry and distance measuring operations cannot be performed. In other words, precise AE and AF operations cannot be performed. In order to perform precise photometry and distance measuring operations, the linearly polarized light must be converted into non-polarized light or circularly polarized light. Since the quarter wave plate 107 has a function of converting linearly polarized light into circularly polarized light, the quarter wave plate 107 can be arranged at an intermediate position between the material element 105 and the reflection surfaces of the optical elements, so that light incident on each reflection surface can be converted into circularly polarized light.

As in this embodiment, when the quarter wave plate 107 and the material element 105 are integrally arranged, they can be arranged as a unit, and can be easily held. Note that the quarter wave plate 107 and the material element 105 need not always be integrally arranged.

(13th Embodiment)

Figure 24:
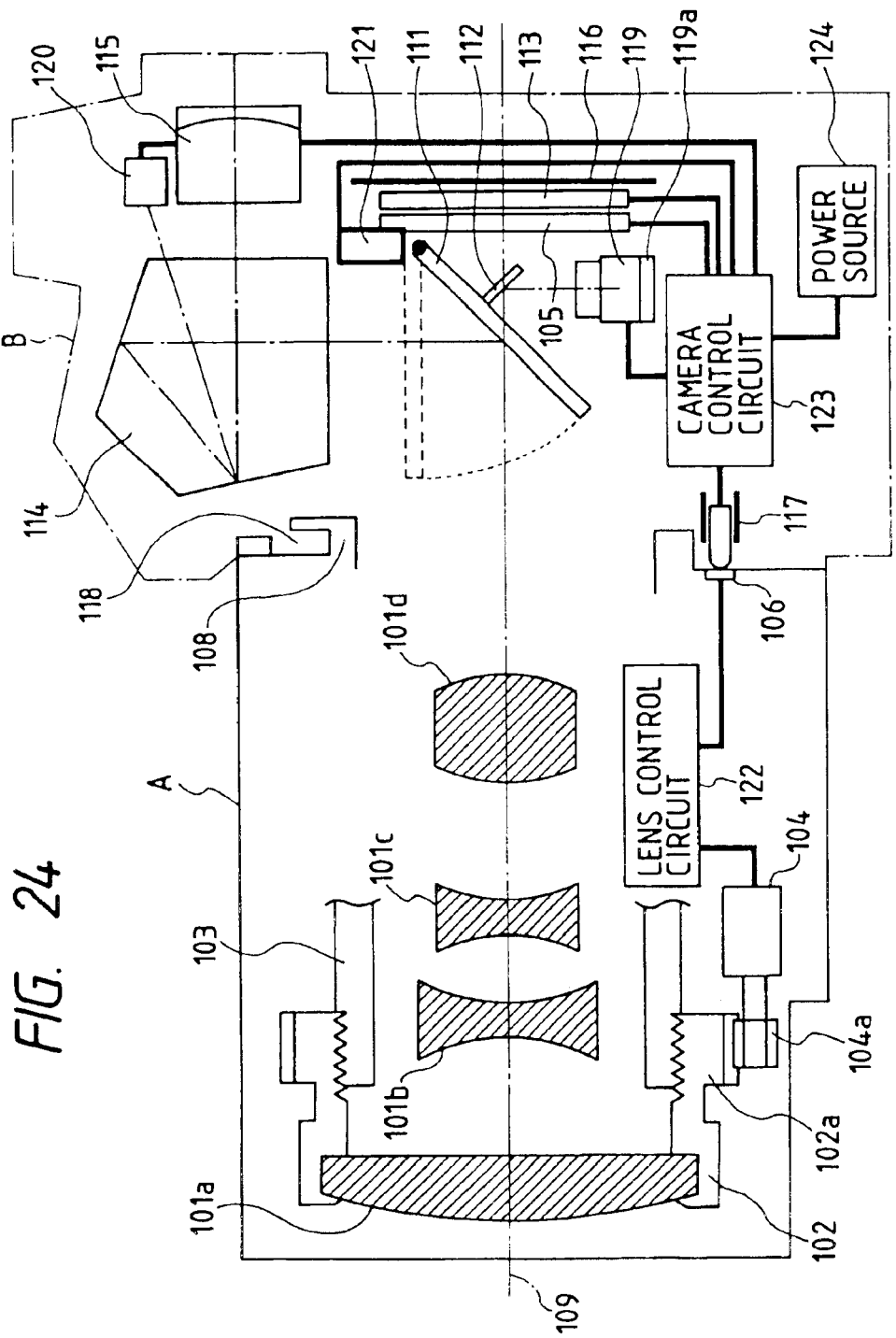
FIG. 24 is a block diagram showing a video camera according to the 13th embodiment of the present invention.

The 13th embodiment of the present invention will be described below with reference to the accompanying drawings. FIG. 24 is a schematic sectional view showing an arrangement of a camera according to the 13th embodiment of the present invention, and FIG. 25 is a block diagram showing a circuit arrangement of the 13th embodiment.

Figure 25:
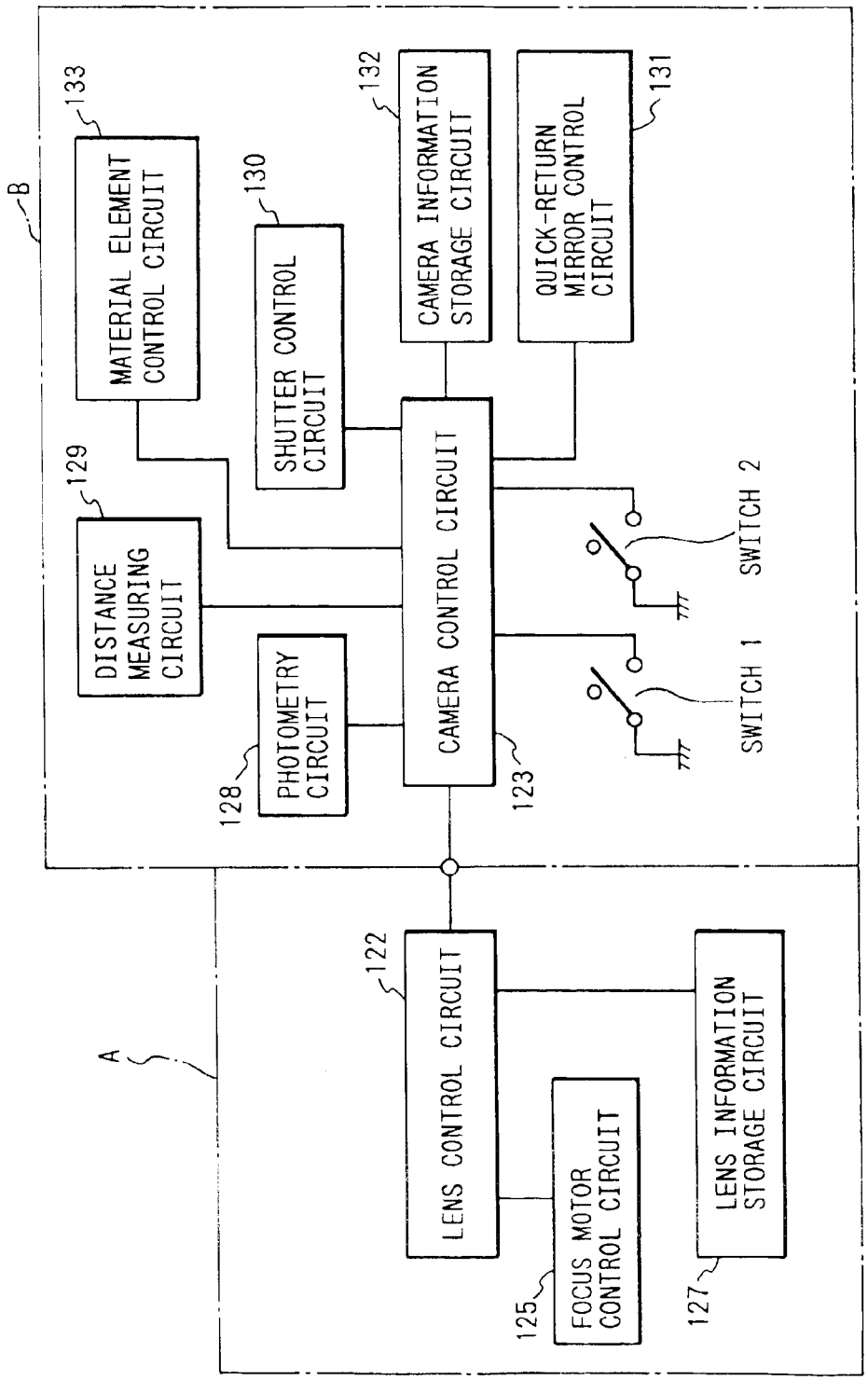
FIG. 25 is a block diagram showing a circuit arrangement in the 13th embodiment of the present invention.

Note that the same reference numerals in FIGS. 24 and 25 denote the same parts or functions as in FIGS. 21 and 22, and a detailed description thereof will be omitted. Since the operation of the camera of the 13th embodiment is the same as that in the 12th embodiment of the present invention, a flow chart for controlling the operation of this embodiment will be omitted.

In the arrangement of the 13th embodiment, the material element 105 constituted by the polarization plate and liquid crystal is arranged between the quick-return mirror 111 and the image pickup plane (film surface) 116, and hence, the quarter wave plate is omitted. Except for this arrangement, the arrangement of the 13th embodiment is substantially the same as that of the 12th embodiment of the present invention. In this embodiment, before the quick-return mirror 111 is displaced from a light beam path (i.e., to a position indicated by a broken line in FIG. 24), i.e., in an operation other than a photographing operation, light incident from the object side (the left side in FIG. 24) into the photographing optical system is transmitted through the reflection surfaces of the quick-return mirror 111, the sub mirror 112, and the pentagonal prism 114, is then incident on the AE sensor unit 120 and the AF sensor unit 119, and is used for photometry and distance measuring operations. When the quick-return mirror 111 is displaced from a light beam in the photographing operation, light transmitted through the photographing optical system is incident on the material element 105, and is subjected to light amount adjustment in a material element control circuit 133 to be converted into linearly polarized light. The linearly polarized light reaches the image pickup plane (film surface) 116. With this arrangement, precise photometry and distance measuring operations can be performed.

In addition, the camera of the 12th or 13th embodiment is an exchangeable lens type camera, but may be a lens integrated type camera.

(14th Embodiment)

Figure 26:
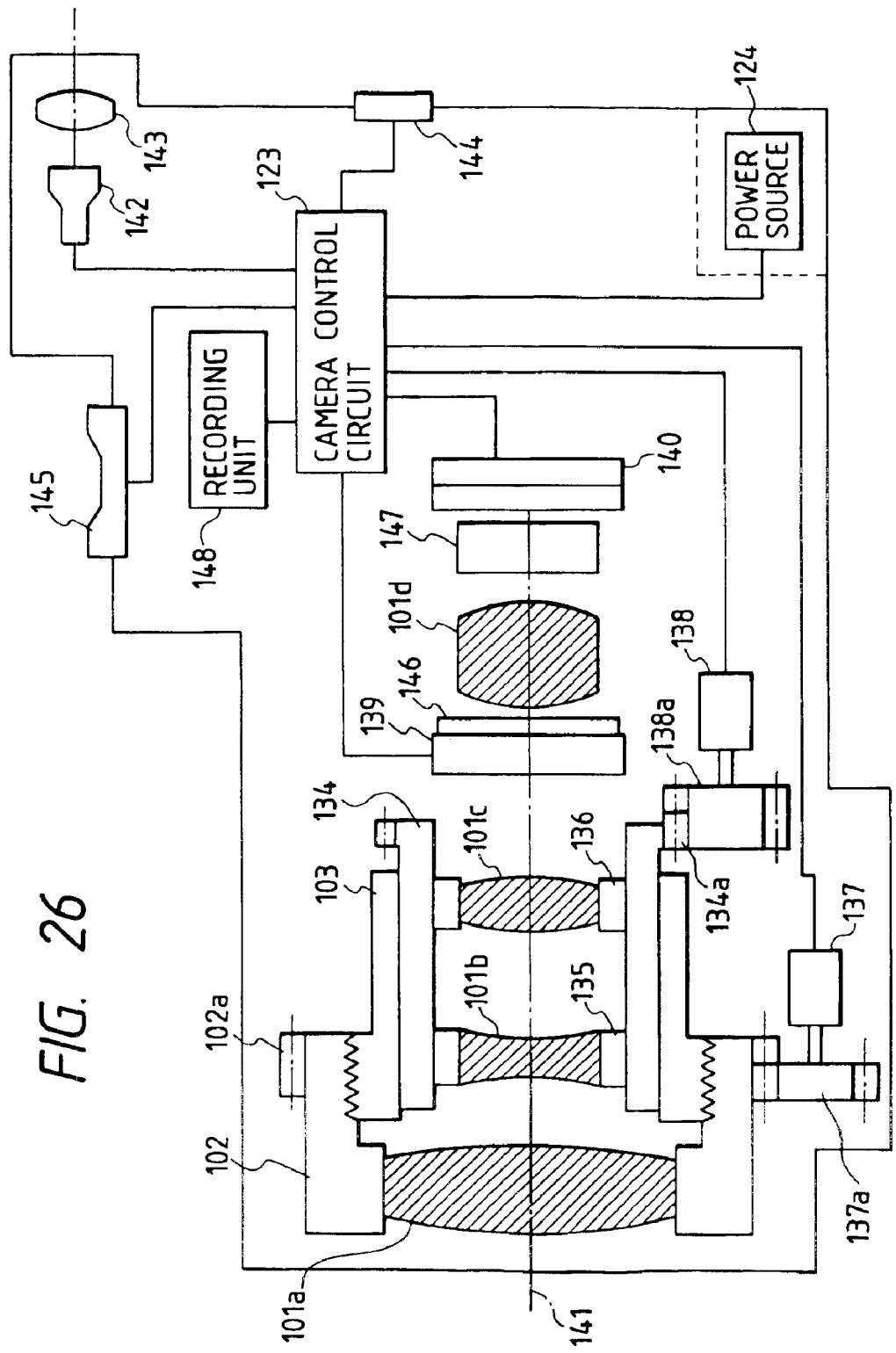
FIG. 26 is a block diagram showing the 14th embodiment of the present invention.

FIG. 26 is a schematic sectional view showing a video camera according to the 14th embodiment of the present invention.

The same reference numerals in FIG. 26 denote the same parts or functions as in FIGS. 21 and 24, and a detailed description thereof will be omitted. A cam cylinder 134 for determining the positions of the zoom lenses 101b and 101c is rotatably held by a stationary portion 103. The zoom lenses 101b and 101c are held by lens frames 135 and 136. The focus lens holding frame 102 is pivoted by a focus motor 137. A gear 137a is attached to the output shaft of the motor 137, and is engaged with the gear portion 102a of the focus lens holding frame 102. The cam cylinder 134 is pivoted by a zoom motor 138. A gear 138a is attached to the output shaft of the motor 138, and is engaged with a gear portion 134a of the cam cylinder 134. A material element 139 is constituted by a polarization plate and a liquid crystal. An image pickup element 140 comprises, e.g., a CCD. The photographing optical system has an optical axis 141. The camera of this embodiment also includes an electronic viewfinder 142 having a lens 143, a power switch 144, a zoom operation unit 145, a quarter wave plate 146 adhered to the material element 139, and constituting circularly polarizing light conversion means, and an optical lowpass filter 147 utilizing birefringence. The camera further includes a camera control circuit, a recording unit, and a power source, which are electrically connected to the camera control circuit. The camera control circuit is also electrically connected to the focus motor 137, the zoom motor 138, the material element 139, the image pickup element 140, the electronic viewfinder 142, the power switch 144, and the zoom operation unit 145.

Note that the circuit arrangement and the control operation of the above-mentioned camera are the same as those in the circuit block diagram of FIG. 2, and the flow chart of FIG. 4 in the first embodiment, and a detailed description thereof will be omitted.

The function of the quarter-wave plate 146 constituting the circularly polarizing light conversion means will be described below. In a photographing operation, when light incident from the object side (the left side in FIG. 26) into the photographing optical system is transmitted through the material element 139 having the polarization plate, it is converted into linearly polarized light. Even when the linearly polarized light is incident on the optical lowpass filter 147 utilizing birefringence, an optical lowpass effect cannot be obtained. In order to obtain the function of the optical lowpass filter 147, the linearly polarized light must be converted into non-polarized light or circularly polarized light. Since the quarter wave plate 146 has a function of converting linearly polarized light into circularly polarized light, the quarter wave plate 146 can be arranged at an intermediate position between the material element 139 and the optical lowpass filter 147, so that light incident on the optical lowpass filter 147 can be converted into circularly polarized light. As in this embodiment, when the quarter wave plate 146 and the material element 139 are integrally arranged, they can be arranged as a unit, and can be easily held. Note that the quarter wave plate 146 and the material element 139 need not always be integrally arranged.

(15th Embodiment)

Figure 27:
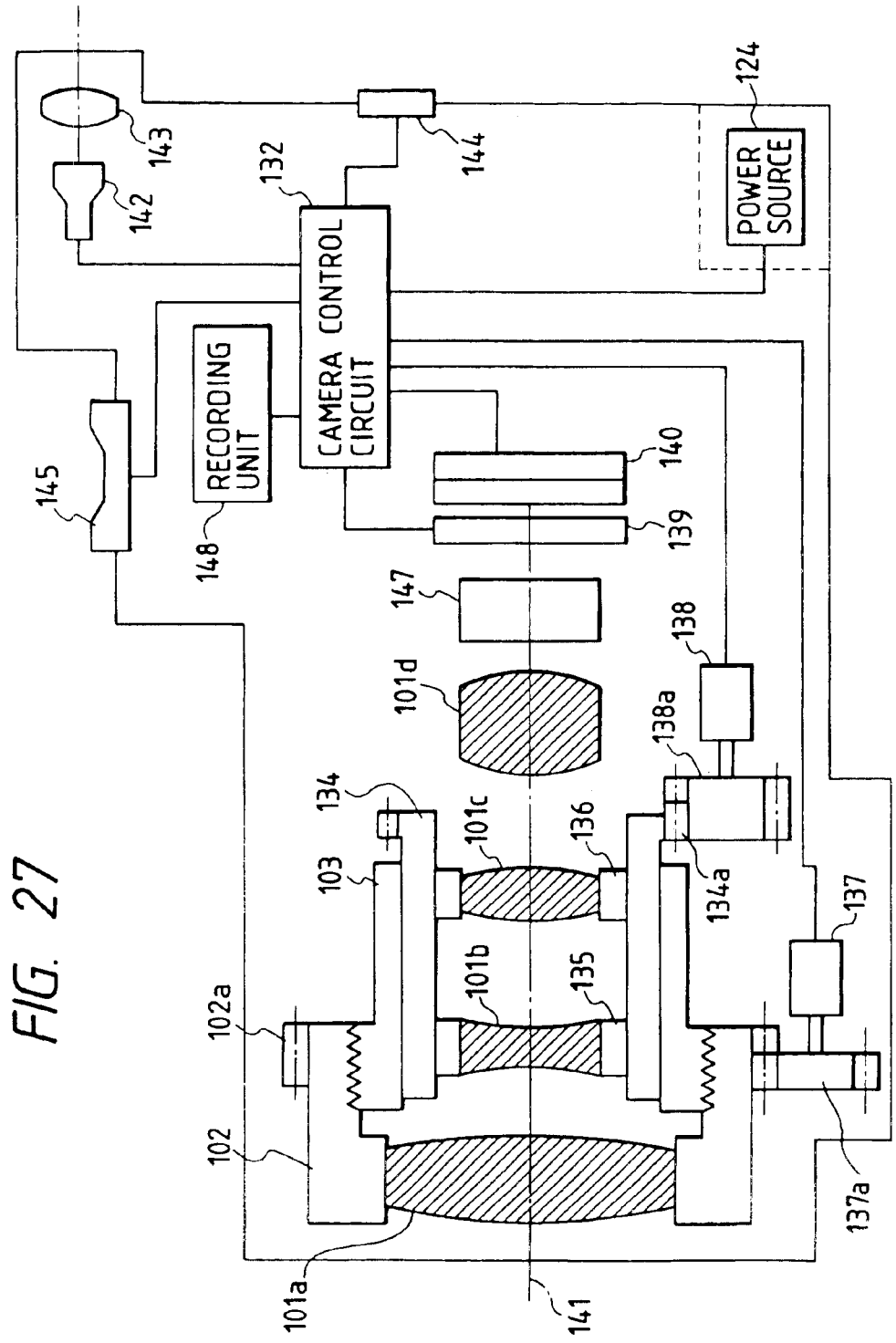
FIG. 27 is a block diagram showing the 15th embodiment of the present invention.

FIG. 27 is a schematic sectional view showing a video camera according to the 15th embodiment of the present invention. The same reference numerals in FIG. 27 denote the same parts as in the 14th embodiment shown in FIG. 26, and a detailed description thereof will be omitted. Also, since the circuit arrangement and operation of this embodiment are the same as those in the 14th embodiment (as in FIGS. 2 and 4), blocks representing the circuit arrangement and the flow chart for controlling the operation will be omitted in this embodiment as well.

In the arrangement of this embodiment, the material element 139 constituted by a polarization plate and a liquid crystal is arranged between the optical lowpass filter 147 utilizing birefringence, and the image pickup element 140 such as a CCD, and no quarter wave plate is used. Except for this arrangement, the arrangement of this embodiment is substantially the same as that of the 14th embodiment of the present invention. In this embodiment, in a photographing operation, light incident from the object side (the left side in FIG. 27) into the photographing optical system is transmitted through the optical lowpass filter 147, and is subjected to an optical lowpass effect. Thereafter, the light is incident on the material element 139, and is subjected to light amount adjustment. Thus, the light is converted into linearly polarized light, and reaches the image pickup element 140. With this arrangement, an optical lowpass effect can be obtained.

In addition, the video camera of the 14th or 15th embodiment of the present invention is a lens integrated type camera, but may be applied to an exchangeable lens type video camera.

As described above, according to the 12th embodiment, in a camera including a material element capable of controlling a light transmission factor or amount using polarization means in a photographing optical system, circularly polarizing light conversion means is arranged at the prospective imaging plane side of the material element, light reflection means is arranged between the circularly polarizing light conversion means and the prospective imaging plane, and the material element is arranged between the prospective imaging plate and the light reflection means. Therefore, a compact camera, which can perform precise AE and AF operations without arranging any exclusive circularly polarizing light conversion means can be provided.

Also, in a video camera including a material element capable of controlling a light transmission factor or amount using polarization means in a photographing optical system, circularly polarizing light conversion means is arranged at the image pickup element side of the material element, an optical lowpass filter is arranged between the circularly polarizing light conversion means and the image pickup element, and the material element is arranged between the image pickup element and the optical lowpass filter. Therefore, a compact video camera, which can reliably obtain an optical lowpass effect, can be provided.

(16th Embodiment)

The 16th embodiment of the present invention will be described below.

When the amount of light incident on a photoelectric conversion element such as a CCD is adjusted by a material element such as an EC (electrochromic) element or a liquid crystal element, if control of the material element is stopped by turning off the power source of the camera or setting the camera in a reproduction mode when the light transmission factor of the material element is high, light having a strong light intensity, such as sunlight is incident on the photoelectric conversion element, and a damage may be caused in the photoelectric conversion element.

Since the photoelectric conversion element has high sensitivity to near infrared light outside a visible light range, a camera having the photoelectric conversion element such as a CCD on the imaging plane of the photographing optical system or on a plane optically equivalent to the imaging plane has a near infrared light cut filter in the photographing optical system. Easy assembling of the near infrared light cut filter is a subject for realizing a compact, low-cost camera.

It is an object of this embodiment to provide a compact, low-cost camera having a photoelectric conversion element on an imaging plane of a photographing optical system or on a plane optically equivalent to the imaging plane, which camera adjusts the amount of light incident on the imaging plane by a material element, can prevent an image pickup element from being damaged with light having a high light intensity when the image pickup element is inactive, can improve easiness of assembling of the near infrared light cut filter, and can realize a compact, low-cost photographing optical system lens system.

For this reason, according to this embodiment, there is provided a camera, which has a material element capable of controlling a light transmission factor or amount in a photographing optical system, and has photoelectric conversion means on an imaging plane of the photographing optical system or on a plane optically equivalent to the imaging plane, wherein the material element has a filter function of removing near infrared light. The material element and a filter for removing near infrared light are integrally arranged. The camera also has correction means for correcting the light transmission factor wavelength dependency characteristics of the material element. The camera further has storage means for storing the light transmission factor wavelength dependency characteristics of the material element obtained when the material element is in a predetermined state. The storage means stores a plurality of material element light transmission factor wavelength dependency characteristics when the light transmission factor of the material element is a predetermined value. The camera further has temperature detection means, and the storage means stores a plurality of material element light transmission factor wavelength dependency characteristics under a predetermined temperature condition. When the photoelectric conversion means does not perform a photoelectric conversion operation, the material element is set in a light shielding state or a substantially minimum light transmission factor state or a substantially minimum light transmission amount state, or when the photoelectric conversion means does not perform a photoelectric conversion operation, voltage application to the material element is stopped. At this time, when the voltage application to the material element is stopped, the light transmission factor or amount is held in a state wherein voltage application to the material element is stopped. Furthermore, when the photoelectric conversion means stops a photoelectric conversion operation, the material element is set in a light shielding state or a substantially minimum light transmission factor state or substantially minimum light transmission amount state, and thereafter, voltage application to the material element is stopped. When the power switch of the video camera is turned off, the material element is set in a light shielding state or a substantially minimum light transmission factor state or substantially minimum light transmission amount state. The camera further includes reproduction means for reproducing a recorded image. When the video camera is set in a reproduction state of a recorded image or in a reproduction mode of a recorded image, the material element is set in a light shielding state or a substantially minimum light transmission factor state or substantially minimum light transmission amount state. The material element is one which can be set in a light shielding state or a substantially minimum light transmission factor state or substantially minimum light transmission amount state.

With the arrangement of this embodiment, a photographing optical system lens barrel can be rendered compact, and its cost can be reduced, thus providing a compact, low-cost camera.

The 16th embodiment of the present invention will be described below with reference to the accompanying drawings. Since the arrangement and operation of the video camera of this embodiment are the same as those shown in FIGS. 1 to 4 described in the first embodiment, a detailed description and illustration thereof will be omitted.

In this embodiment, a difference from the first embodiment is that a near infrared light cut filter function is added to the material element 9.

The material element 9 having the near infrared light cut filter function will be described below.

Figure 28:
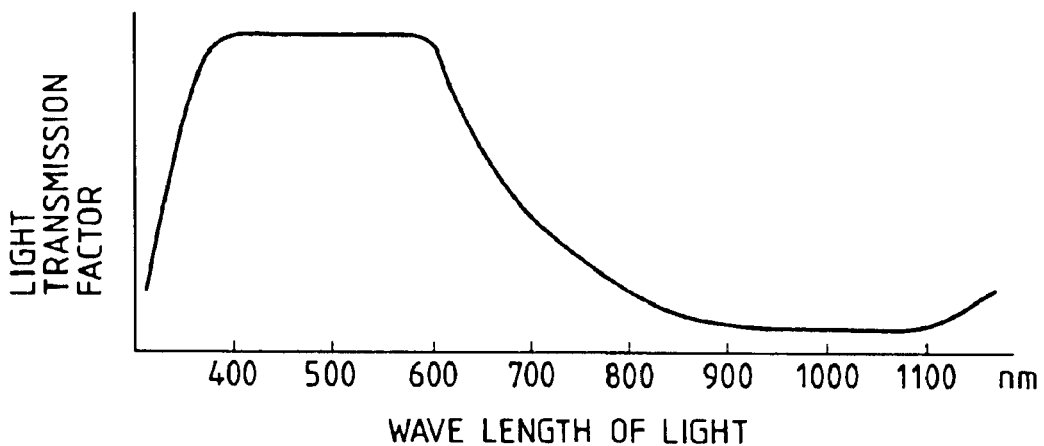
FIG. 28 is a graph showing an example of the spectral transmission characteristics of a near infrared light cut filter according to the 16th embodiment of the present invention.
Figure 29:
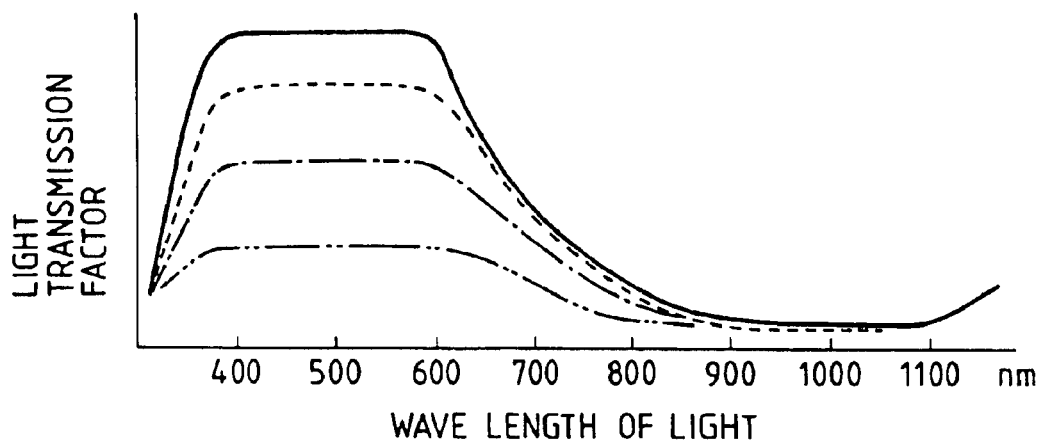
FIG. 29 is a graph showing the spectral transmission characteristics of a material element according to the 16th embodiment of the present invention.
Figure 30:
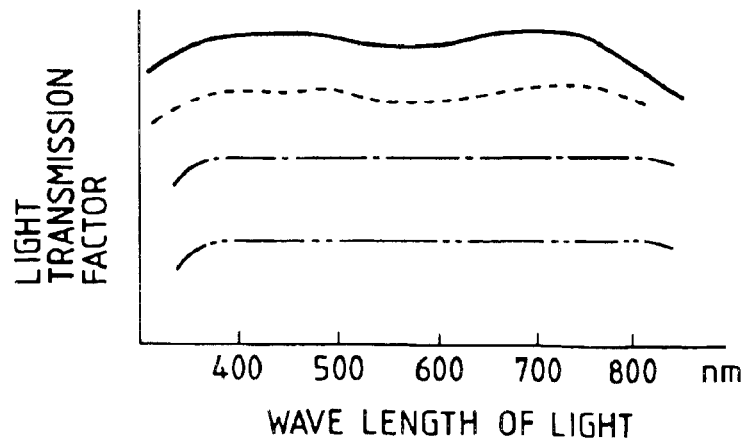
FIG. 30 is a graph showing the spectral transmission characteristics of the material element according to the 16th embodiment of the present invention.
Figure 31:
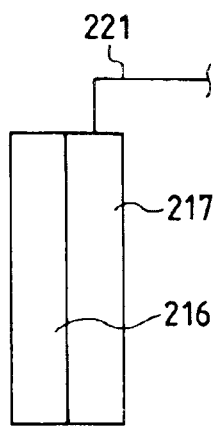
FIG. 31 is a view showing an arrangement of the material element integrated with the near infrared light cut filter according to the 16th embodiment of the present invention.
Figure 32:
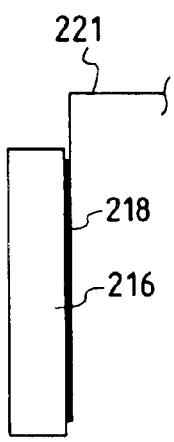
FIG. 32 is a view showing another arrangement of the material element integrated with the near infrared light cut filter according to the 16th embodiment of the present invention.
Figure 33:
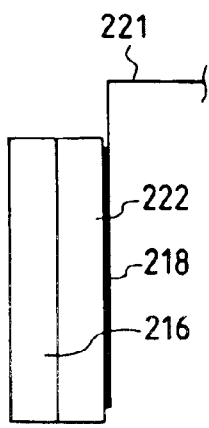
FIG. 33 is a view showing still another arrangement of the material element integrated with the near infrared light cut filter according to the 16th embodiment of the present invention.
Figure 34:
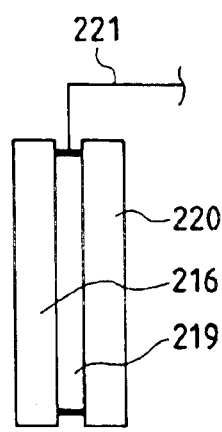
FIG. 34 is a view showing still another arrangement of the material element integrated with the near infrared light cut filter according to the 16th embodiment of the present invention.
Figure 35:
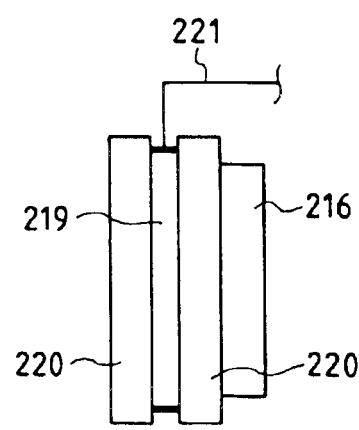
FIG. 35 is a view showing still another arrangement of the material element integrated with the near infrared light cut filter according to the 16th embodiment of the present invention.

FIG. 28 shows an example of the spectral transmission characteristics of the near infrared light cut filter. Normally, an image pickup element such as a CCD has relatively high sensitivity to near infrared light. For this reason, in a camera having such an image pickup element, a near infrared light cut filter having spectral transmission factor characteristics shown in FIG. 28 is arranged at the light-receiving portion side of the image pickup element. For this reason, when a material element having spectral transmission characteristics shown in FIG. 29 (a solid curve in FIG. 29 represents a maximum transmission state of the material element, and characteristics obtained when the light transmission factor is lowered are represented in the order of a broken curve, an alternate long and short dashed curve, and an alternate long and two short dashed curve) is used as light amount adjustment means for the photographing optical system, since this material element has a function of a near infrared light cut filter, the near infrared light cut filter need not be arranged in addition to the material element. A material element having spectral transmission characteristics shown in FIG. 30 (a solid curve in FIG. 30 represents a maximum transmission state of the material element, and characteristics obtained when the light transmission factor is lowered are represented in the order of a broken curve, an alternate long and short dashed curve, and an alternate long and two short dashed curve), and a near infrared light cut filter having characteristics shown in FIG. 28 are integrally arranged to constitute a light amount adjustment unit having spectral transmission characteristics shown in FIG. 29. Examples of the light amount adjustment unit will be explained below with reference to FIGS. 31 to 35. In FIGS. 31 to 35, common reference numerals are used. The light amount adjustment unit includes a near infrared light cut filter 216, a material element 217, and an EC (electrochromic) element 218 consisting of a transition metal oxide film (e.g., $IrO_x$, $Ta_2O_5$, $wo_3$, or the like). When a voltage is applied to this film, the transmission light amount of the film can be controlled. The adjustment unit also includes a liquid crystal 219, a polarization plate (or a glass plate) 220, an electrical signal line 221, and a glass plate 222. The above-mentioned light amount adjustment unit is prepared by integrally arranging the material element 217 and the near infrared light cut filter 216, as shown in FIG. 31. When the material element 217 comprises an EC element, the EC element 218 may be formed on the surface of the near infrared light cut filter 216 by deposition, as shown in FIG. 32, or the glass plate 222 on which the EC element 218 is deposited may be adhered to the near infrared light cut filter 216, as shown in FIG. 33. One of the material element 217 and the polarization plate (or glass plate) 220 sealed with a liquid crystal may be used as the near infrared light cut filter 216, or the liquid crystal element and the near infrared light cut filter 216 may be adhered to each other, as shown in FIG. 35. The electrical signal line 221 shown in each of FIGS. 31 to 35 is connected to the camera control circuit 21, and the material element 217 is controlled by the exposure amount control circuit 26.

(17th Embodiment)

The 17th embodiment of the present invention will be described below. The schematic arrangement of a camera of this embodiment is basically the same as that shown in FIG. 21. The circuit arrangement of this embodiment is the same as that shown in the block diagram of FIG. 22, and operation control of the entire camera is the same as that shown in the flow chart of FIG. 23.

Therefore, the explanation for the arrangement and the operation shown in FIGS. 21, 22, and 23 is used for those of this embodiment.

In this embodiment, however, the quarter wave plate 107 in FIG. 21 may be omitted.

An image pickup element such as a CCD used in, e.g., an AF sensor unit has relatively high sensitivity to near infrared light. For this reason, a near infrared light cut filter having spectral transmission factor characteristics shown in FIG. 28 is arranged at the light-receiving portion side of the image pickup element. For this reason, when the material element of the 16th embodiment of the present invention is used as a material element as light amount adjustment means in a photographing optical system of this embodiment, since the material element has a near infrared light cut filter function, another near infrared light cut filter need not be arranged. If light amount adjustment units having the arrangements (i.e., integrated arrangements of the material element and the near infrared light cut filter) and spectral transmission characteristics shown in FIGS. 31 to 35 like those in the 16th embodiment are used as the material element of this embodiment, the same effect can be obtained. In this case, in this embodiment, the electrical signal line 221 shown in each of FIGS. 31 to 35 is connected to the lens control circuit 122 (FIG. 22), and the material element 105 is controlled by the material element control circuit 126.

In addition, the 16th embodiment of the present invention is applied to a photographing optical system integrated video camera, and the 17th embodiment of the present invention is applied to an exchangeable lens type camera. However, these embodiment may be applied to either a photographing optical system integrated camera or an exchangeable lens type camera.

(18th Embodiment)

The 18th embodiment of the present invention will be described below. This embodiment compensates for a change in light transmission factor wavelength dependency of a material element caused by a change in temperature.

Figure 36:
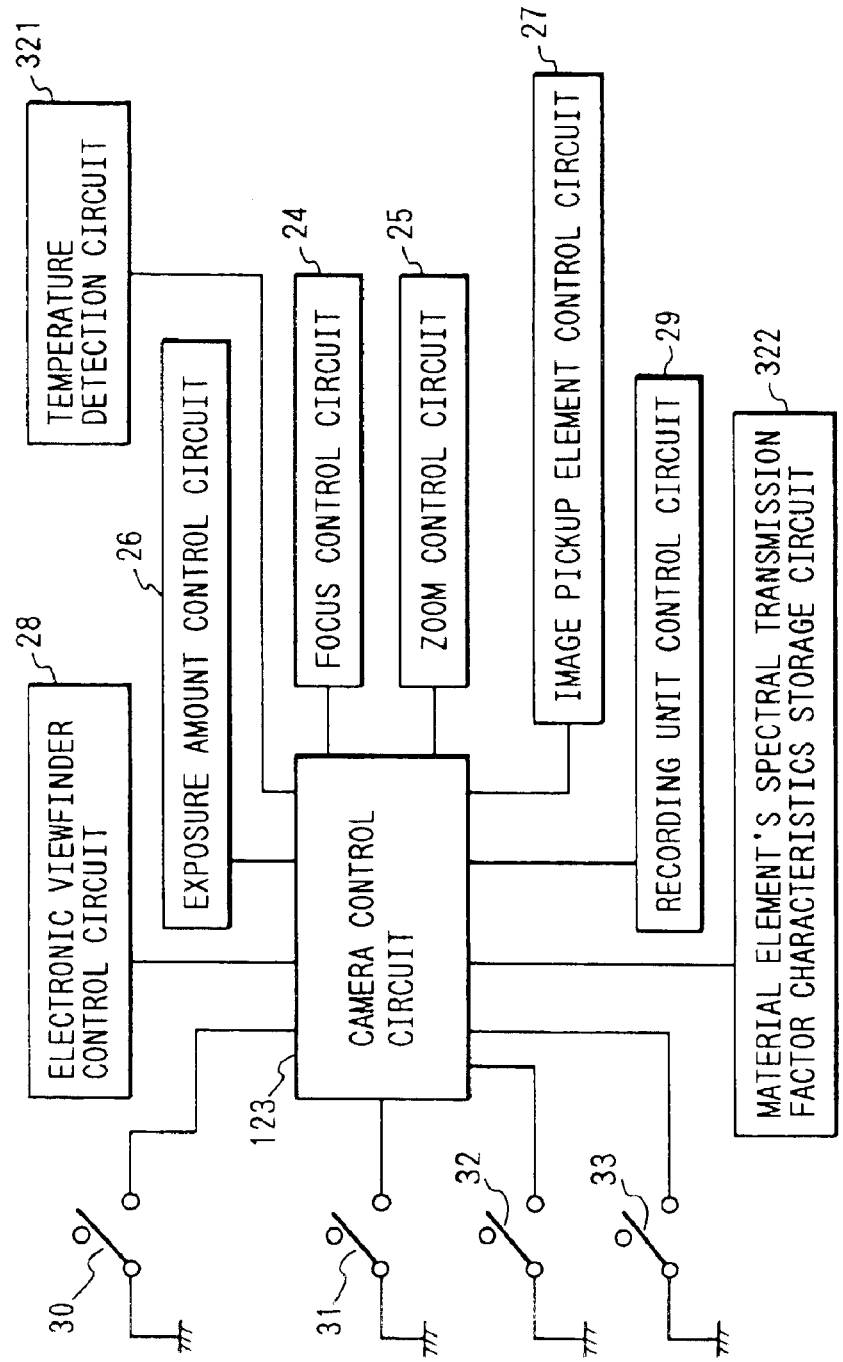
FIG. 36 is a block diagram showing a circuit arrangement according to the 17th embodiment of the present invention.
Figure 37:
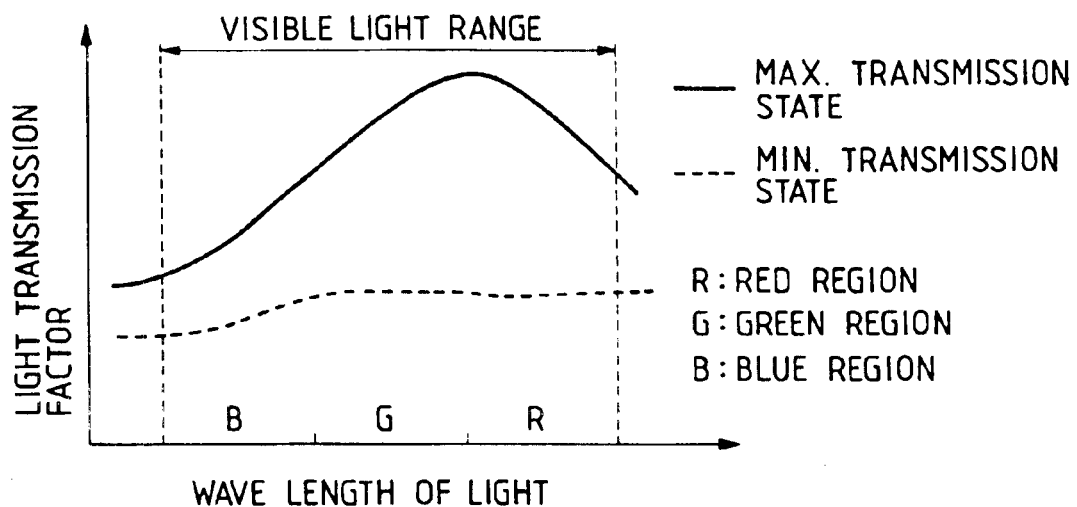
FIG. 37 is a graph showing the light transmission factor wavelength dependency characteristics of a material element.
Figure 38:
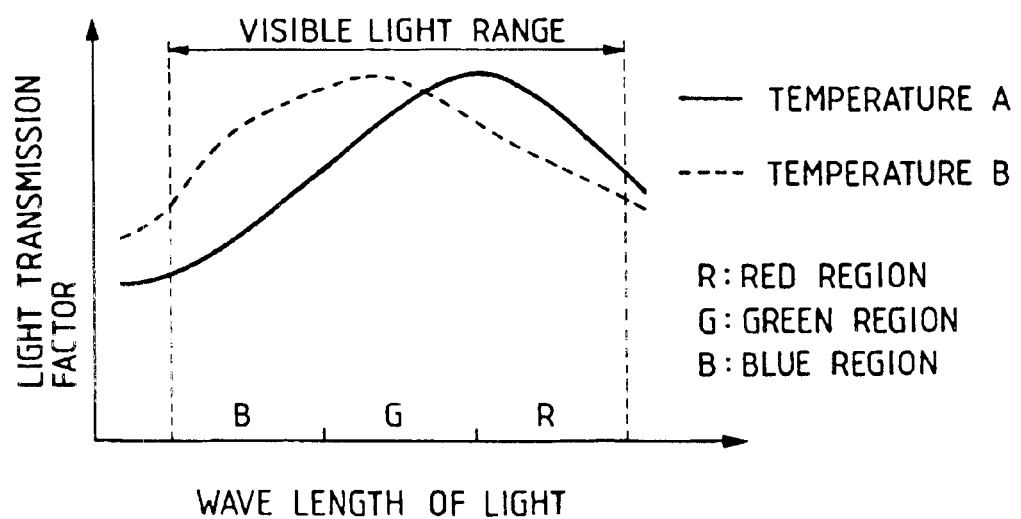
FIG. 38 is a graph showing the light transmission factor wavelength dependency characteristics of the material element in accordance with a change in temperature.

The schematic arrangement of a video camera according to the 18th embodiment of the present invention is the same as that shown in FIG. 21, and operation control of this camera is the same as that shown in the flow chart of FIG. 23. FIG. 36 is a block diagram showing a circuit arrangement of this embodiment, FIG. 37 is a graph showing the light transmission factor wavelength dependency characteristics of a material element, and FIG. 38 is a graph showing a change in light transmission factor wavelength dependency characteristics of the material element caused by a change in temperature.

The arrangement shown in FIG. 36 is substantially the same as that in the first embodiment shown in FIG. 2, except that a material element spectral transmission factor characteristics storage circuit 322 and a temperature detection circuit 321 are arranged. Thus, a detailed description thereof will be omitted.

The material element 9 and the spectral transmission factor characteristics storage circuit for the material element 9 will be described below with reference to FIG. 36.

The material element 9 comprises a liquid crystal element or an electrochromic element, and can electrically control the transmission amount of light. It is ideal that the material element 9 has a constant light transmission factor independent of the light wavelength. However, in general, even in a state wherein the material element has the maximum light transmission factor, the light transmission factor changes depending on the light wavelength, as shown in FIG. 37. In some material elements, the spectral transmission factor changes depending on the light transmission factor, as indicated by, e.g., a broken curve in FIG. 37. In some cases, the spectral transmission factor may change depending on the temperature condition, as shown in FIG. 38. In order to prevent a color balance error of a camera due to use of this material element, this embodiment comprises the material element spectral transmission factor characteristics storage circuit 322 for storing the spectral transmission factor characteristics of the material element under respective conditions. The light transmission state of the material element, the temperature condition, and the like are detected by the camera control circuit or the temperature detection circuit 321, and white balance is corrected by the camera control circuit 123 on the basis of the spectral transmission factor characteristics of the material element 9 stored in the material element spectral transmission factor characteristics storage circuit 322.

The operation of the 18th embodiment is the same as that shown in the flow chart of FIG. 4. That is, when the light transmission amount of the material element is controlled by the exposure amount control circuit, so that the amount of light incident on the image pickup element becomes constant, white balance is simultaneously corrected so as to prevent the above-mentioned color balance error caused by material element 9 (see FIG. 6).

In addition, when the spectral transmission factor characteristics of the material element do not greatly change due to a change in temperature, the temperature detection circuit 321 of this embodiment may be omitted, and white-balance correction due to the change in temperature may be omitted.

In this embodiment, the material element spectral transmission factor characteristics storage circuit 322 is controlled by the camera control circuit 123. In the case of an exchangeable lens type camera, the material element spectral transmission factor characteristics storage circuit 322 may be arranged on the exchangeable lens side.

When color balance does not greatly change depending on the transmission factor of the material element, typical spectral transmission factor characteristics of the material element may be stored.

Color-balance correction is not limited to white-balance correction. For example, the color balance may be corrected by any other method (e.g., by changing the transmission factor of the color filter of the image pickup element).

(19th Embodiment)

Figure 39:
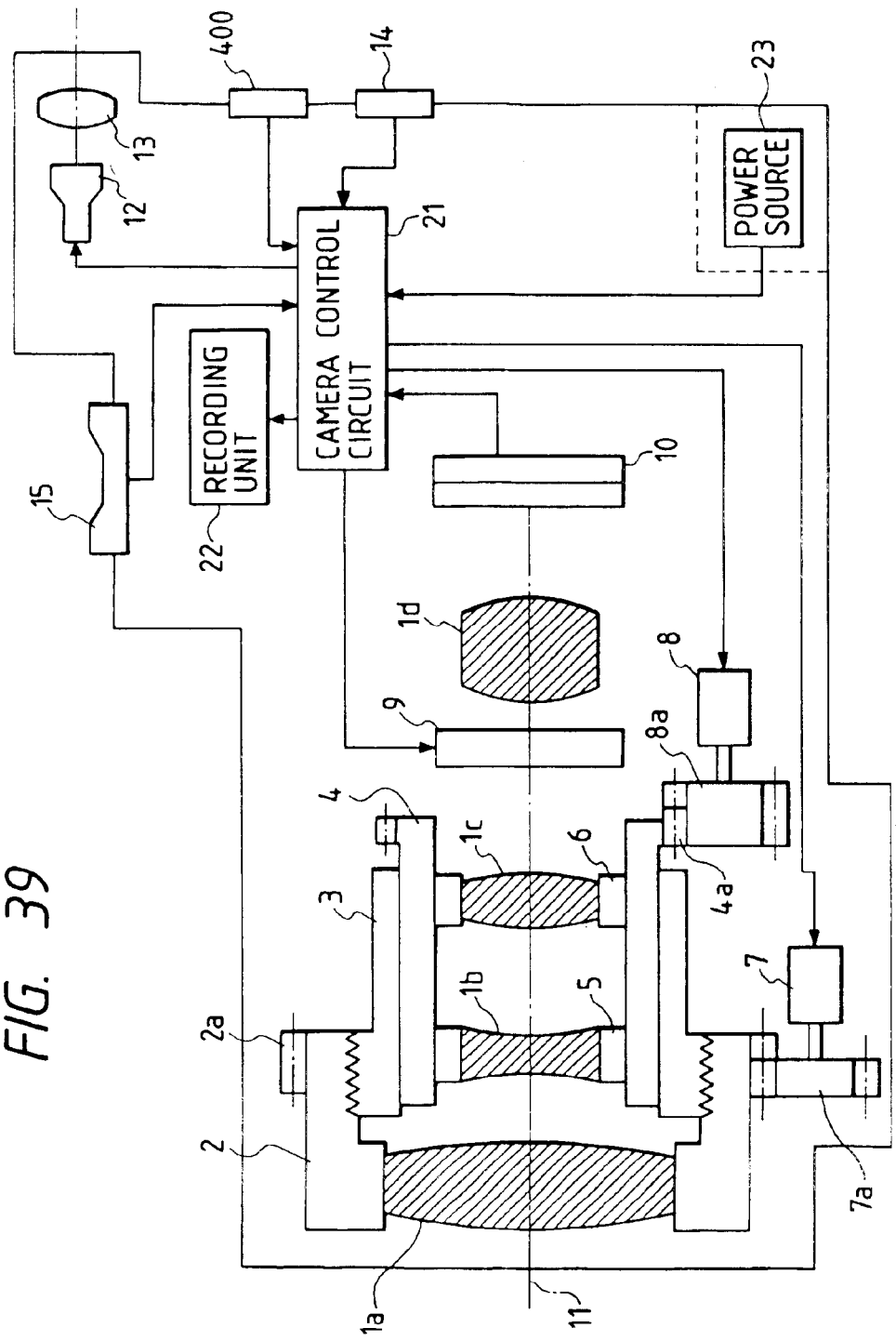
FIG. 39 is a schematic sectional view showing a video camera according to the 18th embodiment of the present invention.
Figure 40:
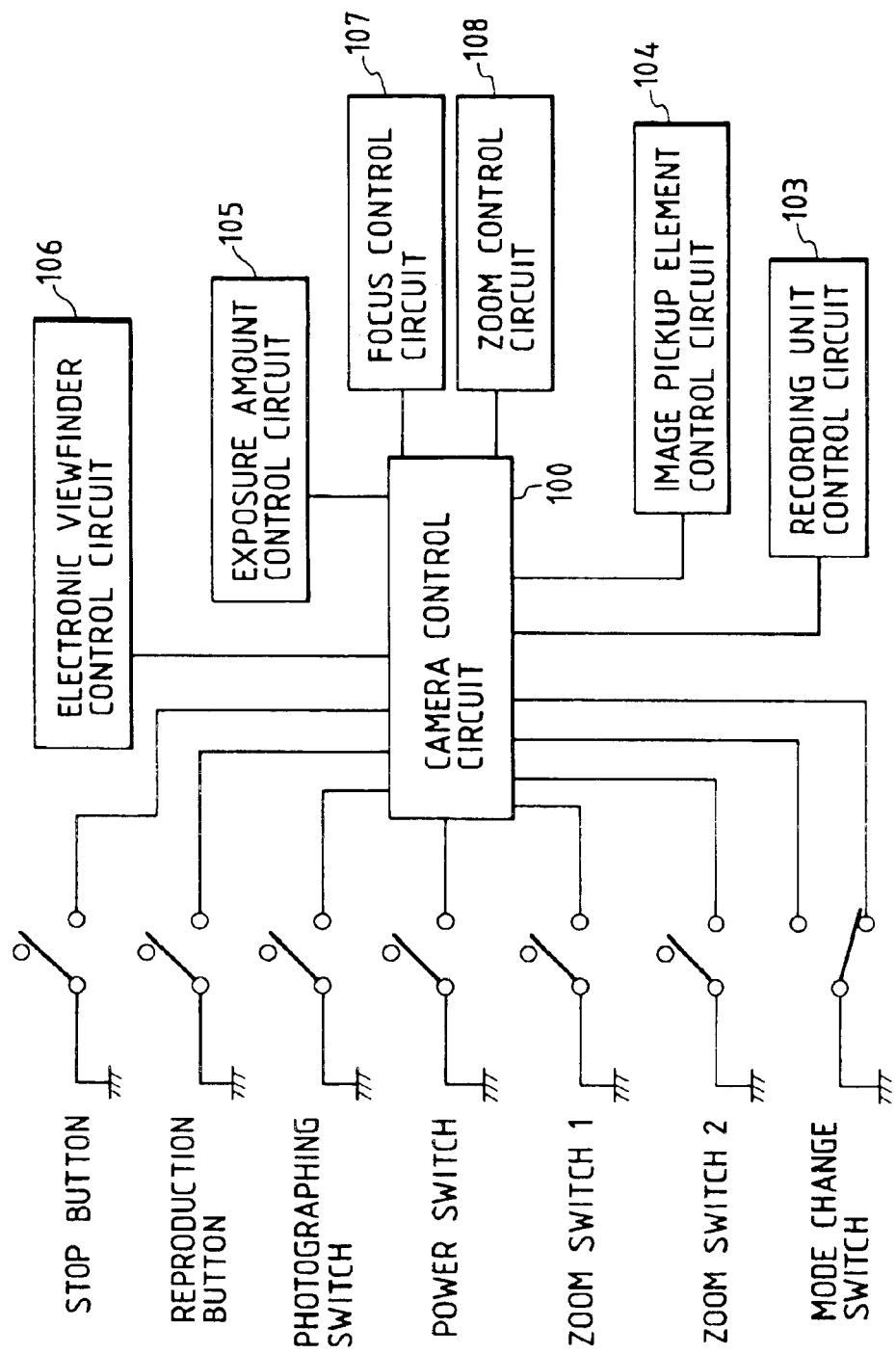
FIG. 40 is a block diagram showing a circuit arrangement according to the 18th embodiment of the present invention.
Figure 41B:
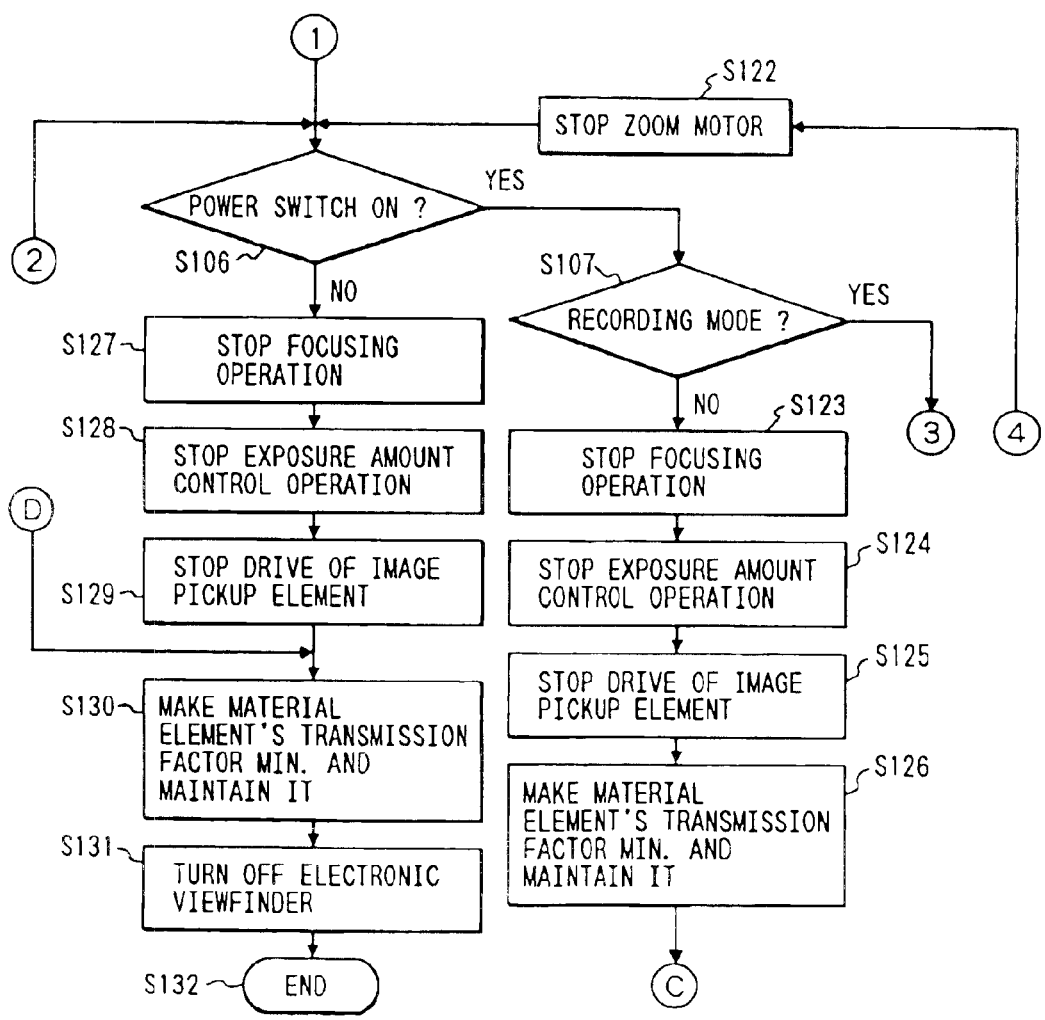
FIG. 41 is comprised of FIGS. 41A to 41C are flow charts for controlling the operation of a video camera according to the 18th embodiment of the present invention.
Figure 41C:
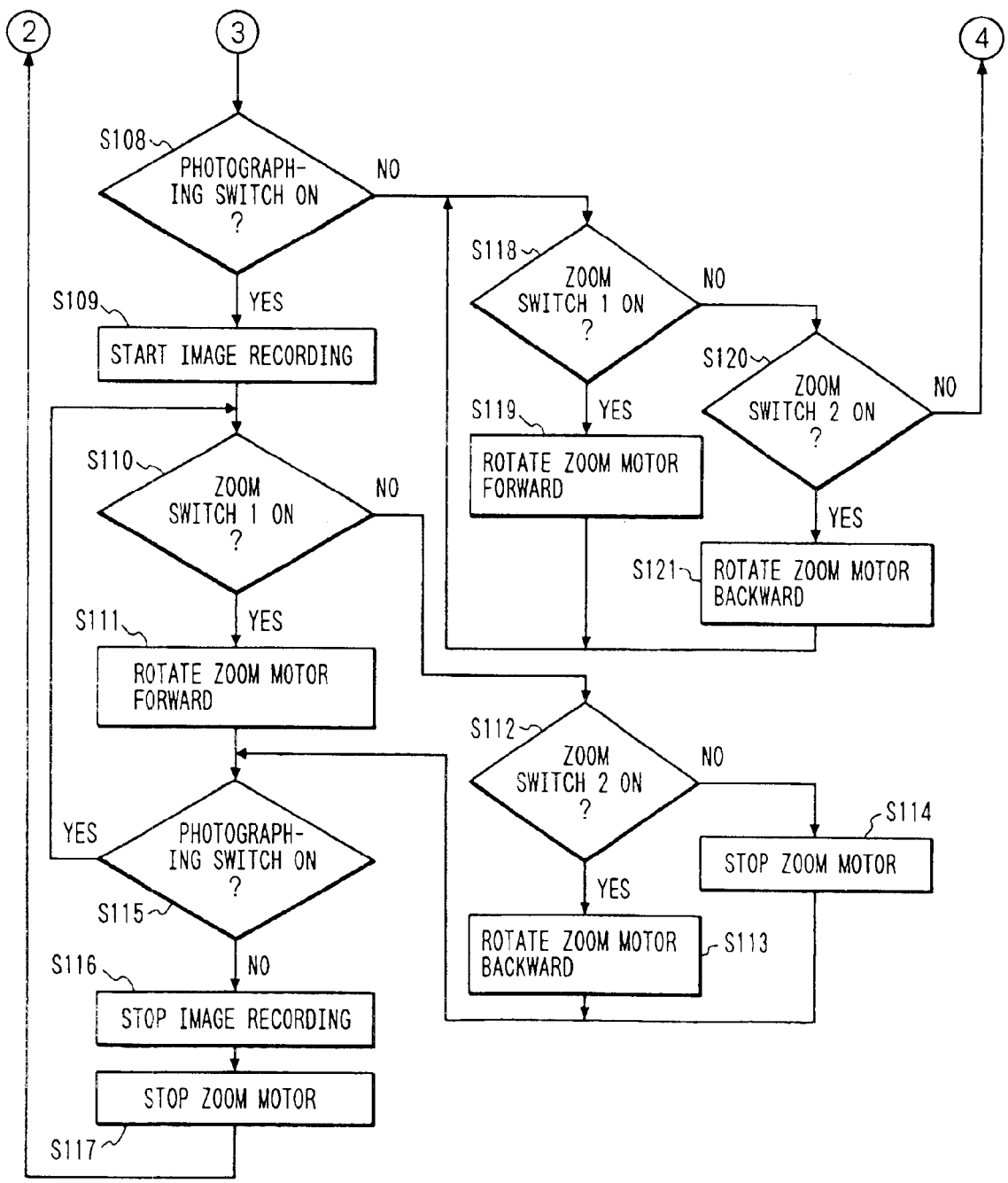

FIG. 39 is a schematic sectional view showing a video camera according to the 19th embodiment of the present invention, FIG. 40 is a block diagram showing a circuit arrangement of this embodiment, and FIGS. 41A to 41C are flow charts for controlling the operation of the video camera of this embodiment.

The same reference numerals in FIG. 39 denote the same parts or functions as in FIG. 1 of the first embodiment, and a detailed description thereof will be omitted.

Referring to FIG. 39, a mode change switch 400 is used for switching an operation mode between a recording mode and a reproduction mode. The camera has the camera control circuit 21, and the recording unit 22 and the power source 23, which are electrically connected to the camera control circuit 21. The camera control circuit 21 is also electrically connected to the focus motor 7, the zoom motor 8, the material element 9, the image pickup element 10, the electronic viewfinder 12, the power switch 14, the zoom operation unit 15, and the mode change switch 400.

The operation of this embodiment will be described below with reference to FIGS. 40 and 41A to 41C. In the following description, a brief explanation will be given for the same points as in the first embodiment shown in FIGS. 1 and 2.

The power switch 14 of the camera is operated to turn on the power source (S101), and it is checked if the camera is set in a recording mode by the mode change switch 400 (S102). If YES in step S102, the image pickup element is driven to move the focus lens 1a in the optical axis direction, so that the high-frequency components of a video signal output from the image pickup element 10 become maximized. The light transmission amount of the material element is controlled to obtain a constant image pickup signal level, thus performing exposure amount control (S104). At this time, the electronic viewfinder is turned on, and a photographed image can be observed (standby state).

It is checked if the power switch is ON (S106), it is checked if the recording mode is selected (S107), and it is then checked if the photographing switch is ON (S108). If it is determined in step S108 that the photographing switch is ON, image recording is started (step S109), and the forward/backward rotation of the zoom motor is controlled in accordance with the ON/OFF states of the zoom switches 1 and 2, thus allowing a zoom operation during a photographing operation (S110 to S114). It is checked again if the photographing switch is ON (S115). If YES in step S115, the flow returns to step S110; otherwise, image recording is stopped (S116), the zoom motor is stopped (S117), and the control returns to the standby state in step S106.

Even if it is determined in step S108 that the photographing switch is OFF, processing in steps S118 to S120 allows a zoom operation. A zoom operation in this case is the same as that in steps S110 to S114.

If it is determined in step S107 that the mode change switch is turned off to select a reproduction mode, the focus lens is stopped to stop a focusing operation (S123), and the drive operation of the material element is stopped to stop an exposure control operation (S124). Also, the drive operation of the image pickup element is stopped (S125). Furthermore, the light transmission factor of the material element is held to be a minimum value (S126). Thus, scorching of, e.g., the image pickup element due to incidence of strong light can be prevented. In this manner, the operation mode can be switched from the recording standby state to the reproduction mode.

If it is determined in step S106 that the power switch is turned off, the focusing operation is stopped (S127), the exposure amount control operation is stopped (S128), and the drive operation of the image pickup element is stopped (S129). Thereafter, the light transmission factor of the material element is held to be a minimum value (S130), and the electronic viewfinder is turned off (S131). Thus, the control ends (S132).

When the power switch 14 of the camera is operated to turn on the power source, and the camera is set in the reproduction mode by the mode change switch 400 (S102), the light transmission factor of the material element 9 is held to be a minimum value by the exposure amount control circuit 105. At this time, when a reproduction button (not shown) is depressed (S133), an image stored in a recording medium inserted in the camera is displayed on the electronic viewfinder 12 (S134). When a stop button (not shown) is depressed (S135), the image reproduction is stopped (S136). In this state, when the power switch 14 is turned off, the camera control circuit 21 confirms that the power switch 14 is turned off, and the image display on the electronic viewfinder is stopped. At the same time, the material element 9 is held in a minimum light transmission factor state. In this manner, the power source of the camera is turned off (S137→S130).

When the camera control circuit 21 confirms that the operation mode of the camera is switched from the reproduction mode to the recording mode by the mode change switch 400 (S138), the drive operation of the image pickup element 10, the focusing operation, the zoom operation, the exposure amount control operation, and the like are started, as described above, and the camera is set in the standby state of the recording mode (S138→S103).

A method of setting the light transmission factor or amount of the material element in a minimum state, and holding this state in this embodiment will be described below.

When the light transmission factor or amount of the material element of this embodiment becomes minimum if no voltage is applied to the material element (e.g., a negative type liquid crystal element), energization to the material element need only be turned off so as to set the light transmission factor or amount of the material element in a minimum state and to hold this state.

When the light transmission factor or amount of the material element of this embodiment is held in a state obtained when energization to the material element is turned off (e.g., an EC element), energization need only be performed until the light transmission factor or amount of the material element has a minimum state, and thereafter, the energization can be turned off, so as to set the light transmission factor or amount of the material element in a minimum state and to hold this state (for example, a constant voltage is applied for a predetermined period of time).

When the image pickup element is not active (e.g., when the power source of the camera is OFF, when the camera is set in the reproduction mode, and the like), the material element 9 is held in the minimum light transmission state, but may be held in a state near the minimum light transmission state or in a light shielding state.

As described above, according to the 16th to 19th embodiments of the present invention, in the camera which has the photographing optical system including the material element capable of controlling the light transmission factor or amount, and the photoelectric conversion means on the imaging plane of the photographing optical system or on a plane optically equivalent to the imaging plane, since the material element has a near infrared light cut filter function or is arranged integrally with a near infrared light cut filter, ease of assembling of the near infrared light cut filter can be improved, and the size and cost of the photographing optical system lens barrel can be reduced, thus providing a compact, low-cost camera.

Since the material element light transmission factor wavelength dependency characteristics storage circuit and the color balance correction means are arranged, the material element can be used in place of a conventional iris for mechanically adjusting an aperture portion, and a drive unit for the iris for mechanically adjusting the aperture portion can be omitted, thus providing a compact photographing optical system lens barrel, i.e., a compact video camera.

Also, the material element can be used in an exchangeable lens type video camera in place of the conventional iris.

In the video camera, which has the photographing optical system including the material element capable of controlling the light transmission factor or amount, when the image pickup element is not active, or when the power source of the camera is turned off, the material element is set in a light shielding state, or a minimum light transmission factor state or a state near the minimum light transmission factor state, or a minimum light transmission amount state or a state near the minimum light transmission amount state. For this reason, a compact video camera which can eliminate damage to the image pickup element due to incidence of light having a strong light intensity can be provided.

The 19th embodiment of the present invention will be described below.

This embodiment relates to an optical system having a light amount adjustment device and, more particularly, to an optical system having a light amount adjustment system, which is suitable for a camera such as a video camera, an electronic still camera, a still camera, and the like, which camera can widen the passing light amount adjustment range of the optical system by arranging a plurality of material elements capable of arbitrarily adjusting the transmission factor (light transmission factor) in the optical path of the optical system.

As described above, in order to realize a compact photographing optical system, attempts have been made to control the light amount adjustment range of the optical system by arranging a material element such as a liquid crystal element, an electrochromic (EC) element, or the like in the optical path of the optical system as a light amount adjustment device for adjusting the amount of light incident on an imaging plane in a video camera.

Even in a camera using a silver chloride film, a proposal has been made to control the amount of light beam incident on an imaging plane by utilizing a material element such as a liquid crystal element so as to realize an electronic iris device.

The conventional iris device for performing light amount adjustment by mechanically moving aperture blades to change the aperture size allows about 10 to 12 iris steps (the light amount ratio (maximum transmission light amount/minimum transmission light amount) of about 1,000 to 4,000)of light amount adjustment in a video camera. Also, in a video camera using a silver chloride film, the iris device allows about 5 to 8 iris steps (the light amount ratio of about 30 to 250) of light amount adjustment.

The light amount adjustment devices used in these cameras can adjust the passing light amount (transmission light amount) within a relatively wide range. However, the entire device becomes large in size, and is complicated.

In contrast to this, in another light amount adjustment device, a material element such as a liquid crystal element, an EC element, or the like is solely arranged in an optical path of an optical system, and the amount of light incident on an imaging plane is adjusted by changing the transmission factor of the material element. Such a light amount adjustment device is suitable for achieving the photographing optical system. However, it is difficult for this light amount adjustment device to perform light amount adjustment within a range as wide as that of the above-mentioned mechanical light amount adjustment device (iris device).

For this reason, the light amount adjustment range becomes insufficient, and a desired image cannot be easily obtained.

When the passing light amount of the optical system is to be adjusted by changing the transmission factor (density) of a single material element, a sufficient iris effect cannot be obtained. As a result, the depth of field cannot be increased, and harmful light beams cannot be effectively shielded.

The present invention has as its object to provide an optical system having a compact light amount adjustment device, which can obtain a wider light amount adjustment range, and can obtain a sufficient iris effect by arranging a plurality of material elements capable of arbitrarily adjusting the transmission factor in the optical path of the optical system.

An optical system having a light amount adjustment device of this embodiment is characterized in that the passing light amount is controlled by arranging a plurality of material elements capable of adjusting the transmission factor in the optical path of the optical system.

Also, an optical system having a light amount adjustment device of this embodiment is characterized in that when the passing light amount is controlled by arranging a plurality of material elements capable of adjusting the transmission factor in the optical path of the optical system, a light transmission region of at least one of the plurality of material elements is divided into a plurality of regions, and the transmission factor of at least one of the plurality of divided regions can be adjusted independently of the other regions.

Figure 42:
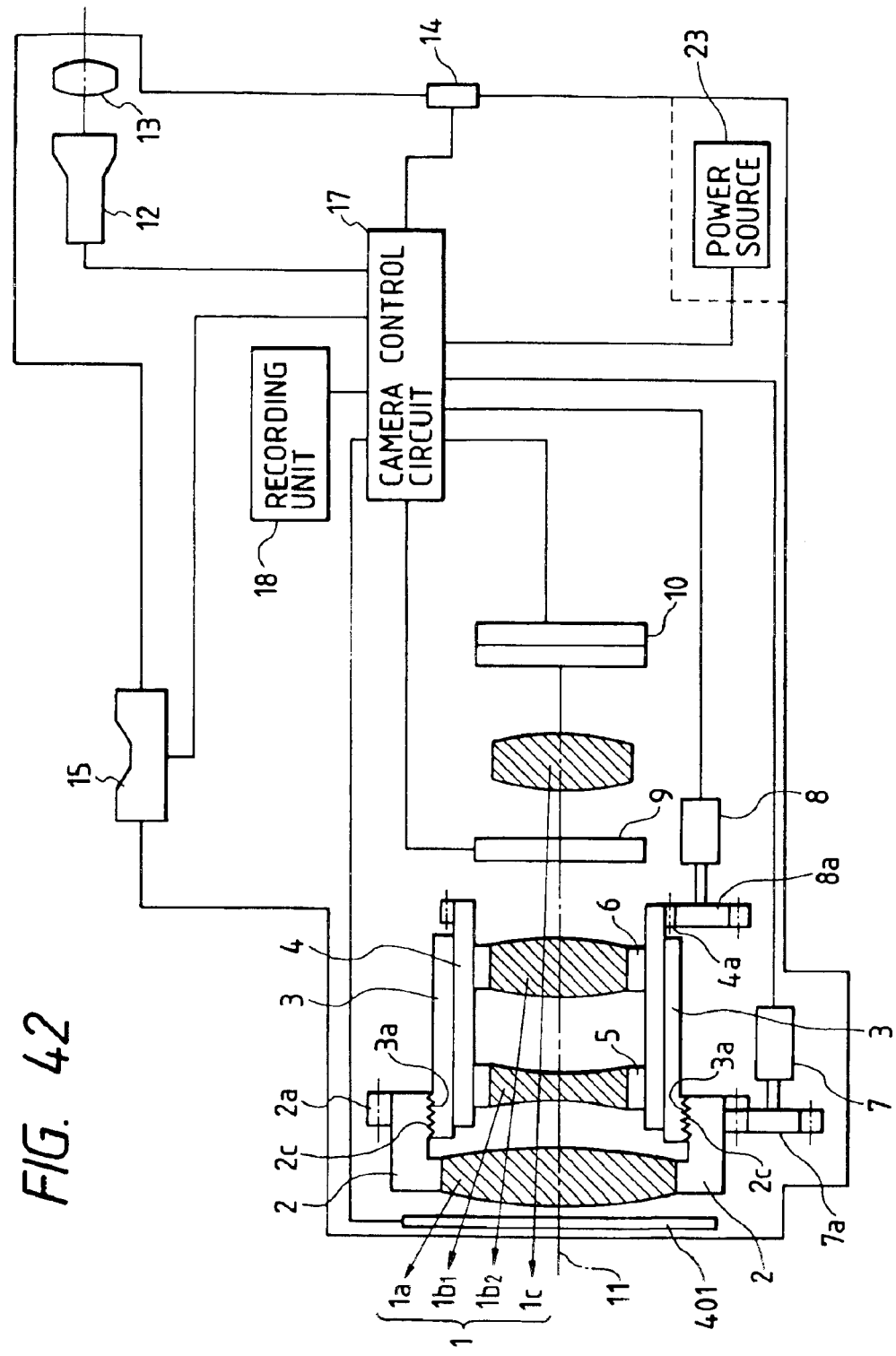
FIG. 42 is a schematic sectional view showing a video camera according to the 19th embodiment of the present invention.

FIG. 42 is a block diagram showing an arrangement of a video camera of this embodiment. The circuit arrangement and operation control of this embodiment are the same as those shown in the block diagram of FIG. 2 and the flow chart of FIG. 4 according to the first embodiment, and a detailed description thereof will be omitted.

The same reference numerals in FIG. 42 denote the same parts as in FIG. 1, and a detailed description thereof will be omitted.

Referring to FIG. 42, material elements 9 and 401 comprise liquid crystal elements, electrochromic (EC) elements (e.g., prepared by forming a conductive film of, e.g., a transition metal oxide ($IrO_x$, $Ta_2O_5$, $WO_3$, or the like) on the surface of a glass plate having a thickness of about 0.3 to 1 mm), and the like. The material elements 9 and 401 have a function of arbitrarily controlling their transmission factors or amounts upon application of a voltage thereto.

In this embodiment, the material element 9 is arranged near an iris in an optical path between a zoom lens 1b2 and the stationary lens 1c, and the material element 401 is arranged in an optical path in front of the focus lens 1a. The two material elements 9 and 401 arbitrarily adjust the passing light amount (transmission light amount) of a light beam of the optical system (photographing optical system 1 to widen the light amount adjustment range, thus performing proper exposure.

Other arrangements are the same as those in the block diagram shown in FIG. 1, and the respective components are controlled by the camera control circuit.

Although the operation control sequence is the same as that in the first embodiment shown in FIG. 4, the light transmission amount and the light transmission factor are controlled by a combination of both the two material elements 9 and 401 in this embodiment.

An optical effect obtained when the two material elements 9 and 401 according to this embodiment are used will be described below.

For example, assume that the minimum and maximum transmission factors of the material element 9 are represented by $A_{MIN}$ and $A_{MAX}$, and the material element 9 can adjust the passing light amount (transmission light amount) within a range from the minimum transmission factor $A_{MIN}$ to the maximum transmission factor $A_{MAX}$. At this time, the minimum and maximum transmission factors $A_{MIN}$ and $A_{MAX}$ satisfy the following relation:

$$0 < A_{MIN} < A_{MAX} < 1 \quad (1)$$

A ratio (light amount ratio) R1 between the maximum transmission factor $A_{MAX}$ to the minimum transmission factor $A_{MIN}$ is given by:

$$R1 = A_{MAX}/A_{MIN} (>1) \quad (2)$$

Similarly, the same for the material element 9 applies to the material element 401. For example, assume that the minimum and maximum transmission factors of the material element 401 are represented by $B_{MIN}$ and $B_{MAX}$, and the material element 401 can adjust the passing light amount (transmission light amount) within a range from the minimum transmission factor $B_{MIN}$ to the maximum transmission factor $B_{MAX}$. At this time, the minimum and maximum transmission factors $B_{MIN}$ and $B_{MAX}$ satisfy the following relation:

$$0 < B_{MIN} < B_{MAX} < 1 \quad (3)$$

A ratio (light amount ratio) R2 between the maximum transmission factor $B_{MAX}$ to the minimum transmission factor $B_{MIN}$ is given by:

$$R2 = B_{MAX}/B_{MIN} (>1) \quad (4)$$

The transmission factor (the adjustment range of the passing light amount) of the optical system upon synthesis of the material elements 9 and 401 ranges from $A_{MIN} \cdot B_{MIN}$ to $A_{MAX} \cdot B_{MAX}$.

A ratio (light amount ratio) R of the maximum transmission factor to the minimum transmission factor is given by:

$$R = (A_{MAX} \cdot B_{MAX})/(A_{MIN} \cdot B_{MIN}) \quad (5)$$

$$= (A_{MAX}/A_{MIN}) \cdot (B_{MAX}/B_{MIN})$$

$$= R1 \cdot R2$$

As can be apparent from equation (5), the value of the light amount ratio R is larger by R2 ($B_{MAX}/B_{MIN}$ (>1)) times than that obtained by, e.g., the material element 9 alone.

That is, the passing light amount adjustment using a plurality of material elements can make the light amount adjustment range wider than that using the material element 9 alone.

In this embodiment, as described above, the two material elements 9 and 401 are arranged in the optical path of the optical system to widen the passing light amount adjustment range, thereby obtaining desired optical performance.

Note that the two material elements 9 and 401 in this embodiment may have either the same or different characteristics (transmission factor), and the present invention can be applied to either case.

In this embodiment, the two material elements 9 and 401 are arranged to sandwich the optical members (the lenses 1a, 1b1, and 1b2) therebetween. However, the present invention is not limited to these arrangement positions. For example, the two material elements 9 and 401 may be arranged adjacent to each other. The number of material elements is not limited to two, but three or more material elements may be used. Then, the passing light amount can be adjusted within a still wider range.

(20th Embodiment)

FIGS. 43A and 43B are a side view and a front view of one of a plurality of material elements according to the 20th embodiment of the present invention.

In this embodiment, a difference from the 19th embodiment is that at least one of two material elements is arranged near an iris position of an optical system, a region of the material element at that time is divided into a plurality of concentric regions, and the transmission factor of at least one of the divided regions can be adjusted independently of the other regions. Other arrangements and optical effects are substantially the same as those in the 19th embodiment.

More specifically, in this embodiment, one material element (represented by reference numeral 402 in this case) is divided into a plurality of concentric pattern regions 402a to 402g, as shown in FIG. 43B (although the element is divided into seven regions in this embodiment, the present invention is not limited to this number of divided regions) and the transmission factors of the divided regions 402a to 402g are independently adjusted, as shown in, e.g., FIGS. 44A to 44H, thus satisfactorily obtaining a stopped-down effect (e.g., to obtain a desired image by increasing/decreasing the depth of field).

Referring to FIGS. 44A to 44H, hatched regions have a smaller transmission factor than that of the other regions. The material element 402 is independently controlled in units of regions 402a to 402g, so that the transmission factor is sequentially decreased (the depth of field is sequentially increased) from FIG. 44A toward FIG. 44H. In this manner, the depth of field is increased/decreased to obtain an iris effect.

(21st Embodiment)

FIG. 45 is a side view showing a light amount adjustment device using material elements according to the 21st embodiment of the present invention. FIG. 45 shows a mounting portion of the material element.

In this embodiment, a difference from the 19th embodiment is that a light amount adjustment device is constituted as a unit by forming material elements 422 and 423 respectively on a light incident surface 421a and a light exit surface 421b of a transparent substrate 421 consisting of, e.g., glass, and the unit is arranged at an arbitrary position in the optical path of the optical system. Other arrangements and optical effects are substantially the same as those in the 19th embodiment.

More specifically, since one material element 422 of the two material elements 422 and 423 is formed on the light incidence surface 421a of the transparent substrate 421, and the other material element 423 is formed on the light exit surface 421b, the same effect as in the 19th embodiment can be obtained, and the light amount adjustment apparatus can be constituted as a unit, thereby realizing a simple, compact structure of the entire device.

Note that at least one of the two material elements 422 and 423 may be divided into a plurality of concentric regions, as shown in FIGS. 43A and 43B illustrating the 20th embodiment, and the passing light amounts of the plurality of divided regions may be independently adjusted. Thus, the iris effect can be obtained as in the 20th embodiment described above.

(22nd Embodiment)

FIGS. 46A and 46B are a side view and a front view of a light amount adjustment device according to the 22nd embodiment of the present invention.

In this embodiment, a difference from the 21st embodiment described above is that a material element 426 is formed only on a region 428 outside the area (hatched region) of a circle 427 having the optical axis as the center on at least one surface of a transparent substrate 424. Other arrangements and optical effects are substantially the same as those in the 21st embodiment described above.

For example, when the passing light amount of an optical system is to be adjusted using two material elements each having a not so large maximum transmission factor, the maximum transmission factor of the optical system may often be considerably lowered. For example, when two material elements each having a maximum transmission factor of 90% are used, the synthesized maximum transmission factor of the optical system is about 81%. However, when two material elements each having a maximum transmission factor of 50% are used, the synthesized maximum transmission factor of this optical system is undesirably lowered to about 25%.

Thus, in this embodiment, as shown in FIGS. 46A and 46B, a material element 425 is formed on substantially the entire light incident surface 424a of the transparent substrate 424 consisting of, e.g., glass as in the 21st embodiment, and the material element 426 is formed only on the region 428 outside the area (batched region) of the circle 427 having the optical axis as the center on a light exit surface 424b, thereby increasing the passing light amount.

Thus, even when a plurality of material elements having low maximum transmission factors are used, the synthesized maximum transmission factor can be prevented from being considerably lowered. Also, the passing light amount adjustment range can be widened to some extent. Furthermore, a certain iris effect can be obtained by the material element 426.

Note that the area of the circle 427 on the light exit surface 424b on which no material element is formed can be arbitrarily set in accordance with the characteristics (transmission factor) of a material element to be used.

In this embodiment as well, the material element 425 may be divided into a plurality of concentric regions, and the passing light amounts of the divided regions may be independently adjusted like in the 20th embodiment described above. Alternatively, the material element 426 may be divided into a plurality of regions having concentric circular patterns having the optical axis as the center, and the passing light amounts of the divided regions may be independently adjusted.

In this embodiment, the two material elements 425 and 426 are integrally formed on the light incident surface 424a and the light exit surface 424b of the transparent substrate 424. However, the present invention is not limited to this. For example, the material elements 425 and 426 may be arranged at different positions as in the 19th embodiment.

(23rd Embodiment)

FIG. 47 is a schematic sectional view of the 23rd embodiment wherein the present invention is applied to a video camera. The same reference numerals in FIG. 47 denote the same parts as in FIG. 42.

In this embodiment, a difference from the 19th embodiment described above is that material elements are formed on a plurality of surfaces of light incident surfaces and light exit surfaces of optical members constituting the photographing optical system 1, such as a plurality of lenses, an optical lowpass filter 437, a protection glass for protecting the image pickup element 10, and the like. Other arrangements and optical effects are substantially the same as those in the 19th embodiment described above.

More specifically, in this embodiment, the material element 9 is formed on the light exit surface of the stationary lens 1c, and the material element 401 is formed on the light incident surface of the optical lowpass filter 437. In addition to the same effect as in the 19th embodiment described above, a light amount adjustment device can be rendered compact, and the entire optical system can also be rendered compact.

In each of the above embodiments, the present invention is applied to a video camera. However, the present invention is not limited to the video camera, but may be similarly applied to any other optical systems such as an optical system of a still camera using a silver chloride film as in the above embodiments.

According to the above embodiments, when a plurality of material elements capable of arbitrarily adjusting the transmission factor are arranged in the optical path of the optical system, as described above, an optical system having a compact light adjustment device, which can obtain a wider light amount adjustment range by a simple arrangement, and can obtain a sufficient iris effect, can be realized.

(24th Embodiment)

The 24th embodiment according to the present invention will be described below.

As described above, in recent years, in order to realize a compact optical system, it has been proposed that the transmission light amount of the optical system is adjusted using a material element such as a liquid crystal element, an electrochromic (EC) element, or the like in place of an iris device for mechanically adjusting the aperture area of an iris aperture portion. When the transmission light amount of the optical system is adjusted using an iris device consisting of the material element, there have been proposed a method wherein a material element is arranged in concentric circular patterns having the optical axis as the center, and light transmission/shielding states of these patterns are independently controlled to adjust the area of the iris aperture portion, thereby making the amount of light transmitted through the optical system and reaching a photoelectric conversion element constant; and a method wherein when the incident light amount to the optical system is small, the light transmission factor of a material element is increased, and when the light incident amount to the optical system is large, the light transmission factor of the material element is decreased, thereby making the amount of light reaching the photoelectric conversion element constant.

However, a meter iris used in the iris device for mechanically adjusting the iris aperture area in a conventional video camera requires a long period of time when the iris aperture area changes from a "0" state (close state) to a full-aperture state (open state), and vice versa. When the amount of light incident on a video camera optical system changes at a speed beyond the aperture area adjustment speed of the iris device, the video camera suffers from an over or under exposure amount. For example, when a user quickly goes outdoor from an indoor photographing state, an over exposure amount may often be instantaneously obtained.

Even when the exposure amount of the video camera is adjusted using the material element, since a change in transmission factor of the material element also requires a long period of time, an under or over exposure state may occur depending on the photographing condition as in the iris device for mechanically adjusting the aperture area. In particular, at a low temperature, since the light transmission factor change speed of the material element is considerably lowered, an increase in the frequency of occurrence of under or over exposure states of the video camera poses a serious problem.

This embodiment has as its object to provide a video camera, which can perform proper exposure amount control free from an under or over exposure state even when the amount of light incident on an optical system changes quickly.

In order to achieve the above object, according to this embodiment, there is provided a video camera, which has an optical system for forming an object image on an image pickup element, and transmission light amount adjustment means, arranged in an optical path of the optical system, for adjusting the transmission light amount, comprising light accumulation time adjustment means for adjusting a light accumulation time of the image pickup element, and exposure amount control means for, when a change speed of the amount of light incident on the optical system becomes larger than a light amount change speed corresponding to an adjustment limit of the transmission light amount adjustment means, changing the light accumulation time of the image pickup element until exposure amount adjustment by the transmission light amount adjustment means is enabled.

Furthermore, the video camera further comprises gain adjustment means for adjusting a gain of a video signal, and the gain adjustment means can be operated together with the exposure amount control means.

In order to achieve the above object, there is also provided a video camera, which has an optical system for forming an object image on an image pickup element, and a material element, arranged in an optical path of the optical system, for adjusting the transmission light amount, comprising gain adjustment means for adjusting a gain of a video signal, and exposure amount control means for changing the gain of the video signal in addition to the transmission light amount adjustment of the material element until exposure amount adjustment by the material element alone is enabled, under a condition that a change speed of the amount of light incident on the optical system becomes larger than the light amount change speed corresponding to an adjustment light of the material element.

On the other hand, the video camera may comprise light accumulation time adjustment means for adjusting a light accumulation time of the image pickup element, and the light accumulation time adjustment means can adjust the light accumulation time of the image pickup element together with the exposure amount control means.

With the above-mentioned means, the exposure amount can be corrected by temporarily adjusting the light accumulation time of the image pickup element or the gain of the video signal. Even when the aperture area adjustment speed of an iris mechanism cannot follow a quick change in amount of light incident on the optical system, such a problem can be temporarily compensated for. Therefore, even when the amount of light incident on the optical system changes quickly, proper exposure amount control can be performed, and a high-quality image can be obtained.

Figure 48:
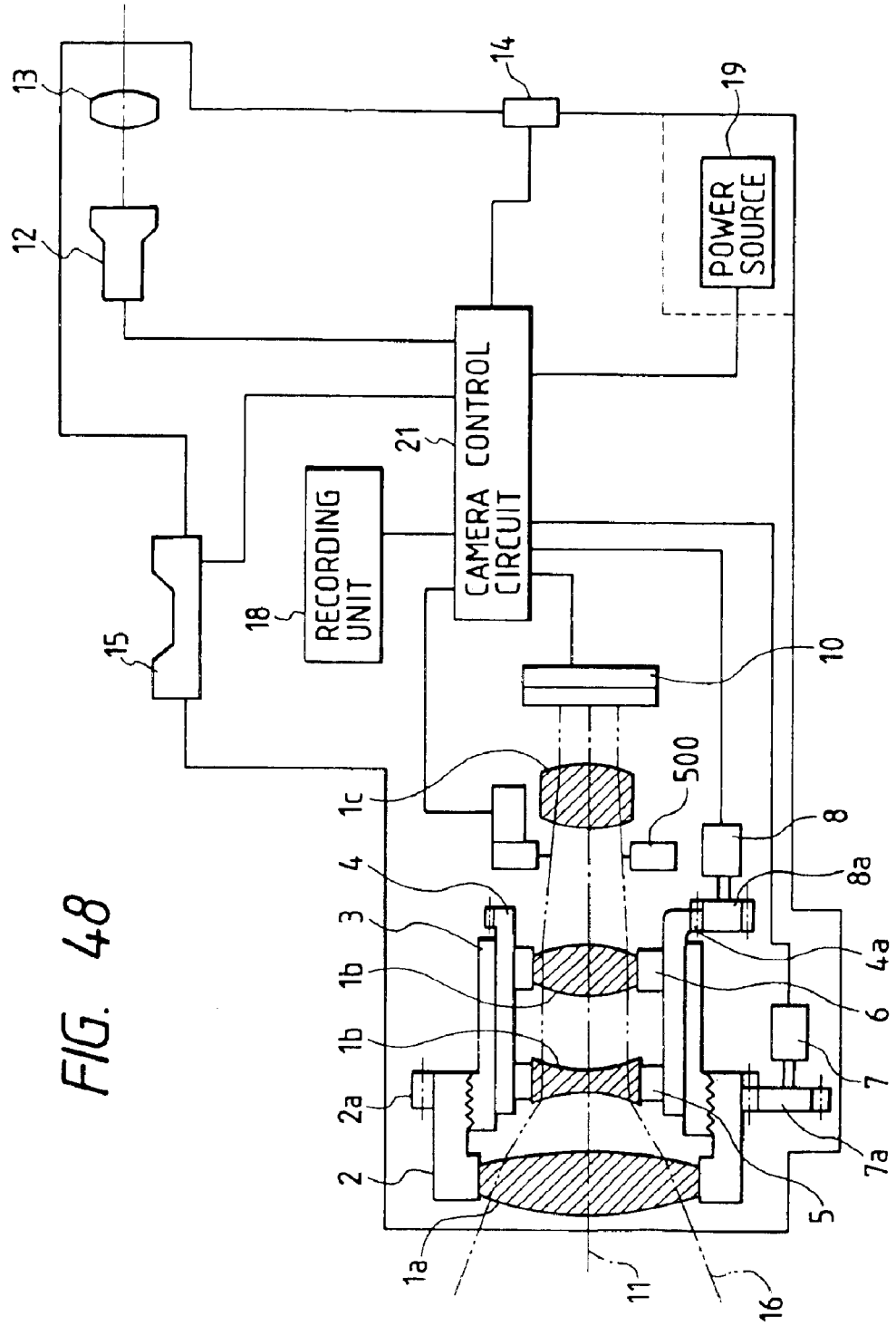
FIG. 48 is a schematic sectional view showing a video camera according to the 23rd embodiment of the present invention.

FIG. 48 is a schematic sectional view showing a video camera according to the 24th embodiment of the present invention. Since the circuit arrangement of this embodiment is the same as that shown in the block diagram of FIG. 2 in the first embodiment, and operation control is the same as that shown in the flow chart of FIG. 4, a detailed description thereof will be omitted.

Referring to FIG. 48, a photographing optical system is constituted by a focus lens 1a, zoom lenses 1b, and a stationary lens 1c. The focus lens 1a is held by a focus lens holding frame 2, which has a gear portion 2a. A stationary portion 3 is threadably engaged with the focus lens holding frame 2. Furthermore, a cam cylinder 4 has a cam groove for determining the positions of the zoom lenses 1b, and is rotatably held by the stationary portion 3. The zoom lenses 1b are held by lens frames 5 and 6.

The focus lens holding frame 2 is pivoted by a focus motor 7. A gear 7a attached to the rotational shaft of the motor 7 is engaged with the gear portion 2a. The cam cylinder 4 is pivoted by a zoom motor 8. A gear 8a is attached to the rotational shaft of the motor 8. Note that the gear 8a is engaged with a gear portion 4a of the cam cylinder 4. A galvano iris 500 is used for adjusting the transmission light amount of the photographing optical system.

An image pickup element 10 employs a photoelectric conversion element such as a CCD. The photographing optical system has an optical axis 11. An electronic viewfinder 12 has an eyepiece lens 13. Furthermore, the camera includes a power switch 14, and a zoom operation member 15. The camera also includes a camera control circuit 21, and a recording unit 18 and a power source 19, which are electrically connected to the camera control circuit 21. The camera control circuit 21 is electrically connected to the focus motor 7, the zoom motor 8, the galvano iris 500, the image pickup element 10, the electronic viewfinder 12, the power switch 14, and the zoom operation member 15. Note that an effective light beam 16 is indicated by an alternate long and two short dashed line.

Figure 49A:
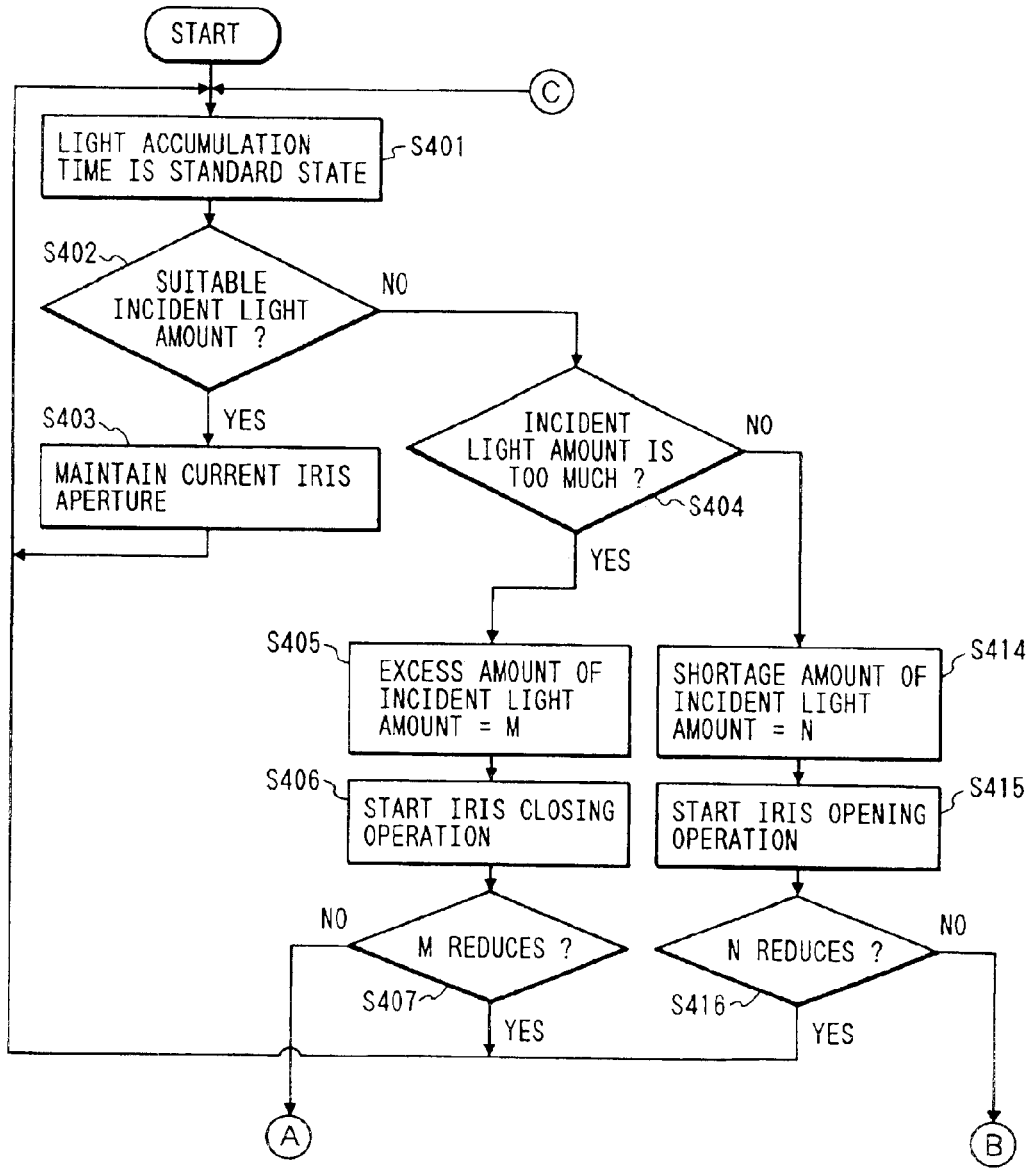
FIGS. 49A and 49B are flow charts showing an exposure amount control operation in the embodiment shown in FIG. 48.
Figure 49B:
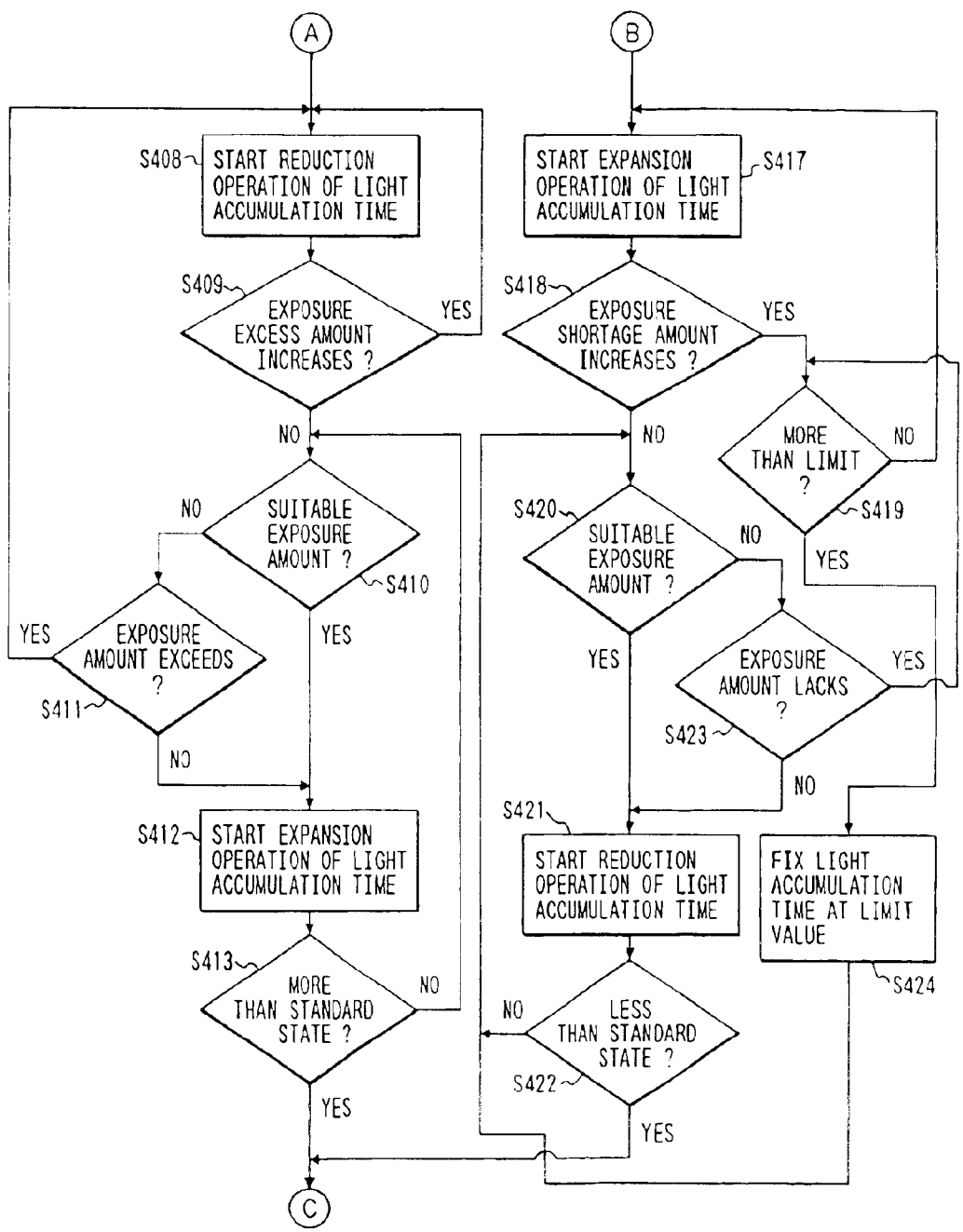

An exposure amount control operation will be described below with reference to FIGS. 49A and 49B. FIG. 49B shows processing following FIG. 49A.

When the exposure amount adjustment operation is started, the light accumulation time of the image pickup element (CCD) 10 is set in a standard state (S401). In this state, if the incident light amount on the image pickup element 10 is proper (S402), the aperture size of the galvano iris 500 is maintained (S403). However, if the incident light amount on the image pickup element 10 is too much (S404), an iris closing operation of the galvano iris 500 is started (S405, S406). At this time, if the excess amount of the incident light amount on the image pickup element 10 decreases (S407), light amount adjustment using the galvano iris 500 is continued. However, if the excess amount does not change or increases, the light accumulation time of the image pickup element 10 is gradually shortened (S408, S409) in addition to the light amount adjustment using the galvano iris 500, so that the exposure amount approaches a proper value. When the incident light amount reaches or becomes close to the proper exposure amount (S410, S411), the light accumulation time of the image pickup element 10 is gradually prolonged (S412), and is then restored to the standard state (S413).

When the incident light amount on the image pickup element 10 runs short (S404, S414), an iris opening operation of the galvano iris 500 is started (S415). If the shortage amount of the incident light amount on the image pickup element 10 decreases, the light amount adjustment using the galvano iris 500 is continued. However, if the shortage amount does not change or increases (S416), the light accumulation time of the image pickup element 10 is prolonged up to a limit value (S417, S418, S419) in addition to the light amount adjustment using the galvano mirror 9, so that the exposure amount approaches a proper value. When the incident light amount reaches or becomes close to a proper exposure amount (S420), the light accumulation time of the image pickup element 10 is gradually shortened (S421, S422), and is restored to the standard state. When the exposure amount runs short (S423), it is checked if the light accumulation time is equal to or larger than a limit value (S419). If it is determined that the light accumulation time is equal to or larger than a limit value, the light accumulation time is fixed at a limit value (S424).

Figure 50A:
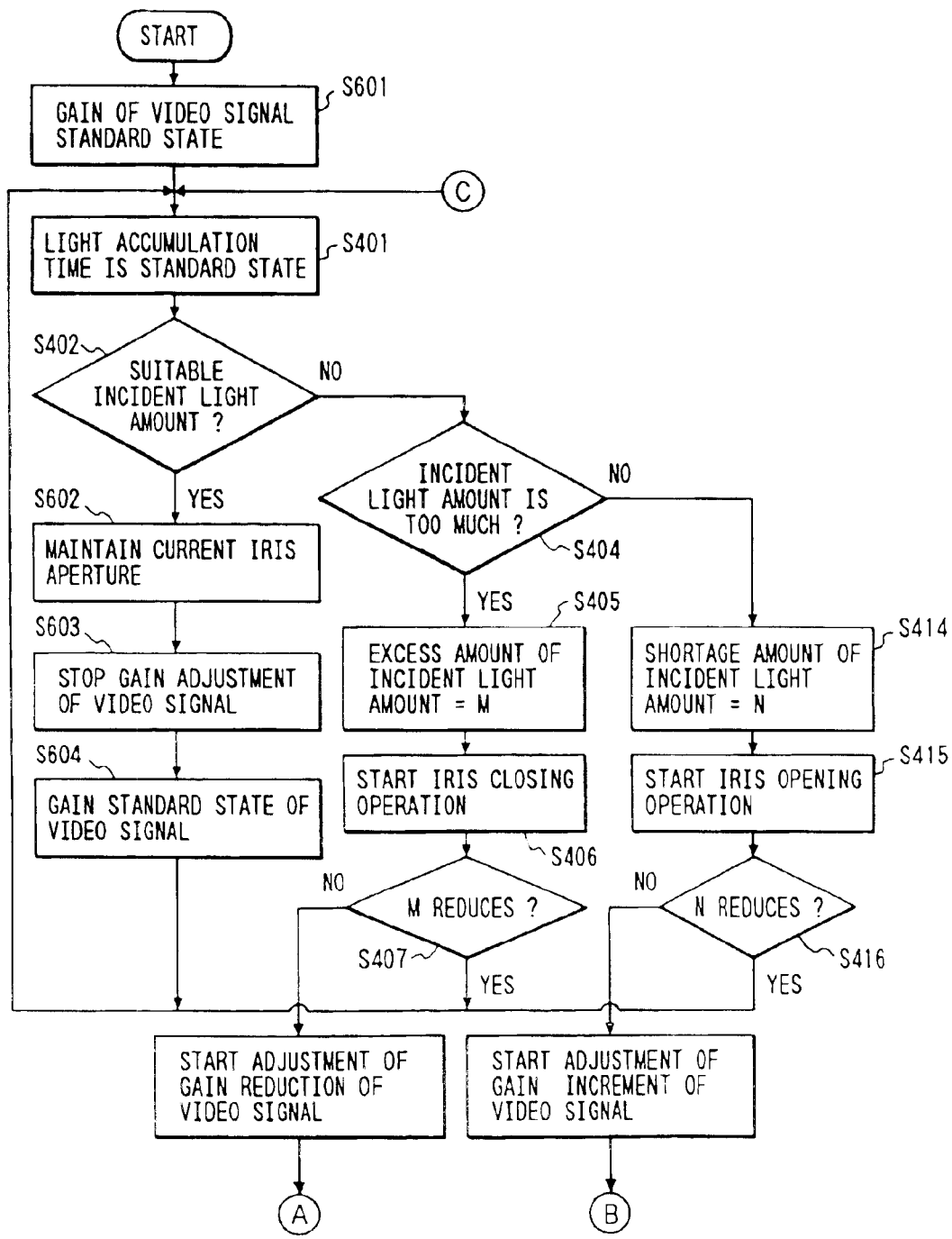
FIGS. 50A and 50B are flow charts showing the second example of the exposure amount control operation.
Figure 50B:
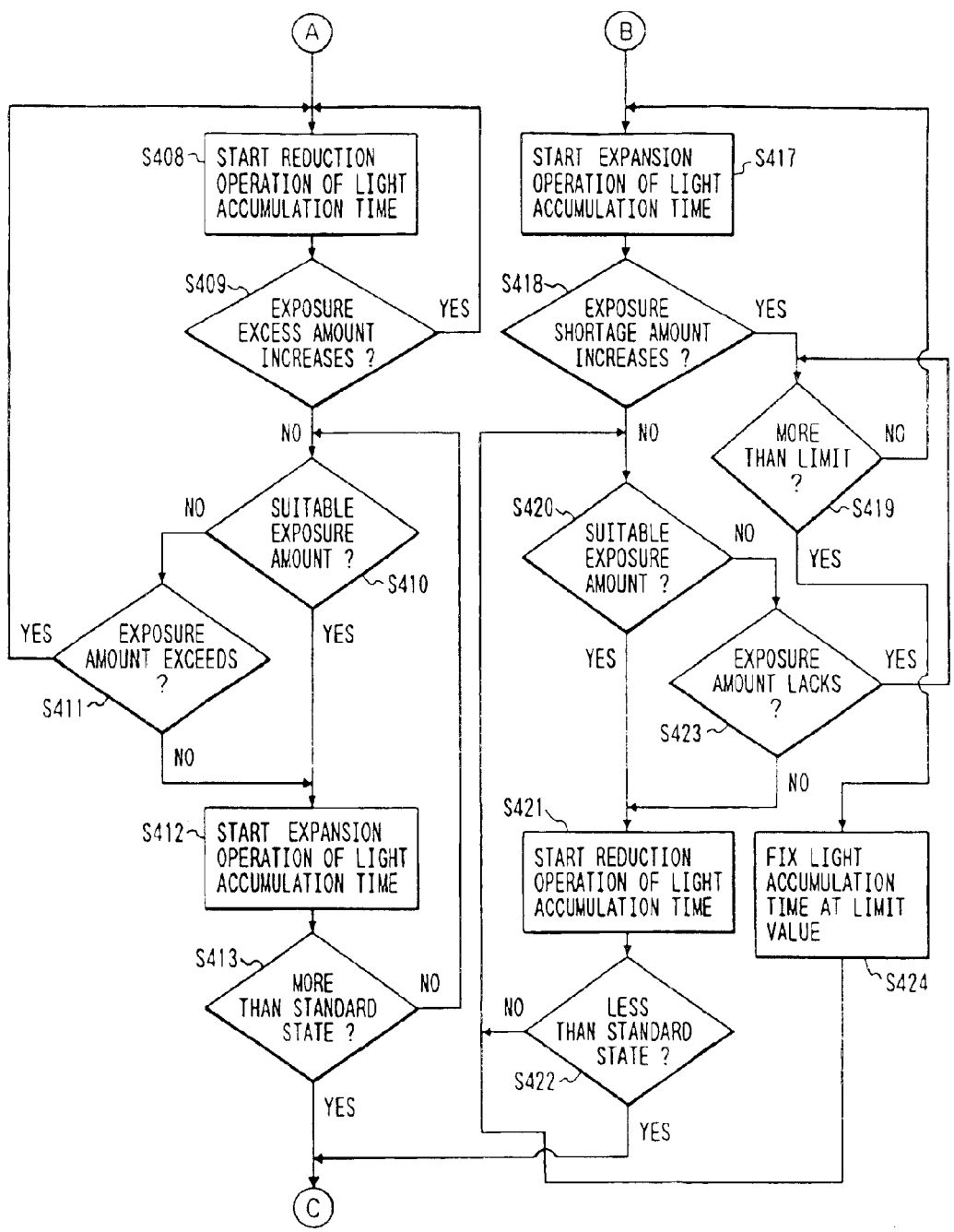

FIGS. 50A and 50B are flow charts showing the second example of an exposure amount control operation. Although the flow chart of FIG. 50A is followed by the flow chart of FIG. 50B, since the flow chart of FIG. 50B is the same as that of FIG. 49B, a detailed description thereof will be omitted. Also, since steps of executing the same processing as in FIG. 49A are denoted by the same reference numerals in the flow chart of FIG. 50A, a repetitive description thereof will be avoided.

The gain of the image pickup element 10 is set in a standard state (S601), and the light accumulation time of the image pickup element 10 is set in the standard state (S401). In this state, if the incident light amount on the image pickup element 10 is proper, the aperture size of the galvano iris 500 is maintained (S602). Furthermore, gain adjustment of a video signal is stopped (S603), and the gain of the video signal is set in the standard state (S604). Thereafter, the flow returns to step S401, and the subsequent processing is repetitively executed. If it is determined in step S402 that the incident light amount is improper, it is checked in step S404 if the incident light amount is too much, as has been described above with reference to FIG. 49A. If it is determined in step S404 that the incident light amount is too much, processing in steps S405 to S407 is executed. If it is determined in step S407 that M does not decrease, adjustment of gain reduction of the video signal is started, and the flow continues to node Ⓐ in FIG. 49B. Similarly, if it is determined in step S404 that the incident light amount runs short, processing in steps S414 to S416 is executed. If it is determined in step S416 that N does not decrease, adjustment of gain increment of the video signal is started, and the flow continues to node Ⓑ in FIG. 49B. Since processing in FIG. 50B is the same as that shown in FIG. 49B, a detailed description thereof will be omitted.

Figure 51:
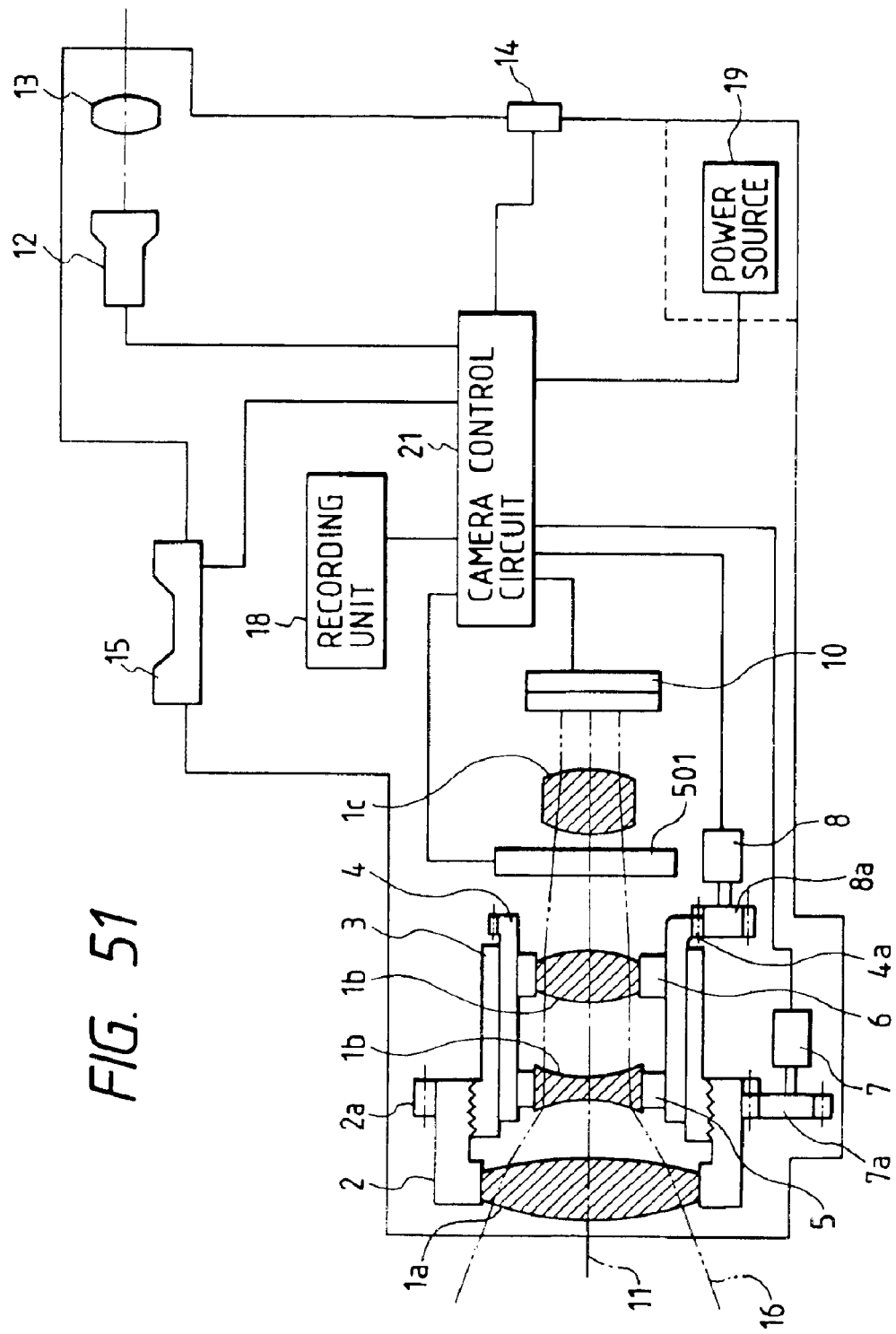
FIG. 51 is a schematic sectional view showing a video camera according to the 24th embodiment of the present invention.

FIG. 51 is a schematic sectional view showing another arrangement of a video camera according to the present invention. Since the same reference numerals in FIG. 51 denote the same parts as in FIG. 48, a repetitive description thereof will be avoided here. Also, since the circuit block diagram showing a control system of this embodiment, and the flow chart showing the operation of the control circuit are the same as those in FIGS. 2 and 4 of the first embodiment, a detailed description thereof will be omitted.

This embodiment is characterized in that a material element 501 comprising, e.g., an electrochromic (EC) element, a liquid crystal element, or the like capable of adjusting the transmission light amount is arranged in the optical path of the photographing optical system. The material element 501 is electrically connected to the camera control circuit 21.

Figure 52A:
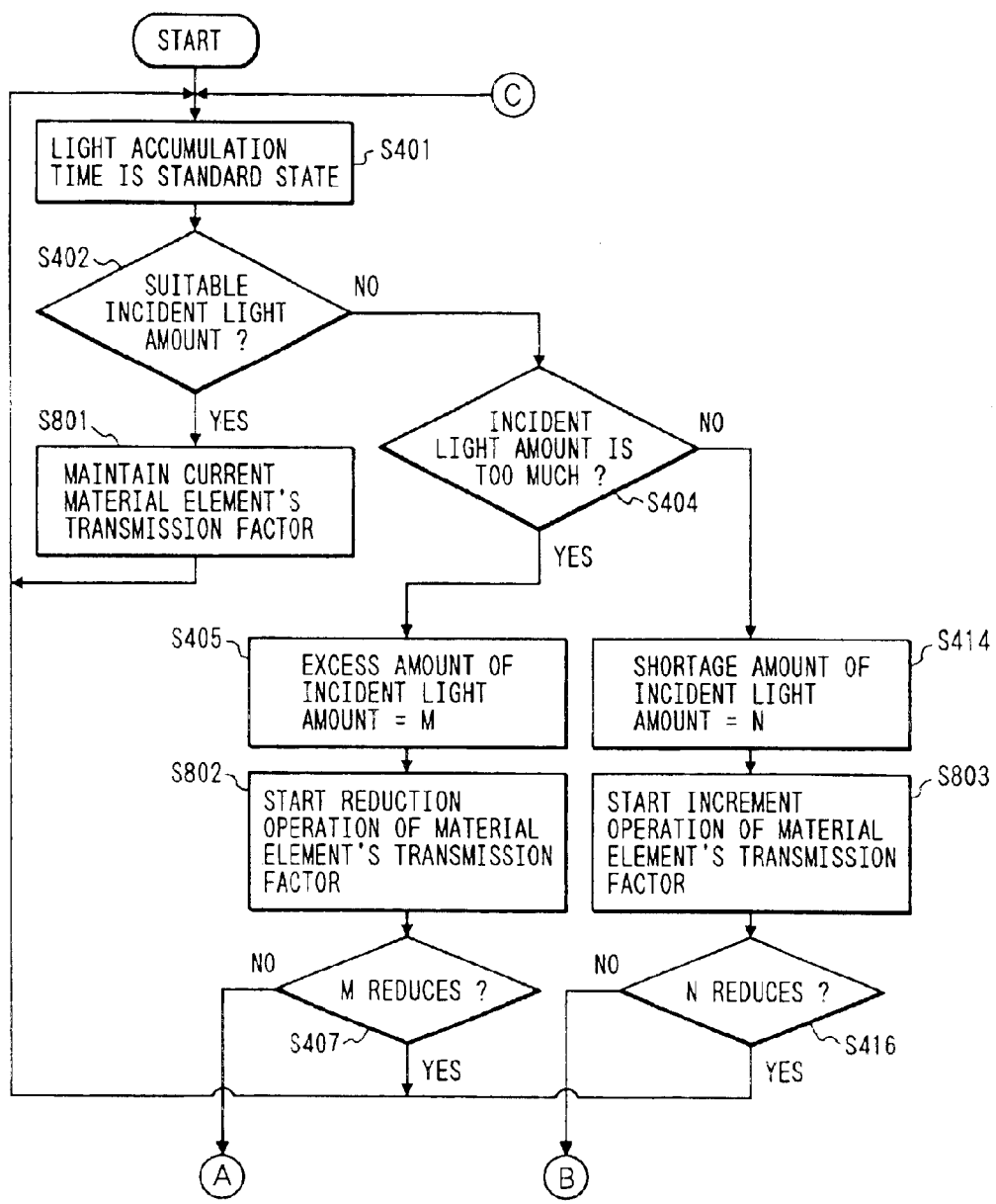
FIGS. 52A and 52B are flow charts showing an exposure amount control operation in the embodiment shown in FIG. 51.
Figure 52B:
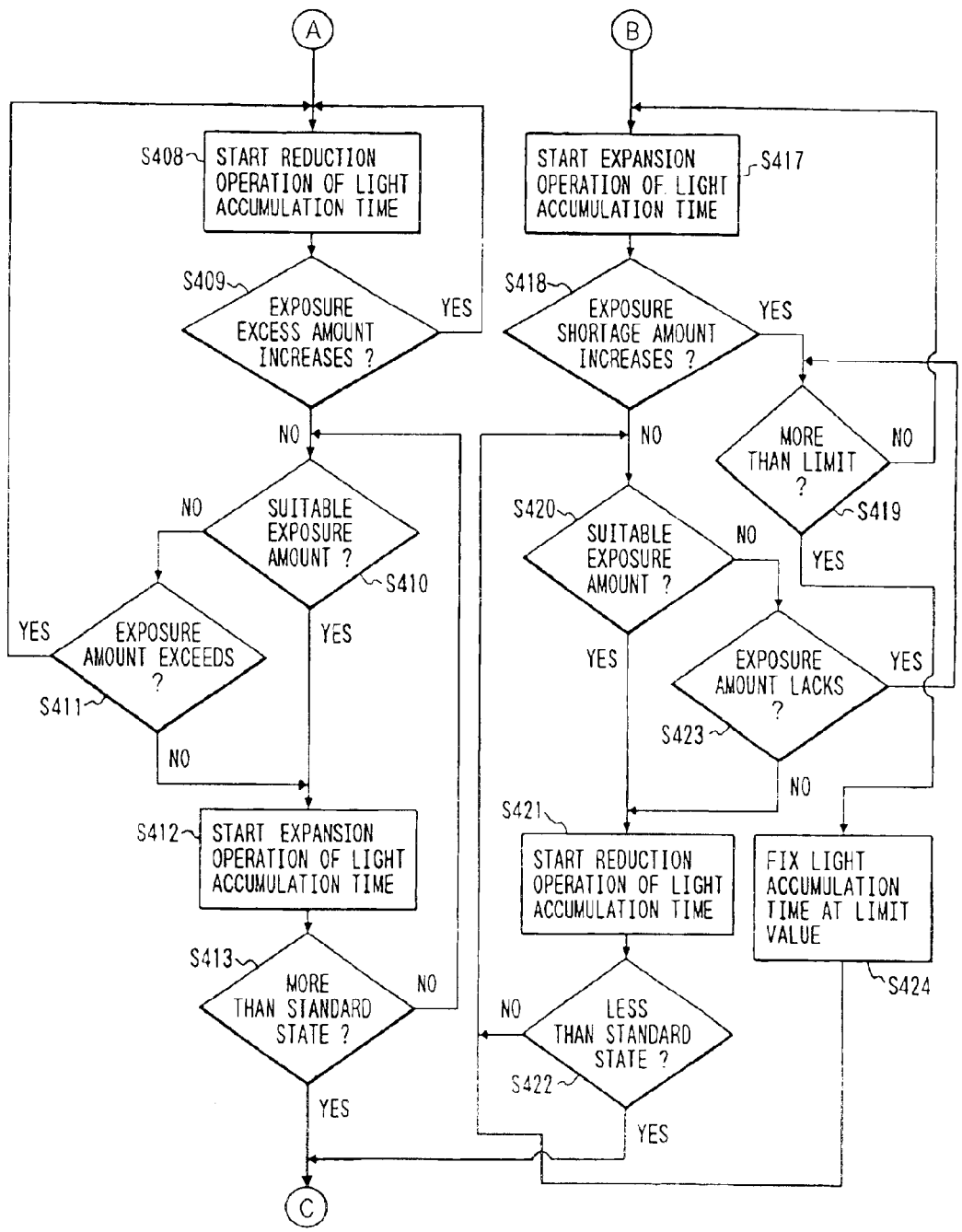

The exposure amount control operation of the embodiment shown in FIG. 51 will be described below with reference to the flow charts of FIGS. 52A and 52B (for explaining the exposure amount control operation). Although processing in FIG. 52A is followed by processing shown in FIG. 52B, the processing shown in FIG. 52B is the same as that in FIG. 49B, a description thereof will be omitted. Since the same reference numerals in FIGS. 52A and 52B denote the same steps as in FIGS. 49A and 49B, a repetitive description thereof will be avoided here.

When the light amount adjustment operation is started, the light accumulation time of the image pickup element 10 is set in the standard state (S401). In this state, it is checked if the incident light amount on the image pickup element 10 is proper (S402). If it is determined that the incident light amount is proper, the current light transmission factor (or light transmission amount) of the material element 501 is maintained (S801), and the flow returns to step S401. However, if the incident light amount on the image pickup element 10 is too much, processing for increasing the light transmission factor of the material element 501 is executed in step S404 and subsequent steps.

In this case, if the excess amount of the image pickup element 10 decreases (S404), light amount adjustment using the material element 501 is continued. However, if the excess amount does not change or increases, the light accumulation time of the image pickup element 10 is shortened in addition to the light amount adjustment using the material element 501, so that the exposure amount approaches a proper value (S405, S802, S407). When the incident light amount reaches or becomes close to a proper exposure amount, the light accumulation time of the image pickup element 10 is prolonged, and is restored to the standard state.

On the other hand, when the incident light amount on the image pickup element 10 runs short, an operation for decreasing the light transmission factor of the material element 501 is executed (S414, S803, S416). At this time, when the shortage amount of the incident light amount decreases, light amount adjustment using the material element 501 is continued. However, when the shortage amount does not change or increases, the light accumulation time of the image pickup element 10 is prolonged up to its limit value in addition to the light amount adjustment using the material element 501, so that the exposure amount approaches a proper value. When the light incident amount reaches or becomes close to a proper exposure amount, the light accumulation time of the image pickup element 10 is shortened, and is restored to the standard state.

Figure 53:
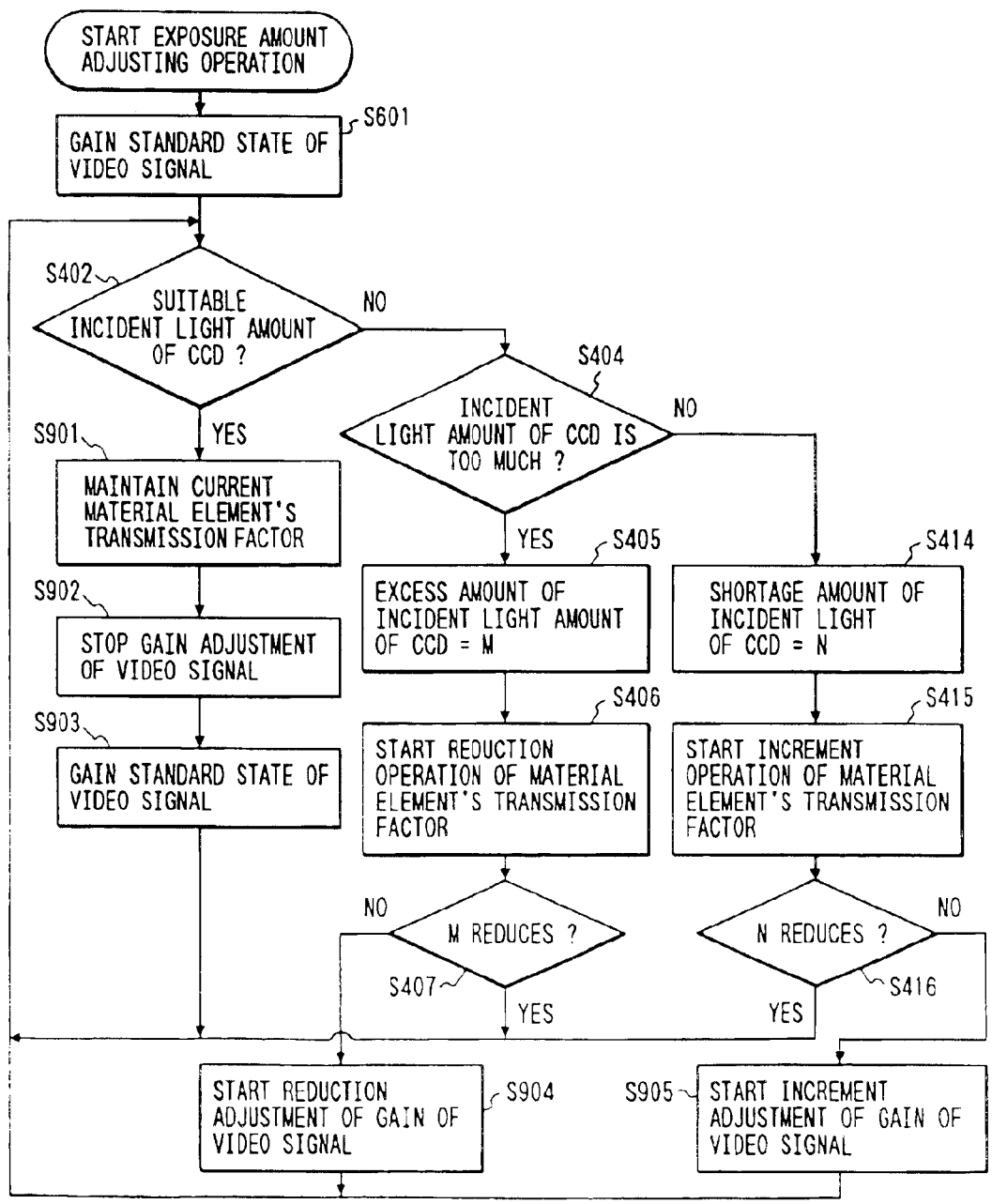
FIG. 53 is a flow chart showing the second example of exposure amount control processing corresponding to the embodiment shown in FIG. 51.

FIG. 53 is a flow chart showing the second example of exposure amount control processing corresponding to the embodiment shown in FIG. 51. Since the same reference numerals in FIG. 53 denote the same steps as in the above-mentioned flow charts, a repetitive description thereof will be avoided here.

When the exposure amount adjustment operation is started, the gain of the image pickup element 10 is set in the standard state (S601). In this state, it is checked if the incident light amount on the image pickup element 10 is proper (S402). If the incident light amount is proper, the light transmission factor (or light transmission amount) of the material element 501 is maintained (S901). Furthermore, gain adjustment of a video signal is stopped (S902), and the gain of the video signal is set in the standard state (S903).

However, if the incident light amount on the image pickup element 10 is too much, processing for decreasing the light transmission factor of the material element 501 is executed in step S404 and subsequent steps. If the excess amount of the incident light amount on the image pickup element 10 decreases, light amount adjustment using the material element 501 is continued. However, if the excess amount does not change or increases (S404), the gain of the video signal is decreased (S904) in addition to light amount adjustment using the material element 501 (S405, S406), so that the exposure amount approaches a proper value. When the incident light amount reaches or becomes close to a proper exposure amount, the gain of the video signal is restored to the standard state.

On the other hand, if the incident light amount on the image pickup element 10 runs short, processing for increasing the light transmission factor of the material element 501 is executed. At this time, if the shortage amount of the incident light amount on the image pickup element 10 decreases, light amount adjustment using the material element 501 is continued (S414, S415). However, if the shortage amount does not change or increases (S416), the gain of the video signal is increased (S905) in addition to light amount adjustment using the material element 501, so that the exposure amount approaches a proper value. Then, when the incident light amount reaches or becomes close to a proper exposure amount, the gain of the video signal is restored to the standard state.

Figure 54A:
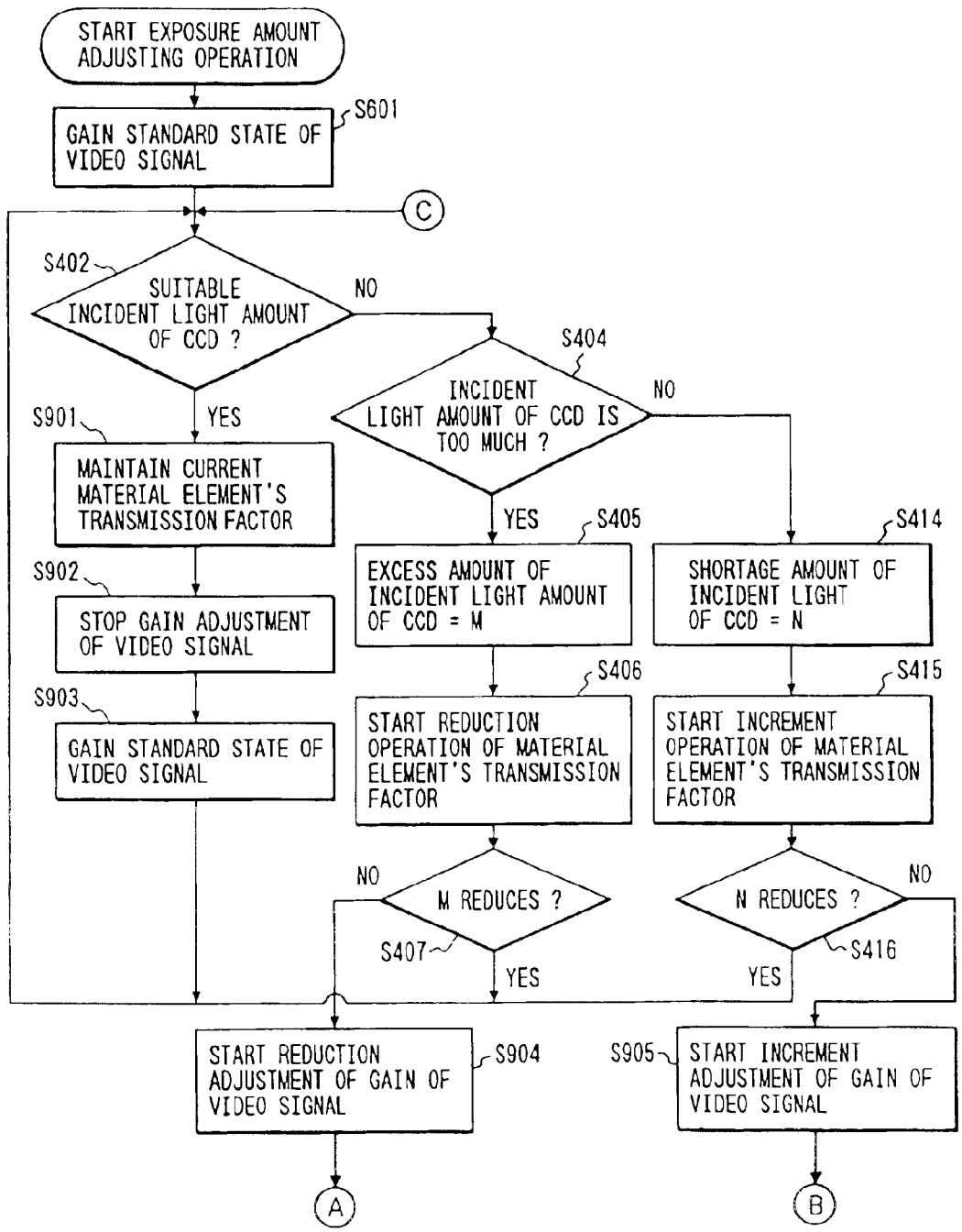
FIGS. 54A and 54B are flow charts showing the third example of exposure amount control processing corresponding to the embodiment shown in FIG. 51.
Figure 54B:
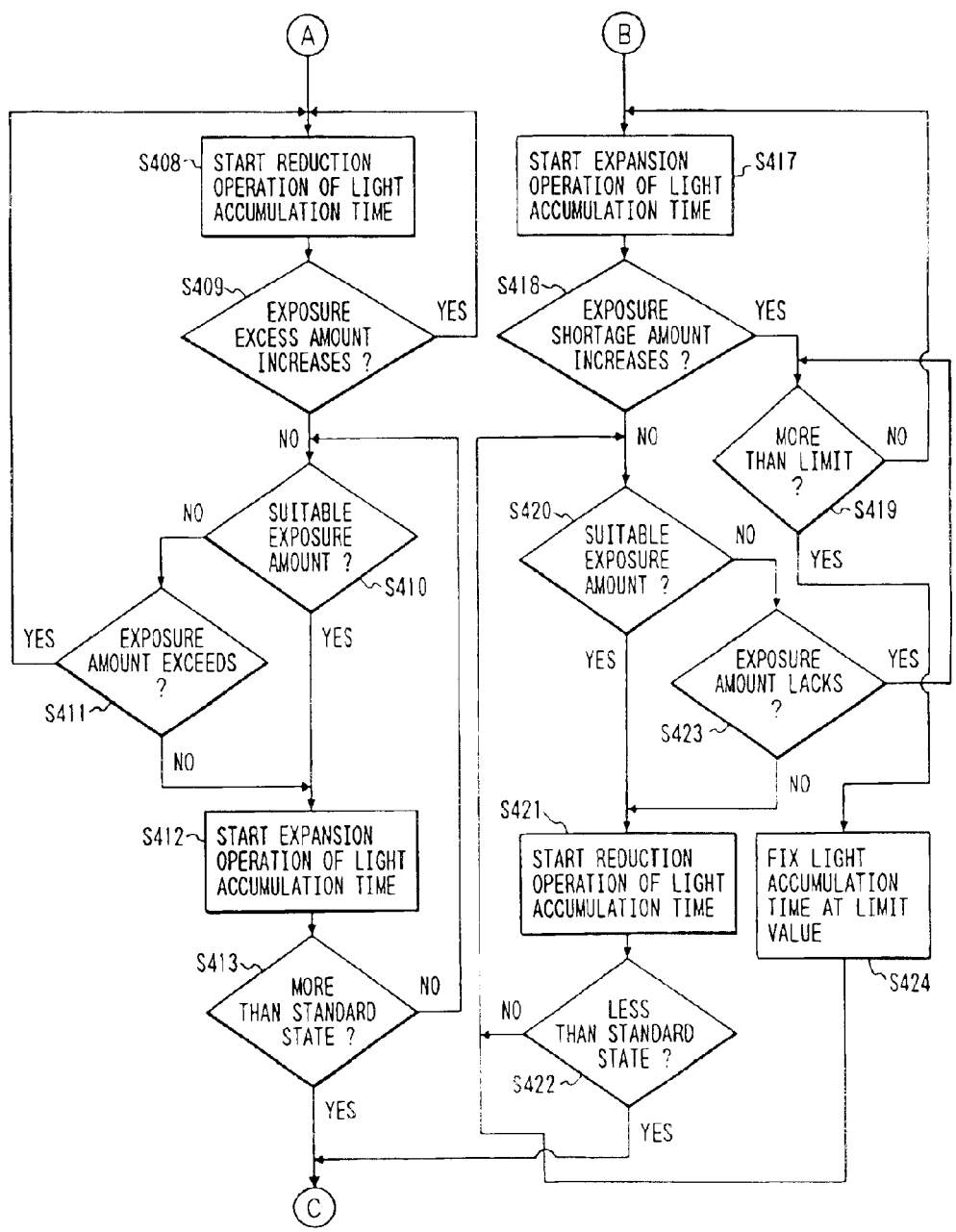

FIGS. 54A and 54B are flow charts showing the third example of exposure amount control processing corresponding to the embodiment shown in FIG. 51. Since the same reference numerals in FIG. 54A denote the same steps as in the above-mentioned flow charts, a repetitive description thereof will be avoided here. More specifically, in the flow chart of FIG. 53, if it is determined in step S402 that the incident light amount is not proper, processing in step S404 and subsequent steps is executed, and then, processing in steps S904 and S905 is executed to perform gain adjustment of the video signal. Thereafter, the flow returns to step S402. However, in the flow charts shown in FIGS. 54A and 54B of this embodiment, the flow advances to processing shown in FIG. 54B. The processing in FIG. 54B is the same as that shown in FIG. 49B, and a detailed description thereof will be omitted. That is, in FIG. 54B, the light accumulation time is controlled.

Figure 55:
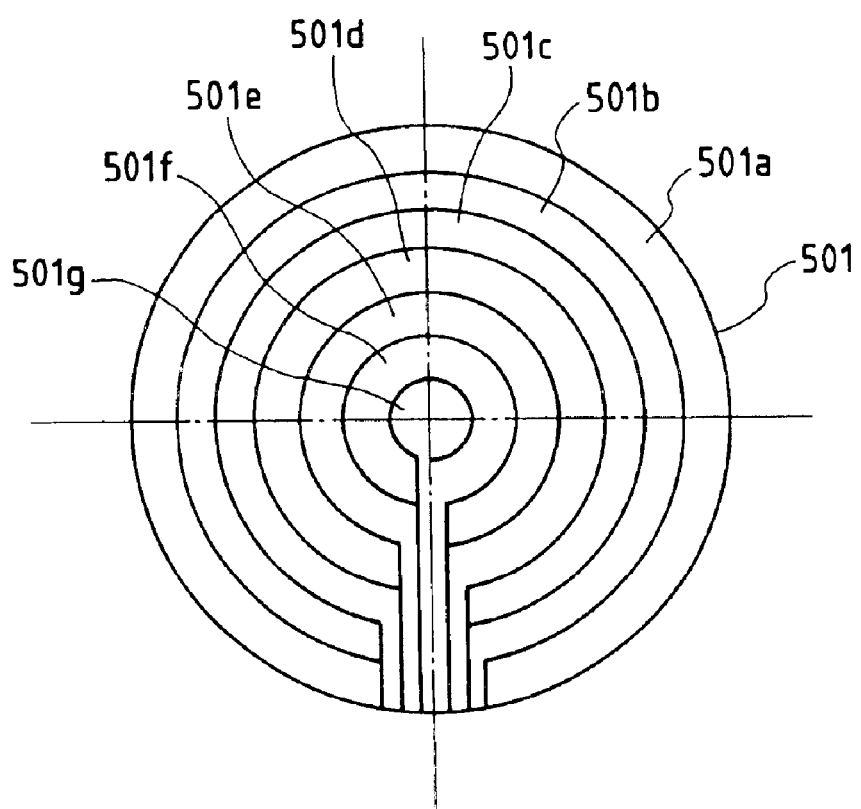
FIG. 55 is a front view showing an arrangement of a material element used in the 23rd and 24th embodiments.

In each of the above embodiments, the light transmission amount is adjusted by the material element 501. In this case, the light transmission amount of the optical system may be adjusted by changing the density of the entire material element. Alternatively, the material element may have a predetermined pattern, as shown in FIG. 55, and the light transmission amount of the optical system may be adjusted by changing the transmission factors of the pattern regions, as shown in FIGS. 56A to 56H, or the light transmission amount of the optical system may be adjusted by independently controlling the densities of the pattern regions.

Also, transmission factor detection means for the material element 501 may be arranged to detect the transmission factor or transmission factor change speed of the material element. When the incident light amount to the optical system changes at a speed beyond the incident light amount adjustment capacity of the material element 501, exposure control may be made using the present invention. Furthermore, when the incident light amount to the optical system changes rapidly, and the material element 501 cannot perform incident light amount adjustment even after an elapse of a predetermined period of time, exposure-adjustment according to the present invention may be executed.

Moreover, the transmission light amount adjustment speed of the material element 501 is normally lowered in a low-temperature environment. For this reason, a video camera using the material element 501 in transmission light amount adjustment may be provided with temperature detection means, and when the incident light amount to the optical system changes quickly in a low-temperature environment, exposure adjustment according to the present invention may be executed.

Since this embodiment has the above-mentioned arrangement, it can provide the following effects.

A video camera having an optical system for forming an object image on an image pickup element, and transmission light amount adjustment means, arranged in an optical path of the optical system, for adjusting a transmission light amount, comprises light accumulation time adjustment means for adjusting a light accumulation time of the image pickup element, and exposure amount control means for, when the change speed of an incident light amount to the optical system exceeds a light amount change speed corresponding to an adjustment limit of the transmission light amount adjustment means, changing the light accumulation time of the image pickup element until exposure amount adjustment of the transmission light amount adjustment means is enabled. Therefore, even when the-incident light amount to the optical system changes quickly, proper exposure amount control can be performed, and a high-quality image can be obtained.

Since the video camera also comprises gain adjustment means for adjusting the gain of a video signal, and the gain adjustment means is operated together with the exposure amount control means, finer exposure amount control can be realized.

Also, a video camera having an optical system for forming an object image on an image pickup element, and a material element, arranged in an optical path of the optical system, for adjusting a transmission light amount, comprises gain adjustment means for adjusting the gain of a video signal, and exposure amount control means for changing the gain of the video signal in addition to transmission light amount adjustment of the material element, under a condition that a change speed of the incident light amount to the optical system exceeds a light amount change speed corresponding to an adjustment limit of the material element. Therefore, even when the incident light amount to the optical system changes fast, proper exposure amount control can be performed, and a high-quality image can be obtained.

Since the video camera also comprises light accumulation time adjustment means for adjusting the light accumulation time of the image pickup element, and-the light accumulation time of the image-pickup element is adjusted together with the exposure amount control means, finer exposure amount control can be realized.

What is claimed is:

1. A camera comprising:
   a physical element, arranged in a photographing optical system, that can change a light transmission factor thereof;
   photoelectric conversion means, having a plurality of pixels, for receiving an optical image transmitted through said physical element at a position of an imaging plane, and for converting the optical image into electrical image signals for plural colors, respectively;
   memory means for storing correcting information for correcting an output level change of the electrical image signals of the respective plural colors from said photoelectric conversion means, caused by a change in an optical characteristic of said physical element with respect to a change of the light transmission factor of said physical element, the correcting information including at least two correcting information factors in accordance with the changed light transmission factors;

correction means for correcting at least one of the electrical image signals for the respective plural colors using the correcting information read out from said memory means in accordance with the current light transmission factor of said physical element;

white-balance adjusting means for adjusting a white balance in the electrical image signals from the respective plural colors, in accordance with the electrical image signals for the respective plural colors corrected by said correction means; and control means for controlling drive of said physical element in accordance with an output from said white-balance adjusting means.

2. A camera according to claim 1, wherein the correcting information includes a plurality of correcting information factors for the respective colors, in accordance with a change in light transmission factors for the respective plural colors with respect to the change of the light transmission factors of said physical element.

3. A camera according to claim 2, wherein said control means corrects at least one of the electrical image signals for the respective plural colors using at least one of the correcting factors for the respective plural colors.

4. A camera according to claim 1, wherein said correcting control means corrects at least one of the electrical image signals for the respective plural colors by changing at least one of sensitivity and light accumulation time of said pixels of said photoelectric conversion means, in accordance with the correcting information.

5. A camera according to claim 1, wherein said correcting control means corrects at least one of the electrical image signals for the respective plural colors using a filter provided on said photoelectric conversion means.

6. A camera according to claim 1, wherein said correcting means corrects at least one of the electrical image signals for the respective plural colors by locating in said photographing optical system a further physical element capable of controlling a light transmission factor thereof.

7. A camera comprising:

a physical element capable of changing a light transmission factor thereof;

photoelectric conversion means, having a plurality of pixels, for receiving an optical image transmitted through said physical element at a position of an imaging plane, and for converting the optical image into electrical image signals for plural colors, respectively, said plurality of pixels being adjustable for at least one of sensitivity and light accumulation time thereof;

memory means for storing correcting information for correcting an output level change of said photoelectric conversion means, used by a change in an optical characteristic of said physical element with respect to a change of the light transmission factor of said physical element, the correcting information including at least two correcting information factors;

correcting means for correcting the electrical image signals for the respective plural colors output from said photoelectric conversion means, using the correcting information read out from said memory means in accordance with the current light transmission factor of said physical element;

white-balance adjusting means for adjusting a white balance in the electrical image signals for the respective plural colors, in accordance with the electrical image signals for the respective plural colors corrected by said correction means; and exposure amount adjustment means for controlling an exposure amount by a combination of adjusting at least one of the light transmission factor and the light transmission amount of said physical element, and adjusting at least one of the light accumulation time and the sensitivity of said photoelectric conversion means, in accordance with the output from said white-balance adjusting means.

8. A camera according to claim 7, wherein said exposure amount adjustment means electrically adjusts at least one of the light transmission factor and the light transmission amount of said physical element.

9. A camera according to claim 7, wherein said exposure amount adjustment means adjusts at least one of the light transmission factor and the light transmission amount of said physical element in accordance with incident light.

* * * * *

UNITED STATES PATENT AND TRADEMARK OFFICE
CERTIFICATE OF CORRECTION

PATENT NO. : 6,952,233 B2
DATED : October 4, 2005
INVENTOR(S) : Masatoshi Nagano It is certified that error appears in the above-identified patent and that said Letters Patent is hereby corrected as shown below:

Column 5,
Line 27, "main" should read -- a main --.

Column 15,
Line 66, "from-the" should read -- from the --.

Column 16,
Line 2, "pick" should read -- pickup --.

Column 23,
Line 10, "$wo_3$" should read -- $WO_3$ --.

Column 24,
Line 2, "embodiment" should read -- embodiments --.

Column 27,
Line 53, "have-been" should read -- have been --.

Column 32,
Line 67, "state).to" should read -- state) to --.

Column 38,
Line 49, "and-the" should read -- and the --.

UNITED STATES PATENT AND TRADEMARK OFFICE
CERTIFICATE OF CORRECTION

PATENT NO. : 6,952,233 B2
DATED : October 4, 2005
INVENTOR(S) : Masatoshi Nagano It is certified that error appears in the above-identified patent and that said Letters Patent is hereby corrected as shown below:

<u>Column 40,</u>
Line 14, "used" should read -- caused --.
Line 25, "adiusting" should read -- adjusting --.

Signed and Sealed this

Sixteenth Day of May, 2006

JON W. DUDAS
*Director of the United States Patent and Trademark Office*